(12) United States Patent
Ware et al.

(10) Patent No.: US 12,282,748 B1
(45) Date of Patent: Apr. 22, 2025

(54) COARSE FLOATING POINT ACCUMULATOR CIRCUIT, AND MAC PROCESSING PIPELINES INCLUDING SAME

(71) Applicant: Analog Devices, Inc., Wilmington, MA (US)

(72) Inventors: Frederick A. Ware, Los Altos Hills, CA (US); Cheng C. Wang, San Jose, CA (US)

(73) Assignee: Analog Devices, Inc., Wilmington, MA (US)

( * ) Notice: Subject to any disclaimer, the term of this patent is extended or adjusted under 35 U.S.C. 154(b) by 964 days.

(21) Appl. No.: 17/313,037

(22) Filed: May 6, 2021

Related U.S. Application Data

(60) Provisional application No. 63/030,198, filed on May 26, 2020.

(51) Int. Cl.
*G06F 7/544* (2006.01)
*G06F 5/01* (2006.01)
(Continued)

(52) U.S. Cl.
CPC ............ *G06F 7/5443* (2013.01); *G06F 5/012* (2013.01); *G06F 7/485* (2013.01); *G06F 7/5095* (2013.01)

(58) Field of Classification Search
CPC ...... G06F 7/5443; G06F 7/485; G06F 7/5095; G06F 5/012
See application file for complete search history.

(56) References Cited

U.S. PATENT DOCUMENTS 4,958,312 A 9/1990 Ang et al.
6,115,729 A 9/2000 Matheny et al.
(Continued)

FOREIGN PATENT DOCUMENTS

| EP | 0405726 | 3/1999 |
| EP | 2280341 | 6/2013 |
| WO | WO 2018/126073 | 7/2018 |

OTHER PUBLICATIONS

Hennessy et al., "Computer Organization and Design: The Hardware/Software Interface", Fifth Edition, Chapter 1 pp. 2-59, 2014. Retrieved from <https://ict.iitk.ac.in/wp-content/uploads/CS422-Computer-Architecture-ComputerOrganizationAndDesign5thEdition2014.pdf> (Year: 2014).*

(Continued)

*Primary Examiner* — Andrew Caldwell
*Assistant Examiner* — Carlo Waje
(74) *Attorney, Agent, or Firm* — DLA PIPER LLP (US)

(57) ABSTRACT

An integrated circuit including a multiplier-accumulator circuit pipeline including a plurality of MAC circuits. Each MAC circuit includes: (A) a multiplier circuit to multiply first input data and filter weight data to generate and output first product data having a floating point data format, and (B) a coarse floating point accumulator circuit including: (1) an alignment shift circuit to shift at least one field of the first product data and generate shifted first product data, and (2) fixed point addition circuitry, coupled to the alignment shift circuit, to add second input data and the shifted first product data using the fixed point addition circuitry. The plurality of MAC circuits of the multiplier-accumulator circuit execution pipeline, in operation, each perform a plurality of multiply operations and accumulate operations to process the first input data and generate processed data therefrom.

20 Claims, 46 Drawing Sheets

(51) Int. Cl.
*G06F 7/485* (2006.01)
*G06F 7/509* (2006.01)

(56) References Cited

U.S. PATENT DOCUMENTS

| | | | |
|---|---|---|---|
| 6,148,101 | A | 11/2000 | Tanaka et al. |
| 6,298,366 | B1 | 10/2001 | Gatherer et al. |
| 6,538,470 | B1 | 3/2003 | Langhammer et al. |
| 7,107,305 | B2 | 9/2006 | Deng et al. |
| 7,225,216 | B1* | 5/2007 | Wyland ............... G06F 7/5443 708/501 |
| 7,299,342 | B2 | 11/2007 | Nilsson et al. |
| 7,346,644 | B1 | 3/2008 | Langhammer et al. |
| 7,698,358 | B1 | 4/2010 | Langhammer et al. |
| 8,051,124 | B2 | 11/2011 | Salama et al. |
| 8,266,199 | B2 | 9/2012 | Langhammer et al. |
| 8,645,450 | B1 | 2/2014 | Choe et al. |
| 8,751,551 | B2 | 6/2014 | Streicher et al. |
| 8,788,562 | B2 | 7/2014 | Langhammer et al. |
| 9,600,278 | B1 | 3/2017 | Langhammer |
| 2002/0194240 | A1* | 12/2002 | Pangal ............... G06F 7/5443 708/503 |
| 2003/0028572 | A1* | 2/2003 | Hoskote ............ G06F 7/49942 708/495 |
| 2003/0172101 | A1 | 9/2003 | Liao et al. |
| 2005/0144215 | A1 | 6/2005 | Simkins et al. |
| 2007/0239967 | A1 | 10/2007 | Dally et al. |
| 2008/0211827 | A1 | 9/2008 | Donovan et al. |
| 2009/0094303 | A1 | 4/2009 | Katayama |
| 2014/0019727 | A1 | 1/2014 | Zhu et al. |
| 2014/0281370 | A1 | 9/2014 | Khan |
| 2017/0011288 | A1 | 1/2017 | Brothers et al. |
| 2017/0115958 | A1 | 4/2017 | Langhammer |
| 2017/0116693 | A1 | 4/2017 | Rae et al. |
| 2017/0214929 | A1 | 7/2017 | Susnow et al. |
| 2017/0315778 | A1 | 11/2017 | Sano |
| 2017/0322813 | A1 | 11/2017 | Langhammer |
| 2017/0344876 | A1 | 11/2017 | Brothers |
| 2018/0052661 | A1 | 2/2018 | Langhammer |
| 2018/0081632 | A1 | 3/2018 | Langhammer |
| 2018/0081633 | A1 | 3/2018 | Langhammer |
| 2018/0157961 | A1 | 6/2018 | Henry et al. |
| 2018/0173571 | A1 | 6/2018 | Huang et al. |
| 2018/0189651 | A1 | 7/2018 | Henry et al. |
| 2018/0300105 | A1 | 10/2018 | Langhammer |
| 2018/0314492 | A1 | 11/2018 | Fais et al. |
| 2018/0321909 | A1 | 11/2018 | Langhammer |
| 2018/0321910 | A1 | 11/2018 | Langhammer et al. |
| 2018/0341460 | A1 | 11/2018 | Langhammer |
| 2018/0341461 | A1 | 11/2018 | Langhammer |
| 2019/0042191 | A1 | 2/2019 | Langhammer |
| 2019/0042244 | A1 | 2/2019 | Henry et al. |
| 2019/0042544 | A1 | 2/2019 | Kashyap et al. |
| 2019/0042923 | A1 | 2/2019 | Janedula et al. |
| 2019/0079728 | A1 | 3/2019 | Langhammer et al. |
| 2019/0114536 | A1 | 4/2019 | Tsung et al. |
| 2019/0196786 | A1 | 6/2019 | Langhammer |
| 2019/0243610 | A1 | 8/2019 | Lin et al. |
| 2019/0250886 | A1 | 8/2019 | Langhammer |
| 2019/0286417 | A1 | 9/2019 | Langhammer |
| 2019/0310828 | A1 | 10/2019 | Langhammer et al. |
| 2019/0324722 | A1 | 10/2019 | Langhammer |
| 2019/0340489 | A1 | 11/2019 | Mills |
| 2019/0392297 | A1 | 12/2019 | Lau et al. |
| 2020/0004506 | A1 | 1/2020 | Langhammer et al. |
| 2020/0026493 | A1 | 1/2020 | Streicher et al. |
| 2020/0076435 | A1 | 3/2020 | Wang |
| 2020/0097799 | A1 | 3/2020 | Divakar et al. |
| 2020/0174750 | A1 | 6/2020 | Langhammer |
| 2020/0202198 | A1 | 6/2020 | Lee et al. |
| 2020/0234124 | A1 | 7/2020 | Park |
| 2020/0310818 | A1 | 10/2020 | Ware et al. |
| 2020/0326939 | A1 | 10/2020 | Ware et al. |
| 2020/0326948 | A1 | 10/2020 | Langhammer |
| 2020/0401414 | A1 | 12/2020 | Ware et al. |
| 2021/0081211 | A1 | 3/2021 | Wang |
| 2021/0103630 | A1 | 4/2021 | Ware et al. |
| 2021/0132905 | A1 | 5/2021 | Ware et al. |
| 2021/0157549 | A1* | 5/2021 | Elmer ............... G06F 7/5443 |
| 2021/0173617 | A1 | 6/2021 | Ware et al. |
| 2021/0326286 | A1 | 10/2021 | Ware et al. |

OTHER PUBLICATIONS

Priyanka Nain, "Multiplier-Accumulator (MAC) Unit", IJDACR, vol. 5, Issue 3, Oct. 2016, 4 pages.

Jebashini et al., "A Survey and Comparative Analysis of Multiply-Accumulate (MAC) Block for Digital Signal Processing Application on ASIC and FPGA", Journal of Applied Science, vol. 15, Issue 7, pp. 934-946, Jul. 2015.

Agrawal et al., "A 7nm 4-Core AI Chip with 25.6TFLOPS Hybrid FP8 Training, 102.4TOPS INT4 Inference and Workload-Aware Throttling", ISSCC, pp. 144-145, 2021.

Linley Gwennap, "IBM Demonstrates New AI Data Types", Microprocessor Report, Apr. 2021.

Choi et al., "Accurate and Efficient 2-Bit Quantized Neural Networks", Proceedings of $2^{nd}$ SysML Conf, 2019, 12 pages.

Sun et al., "Hybrid 8-bit Floating Point (HFP8) Training and Inference for Deep Neural Networks", NeurIPS 2019, 10 pages.

"NVidia A100 Tensor Core GPU Architecture", v1.0, 2020, 82 pages.

Papadantonakis et al., "Pipelining Saturated Accumulation", IEEE, vol. 58, No. 2, pp. 208-219, Feb. 2009.

Liang Yun, et al., "Evaluating Fast Algorithms for Convolutional Neural Networks on FPGAs", IEEE Transactions on Computer-Aided Design of Integrated Circuits and Systems, vol. 39, No. 4, Feb. 5, 2019, 14 pages (Note: The date identified on the article attached is Mar./Apr. 2020).

Zhao et al., "A Fast Algorithm for Reducing the Computation Complexity of Convolutional Neural Networks", Algorithms 2018, 11, 159; doi:10.3390/a11100159; www. Mdpi.com/journal/algorithms, 11 pages, Oct. 2018.

* cited by examiner

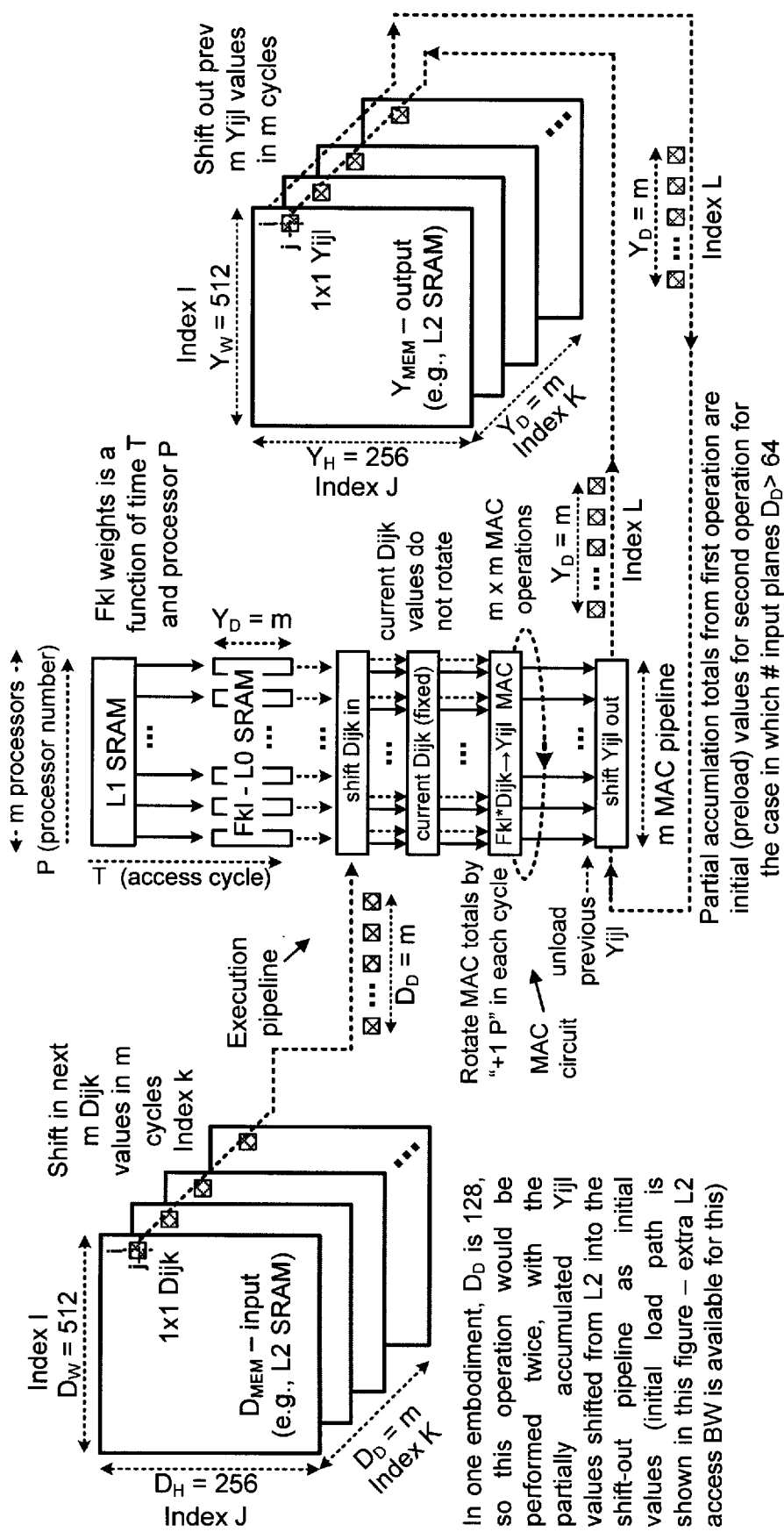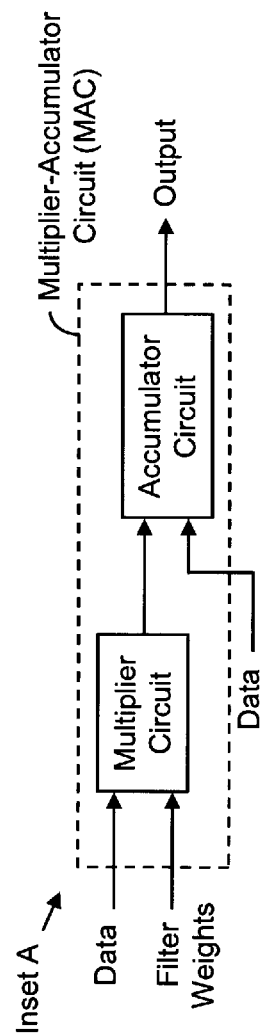
FIG. 1A

In this embodiment, each single 64-MAC execution pipeline has its own L0 SRAM memory, and each 16 x 64-MAC cluster includes a shared L1 SRAM memory. The shift-in and shift-out paths of each 64-MAC execution pipeline is coupled to the L2 SRAM memory. The L2 memory also couples to the L1/L0 memories.

A network-on-chip (NOC) couples the L2 memory to the PHY (physical interface) for the L3 memory (external DRAM component(s)). The NOC also couples to a PCIe PHY which, in turn, couples to an external host. Notably, in one embodiment, the NOC also couples to GPIO input/output PHYs, which allow multiple X1 components to be operated concurrently.

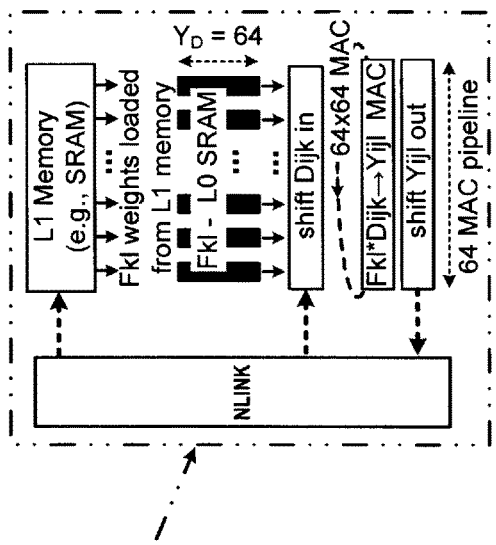

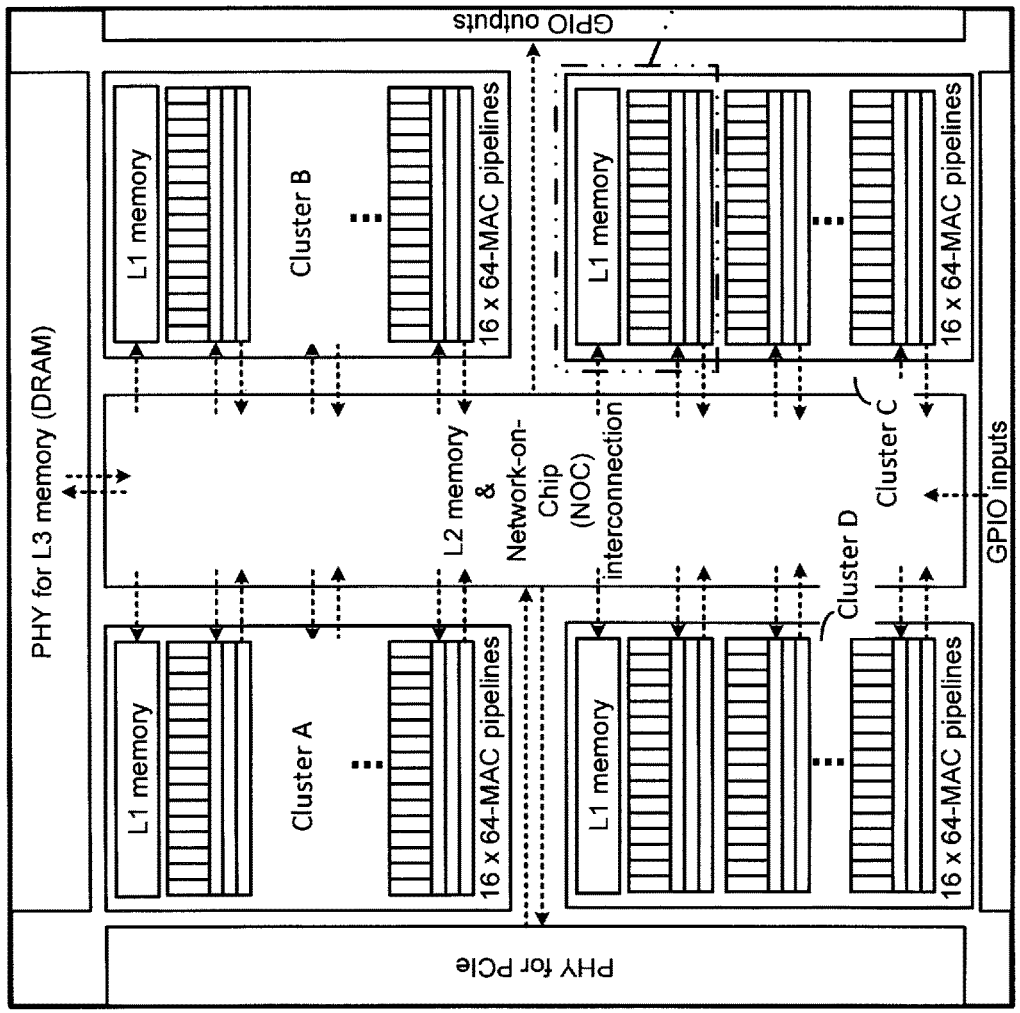

FIG. 1B

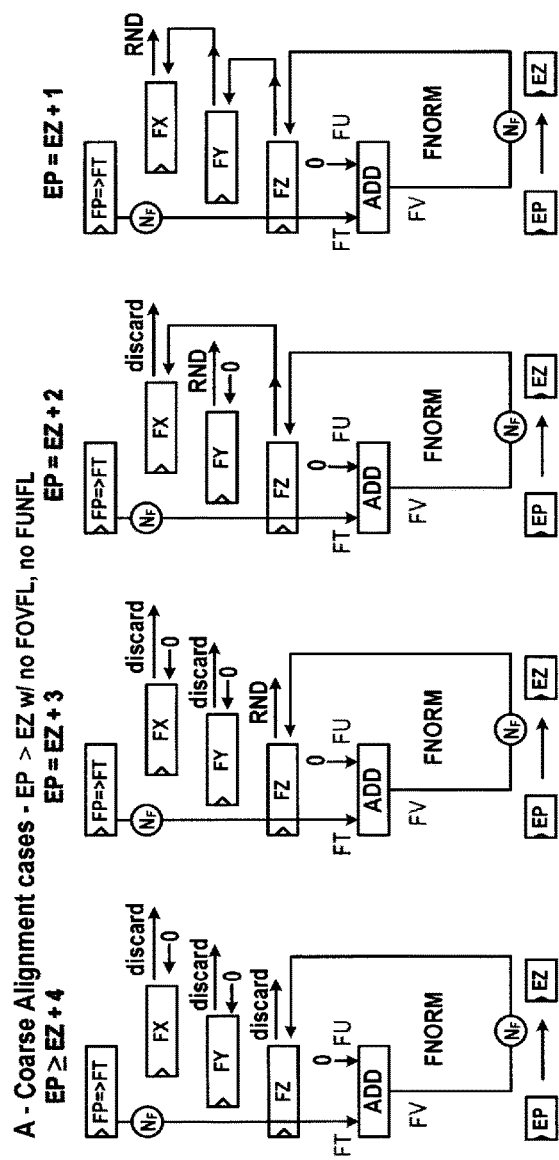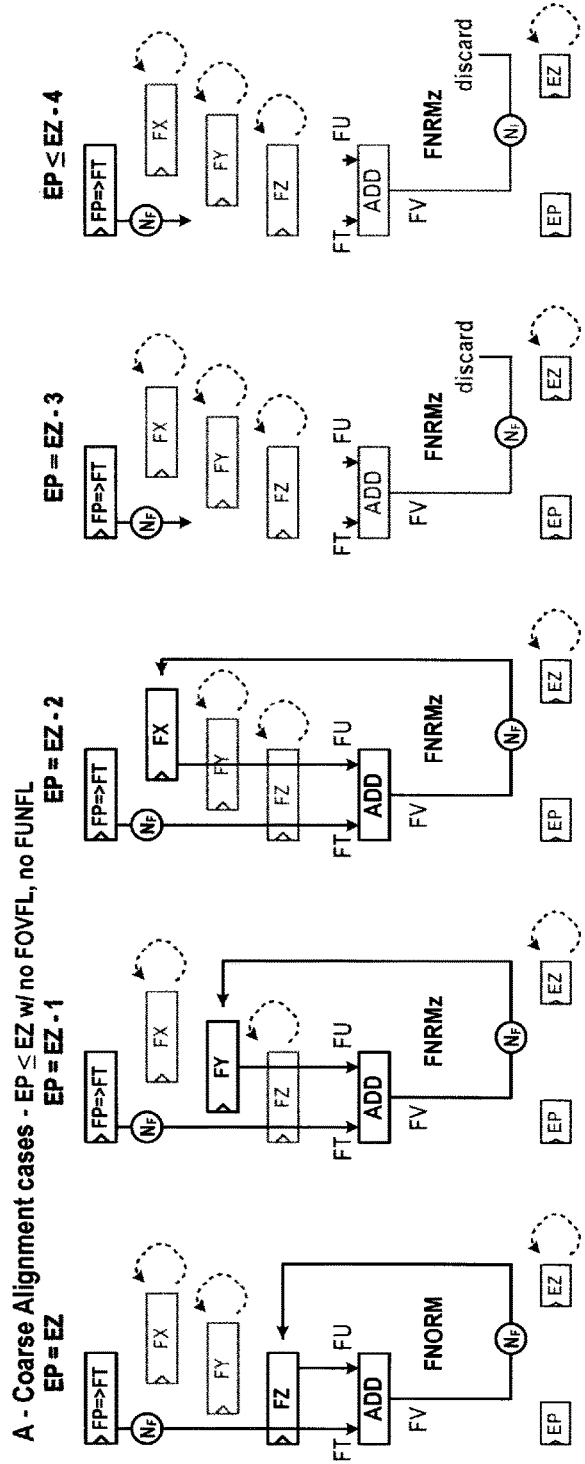
FIG. 7A

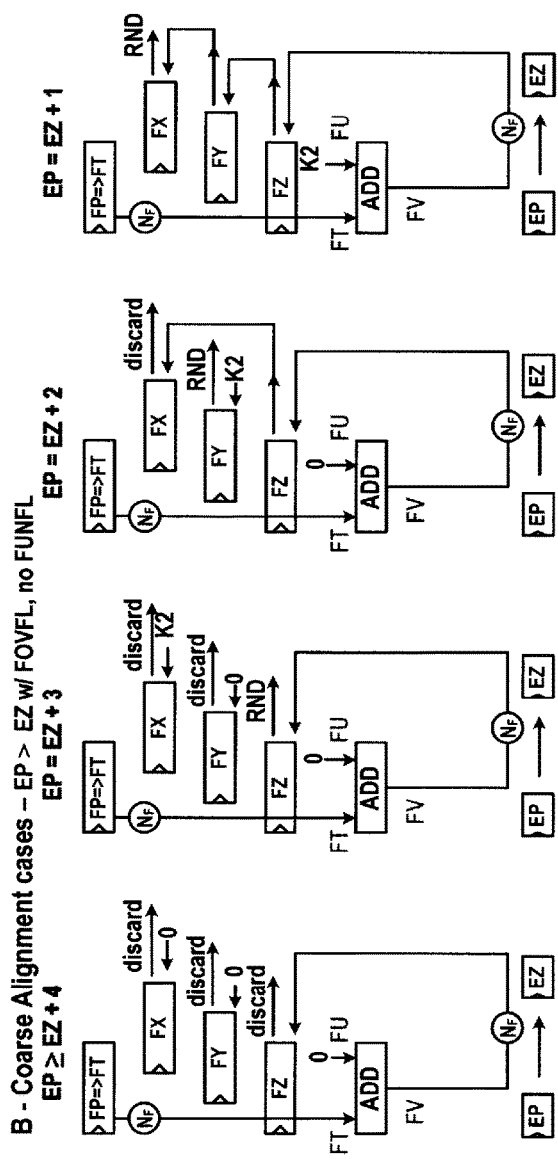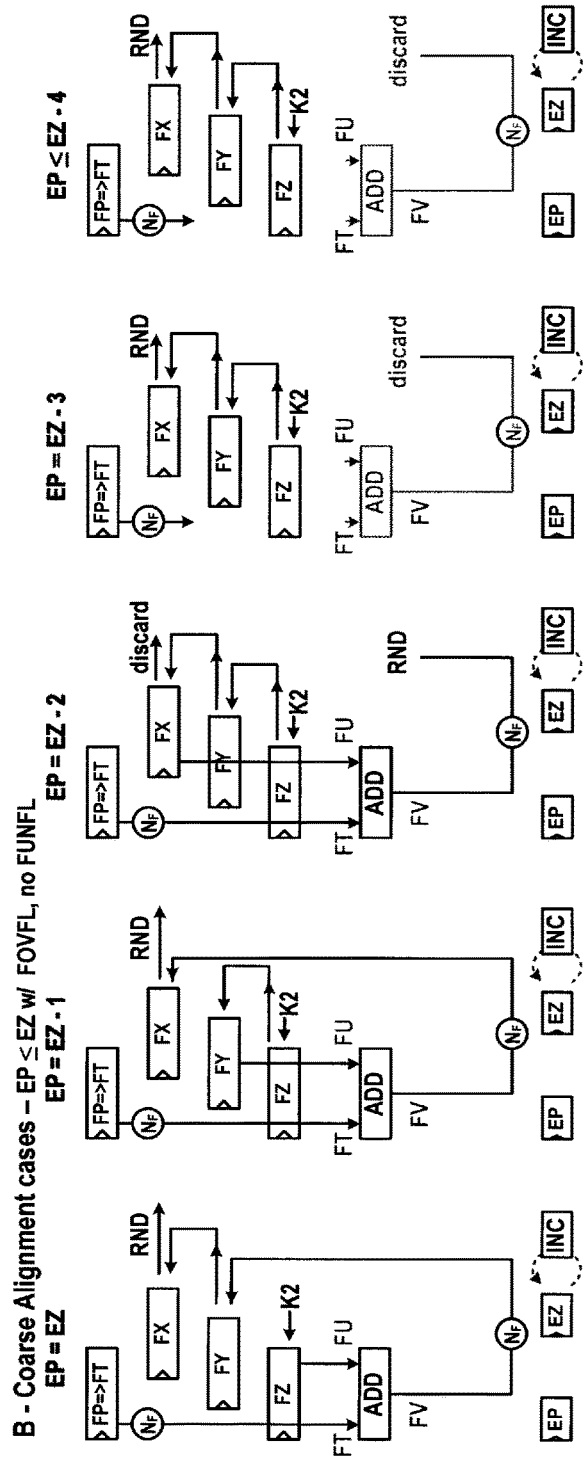
FIG. 7B

FIG. 8A

| | | | | | | |
|---|---|---|---|---|---|---|
| EP ≥ EZ+4 | EP → EZ | FT → FZ | 0 → FY | 0 → FX | | FNORM |
| EP = EZ+3 | EP → EZ | FT → FZ | 0 → FY | 0 → FX | | FNORM |
| EP = EZ+2 | EP → EZ | FT → FZ | 0 → FY | FZ → FX | FY → RND | FNORM |
| EP = EZ+1 | EP → EZ | FT → FZ | FZ → FY | FY → FX | FX → RND | FNORM |
| EP = EZ | EZ → EZ | FT+FZ → FZ | FY → FY | FX → FX | | FNORM |
| EP = EZ-1 | EZ → EZ | FT → FZ | FT+FY → FY | FX → FX | | FNRMz |
| EP = EZ-2 | EZ → EZ | FT → FZ | FY → FY | FT+FX → FX | | FNRMz |
| EP = EZ-3 | EZ → EZ | FT → FZ | FY → FY | FX → FX | | FNRMz |
| EP ≤ EZ-4 | EZ → EZ | FT → FZ | FY → FY | FX → FX | | FNRMz |

FIG. 8B

| | | | | | | |
|---|---|---|---|---|---|---|
| EP ≥ EZ+4 | EP → EZ | FT → FZ | 0 → FY | 0 → FX | FZ → RND | FOVFL |
| EP = EZ+3 | EP → EZ | FT → FZ | 0 → FY | K2 → FX | FY → RND | FOVFL |
| EP = EZ+2 | EP → EZ | FT → FZ | K2 → FY | FZ → FX | FX → RND | FOVFL |
| EP = EZ+1 | EP → EZ | FT+K2 → FZ | FZ → FY | FY → FX | | FOVFL |
| EP = EZ | EZ+1 → EZ | FT → FZ | FT+FZ → FY | FY → FX | FX → RND | FOVFL |
| EP = EZ-1 | EZ+1 → EZ | K2 → FZ | FZ → FY | FT+FY → FX | FX → RND | FOVFL |
| EP = EZ-2 | EZ+1 → EZ | K2 → FZ | FZ → FY | FY → FX | FT+FX → RND | FOVFL |
| EP = EZ-3 | EZ+1 → EZ | K2 → FZ | FZ → FY | FY → FX | FX → RND | FOVFL |
| EP ≤ EZ-4 | EZ+1 → EZ | K2 → FZ | FZ → FY | FY → FX | FX → RND | FOVFL |

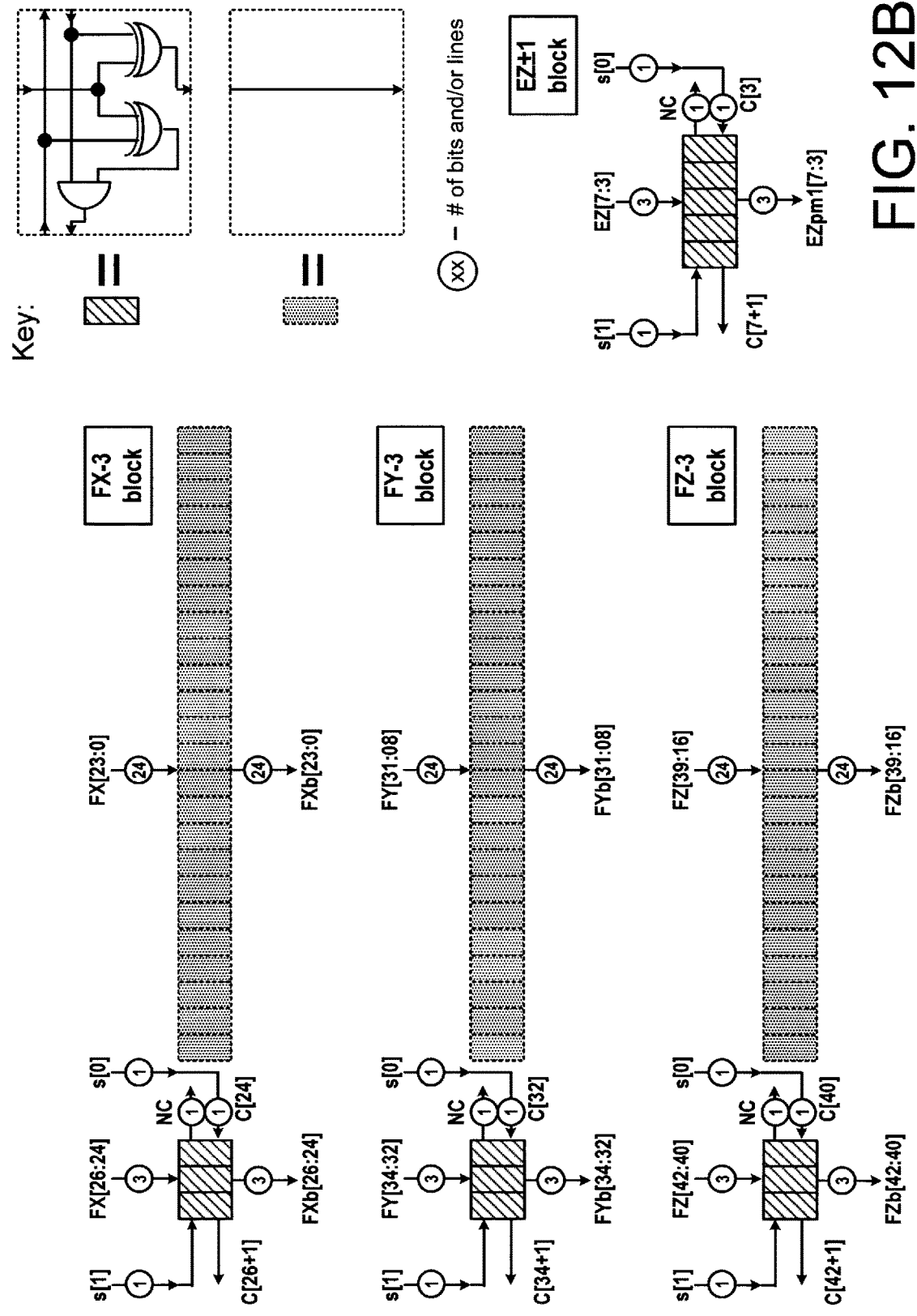

| Coarse FPADD | | LOAD | UNLOADa | UNLOADb | x EOVFL | EPgeEZp3 FOVFL | EPeqEZp2 FOVFL | EPeqEZp1 FOVFL | EPeqEZ FOVFL | EPeqEZm1 FOVFL | EPeqEZm2 FOVFL | EPleEZm3 FOVFL |
|---|---|---|---|---|---|---|---|---|---|---|---|---|
| 0/K2 | SELFUb = | | | | | 0 | 0 | K2 | | | | |
| FX | SELFUc = | | x | | | | | | x | x | | |
| FY | SELFUd = | | | | x | | | | | | x | x |
| FZ | SELFUe = | x | | x | | | x | | | | | |
| FY | SELFXa = | x | | | | | | | x | x | | |
| FZ | SELFXb = | | x | | x | | | | | | | x |
| 0 | SELFXc = | | | | | | x | | | | x | |
| FV | SELFXd = | | | | | 0(p4) : K2p3) | | | | | | |
| K2 | SELFXe = | x | x | | | | | | | | | |
| FX | SELFYf = | | | x | | | | | | | | |
| FZ | SELFYa = | x | | | x | | | x | x | | x | x |
| FX | SELFYb = | | | | | | | | | | | |
| 0/FS | SELFYc = | | x | | x | x | | | | | | |
| FV | SELFYd = | | | | | | | | | | | |
| K2 | SELFYe = | | | | | | | | | | | |
| FY | SELFYf = | | | x | | | | | | | | |
| INF | SELFZa = | x | | | | x | x | x | x | x | x | x |
| FY | SELFZb = | | | | | | | | | | | |
| 0/FS | SELFZc = | | x | | | | | | | | | |
| FV | SELFZd = | | | | | | | | | | | |
| K2 | SELFZe = | | | | | | | | | | | |
| FZ | SELFZf = | | | x | | | | | | | | |
| EP | SELEZa = | x | x | x | MAX | x | x | x | x | x | x | x |
| 0/ES | SELEZb = | | | | | | | | | | | |
| MAX/MIN | SELEZc = | | | | | | | | | | | |
| EZ | SELEZd = | | | | | | | | | | | |
| dec | SELEZK1 = | 0 | 0 | 0 | 0 | 0 | 0 | 0 | 0 | 0 | 0 | 0 |
| inc/dec | SELEZK0 = | 0 | 0 | 0 | 0 | 0 | 0 | 0 | 1 | 1 | 1 | 1 |

Coarse FPADD

| | | EPgeEZp3 FNORM | EPeqEZp2 FNORM | EPeqEZp1 FNORM | EPeqEZ FNORM | EPeqEZm1 FNRMz | EPeqEZm2 FNRMz | EPleEZm3 FNRMz | EPeqEZm1 FUNFL | EPeqEZm2 FUNFL | EPleEZm3 FUNFL |
|---|---|---|---|---|---|---|---|---|---|---|---|
| 0 | SELFUb = | x | x | x | | | | | | | |
| FX | SELFUc = | | x | | | | | | | | |
| FY | SELFUd = | | | | | x | | | x | | |
| FZ | SELFUe = | | | | x | | x | | | x | x |
| FY | SELFXa = | x | | x | | | | | | | |
| FZ | SELFXb = | | x | | | | | | | | |
| 0 | SELFXc = | | | | | x | | | x | | |
| FV | SELFXd = | | | | x | | x | | | x | |
| K2 | SELFXe = | | | | | | | x | | | x |
| FX | SELFYf = | | | | | | | | | | |
| FZ | SELFYa = | x | | x | | | | | | | |
| FX | SELFYb = | | x | | | | | | | | |
| 0/FS | SELFYc = | | | | | x | | | x | | |
| FV | SELFYd = | x | | | x | | x | | | x | |
| K2 | SELFYe = | | | | | | | x | | | x |
| FY | SELFYf = | | | | | | | | | | |
| INF | SELFZa = | | | | | | | | | | |
| FY | SELFZb = | | | | | | | | | | |
| 0/FS | SELFZc = | | | | | | | | | | |
| FV | SELFZd = | x | x | x | x | x | x | x | x | x | x |
| K2 | SELFZe = | x | x | x | | | | | | | |
| FZ | SELFYf = | | | | | | | | | | |
| EP | SELEZa = | | | | | | | | | | |
| 0/ES | SELEZb = | | | | | | | | | | |
| MAX/MIN | SELEZc = | | | | | | | | | | |
| EZ | SELEZd = | | | | | | | | | | |
| dec | SELEZK1 = | 0 | 0 | 0 | 0 | 0 | 0 | 0 | — | — | — |
| inc/dec | SELEZK0 = | 0 | 0 | 0 | 0 | 0 | 0 | 0 | — | — | — |

COARSE FLOATING POINT ACCUMULATOR CIRCUIT, AND MAC PROCESSING PIPELINES INCLUDING SAME

RELATED APPLICATION

This non-provisional application claims priority to and the benefit of U.S. Provisional Application No. 63/030,198, entitled "Coarse Floating Point Accumulator circuit and Processing Pipeline including Same, and Methods of Operating Same", filed May 26, 2020. The '198 provisional application is hereby incorporated herein by reference in its entirety.

INTRODUCTION

There are many inventions described and illustrated herein. The present inventions are neither limited to any single aspect nor embodiment thereof, nor to any combinations and/or permutations of such aspects and/or embodiments. Importantly, each of the aspects of the present inventions, and/or embodiments thereof, may be employed alone or in combination with one or more of the other aspects of the present inventions and/or embodiments thereof. All combinations and permutations thereof are intended to fall within the scope of the present inventions.

In one aspect, the present inventions are directed to one or more integrated circuits having multiplier-accumulator circuit (and methods of operating such circuitry) including an execution pipeline (in one embodiment, each pipeline includes a plurality of interconnected multiplier-accumulator circuits (referred to herein, at times, as "MAC" or "MAC circuit" or, in plural form, "MACs" or "MAC circuits")) for data processing (e.g., image filtering) wherein the MAC(s) each include an accumulator circuit to (i) perform accumulation operations, of operands, using fixed point addition circuitry wherein one or both operands have floating point data formats, and/or (ii) implement accumulation operations based on a coarse floating point data format (which may be based on operands having floating point data formats). In one embodiment, the accumulator circuit is implemented in one or more MACs of an execution or processing pipeline. For example, the MAC(s) of the processing pipeline may include a coarse floating point accumulator circuit and/or floating point accumulator circuit implementing accumulation operations based on or employing one or more coarse floating point data formats.

A coarse floating point data format, in one embodiment, includes: [1] a fractional field which is broken across or separate into two or more fields, [2] the two or more fields are shifted (with respect to the numeric weights of their bits), [3] the two or more fields may or may not be normalized (e.g., possessing a bit of one in the most significant position of the field), [4] the two or more fields may use a two's complement numeric format (in lieu of a sign-magnitude numeric format), and [5] a smaller bit length of the exponent field (relative to, for example, a standard eight bit floating point format) may be employed to accommodate the lack-of-normalization element [3]—in the event the two or more fractional fields are not normalized. Under these circumstances, the accumulation operation performed by the accumulator circuit of multiplier-accumulator circuit of, for example, an execution or processing pipeline(s) may employ a fixed point addition following a pre-alignment shift.

For example, an exemplary coarse floating point format may include: [1] three fractional fields each with 27 bits, [2] relative to the first field the second field is shifted 8 bit positions and the third field is shifted 16 bit positions, [3] the three fields may be unnormalized, [4] the three fields use two's complement numeric format, and [5] the exponent field is five bits. Such a data format allows the accumulator circuit of the multiplier-accumulator circuit to perform the accumulation operation via fixed point addition following a pre-alignment shift.

The "coarseness" or amount of "coarseness" of the coarse floating point data formats and/or the "coarseness" of the coarse floating point accumulator circuit may be user or system defined and/or may be one-time programmable (e.g., at manufacture) or more than one-time programmable (e.g., (i) at or via power-up, start-up or performance/completion of the initialization sequence/process sequence, and/or (ii) in situ or during normal operation). In one embodiment, the circuitry (e.g., the accumulator circuit) of the execution pipelines includes adjustable precision—which also may be one-time programmable (e.g., at manufacture) or more than one-time programmable (e.g., (i) at or via power-up, start-up or performance/completion of the initialization sequence/process sequence, and/or (ii) in situ or during normal operation). For the avoidance of doubt, the term "coarse floating point data format" (as used here) is not a measure of precision—rather it refers to the "compactness" of the data format—for example, from a perspective of a storage footprint of the data in memory (e.g., SRAM, such as in L2 memory). The lack or relaxation of "compactness" of the data format simplifies and accelerates execution of the accumulation operations by, for example, an accumulator circuit of a MAC. Here, certain operations performed in a coarse floating point data format, that may be necessary when performed in a standard floating point data format, may be eliminated or simplified (e.g., via reduced logic)—such as normalization, rounding, overflow detection, underflow detection. In this way, the circuit area, delay, and/or power consumption, in the context of a coarse floating point accumulator circuit, may be reduced (e.g., significantly) relative to a floating point accumulator circuit. Notably, the data path for the coarse floating point data may be widened to provide the same level of precision/accuracy in a final result as a standard floating point data path.

In addition thereto, or in lieu thereof, the processing circuitry of the execution pipelines may concurrently process data to increase throughput of the pipeline. For example, in one implementation, the present inventions may include a plurality of separate multiplier-accumulator circuits (referred to herein, at times, as "MAC" or "MAC circuits") and a plurality of registers (including, in one embodiment, a plurality of shadow registers) that facilitate pipelining of the multiply and accumulate operations wherein the circuitry of the execution pipelines concurrently process data to increase throughput of the pipeline.

Notably, the present inventions may employ or be implemented in conjunction with the circuitry and techniques described and/or illustrated in U.S. patent application Ser. No. 16/545,345 and U.S. Provisional Patent Application No. 62/725,306, and/or U.S. patent application Ser. No. 17/019,212, filed Sep. 12, 2020. Here, the multiplier-accumulator circuit described and/or illustrated in the '345, '306 and '212 applications facilitate concatenating the multiply and accumulate operations, and reconfiguring the circuitry thereof and operations performed thereby (see, e.g., the exemplary embodiments illustrated in FIGS. 1A-1C of U.S. patent application Ser. No. 16/545,345); in this way, a plurality of multiplier-accumulator circuits may be configured and/or re-configured to process data (e.g., image data) in a manner whereby the processing and operations are performed more rapidly and/or efficiently. The '345, '306 and '212 applications are incorporated by reference herein in their entirety.

Further, the present inventions may also be employed or be implemented in conjunction with the circuitry and techniques multiplier-accumulator execution or processing pipelines (and methods of operating such circuitry) having circuitry to implement Winograd type processes to increase data throughput of the multiplier-accumulator circuit and processing—for example, as described and/or illustrated in U.S. patent application Ser. No. 16/796,111 and U.S. Provisional Patent Application No. 62/823,161; the '111 and '161 applications are hereby incorporated by reference in its entirety.

In addition thereto, or in lieu thereof, the present inventions may also be employed or be implemented in conjunction with the circuitry and techniques multiplier-accumulator execution or processing pipelines (and methods of operating such circuitry) having circuitry and/or architectures to concurrently process data to increase throughput of the pipeline—for example, as described and/or illustrated in U.S. patent application Ser. No. 16/816,164 and U.S. Provisional Patent Application No. 62/831,413; the '164 and '413 applications are hereby incorporated by reference in its entirety. Here, a plurality of processing or execution pipelines may concurrently process data to increase throughput of the data processing and overall pipeline.

Briefly, with reference to FIG. 1A, in one embodiment the multiplier-accumulator circuit of the execution pipeline includes a plurality of MACs, interconnected or configured in a linearly connected pipeline architecture. In one embodiment of this architecture, Dijk data is "fixed" in place during execution and Yijl data "rotates" or is transferred from MAC to MAC during execution or data processing. The m×m Fkl filter weights (e.g., 64×64 Fkl filter weights) are distributed across L0 memory (e.g., L0 memory is SRAM, 64 L0 SRAMs—one L0 SRAM is associated with (and, in one embodiment, dedicated to, a given MAC of the plurality of MACs (in this illustrative embodiment, 64) of the pipeline). In each execution cycle, 64 Fkl values are read and provided to the MACs for use in data processing. In one embodiment, the Dijk data values are stored or held in one processing element during the 64 execution cycles (i.e., do not rotate) after being loaded from the Dijk shifting chain—which is connected to DMEM memory (here, L2 memory—such as SRAM).

Further, during processing, the Yijlk MAC values are rotated through all 64 processing elements during the 64 execution cycles after being loaded from the Yijk shifting chain (see $Y_{MEM}$ memory), and will be unloaded with the same shifting chain.

Further, in this exemplary embodiment, "m" (e.g., 64 in the illustrative embodiment) MACs in the execution pipeline operate concurrently whereby each MAC of the pipeline performs m×m (e.g., 64×64) multiply and accumulate operations in each m (e.g., 64) cycle interval. Thereafter, a next set of input pixels/data (e.g., 64) is shifted-in and the previous output pixels/data is shifted-out during the same m (e.g., 64) cycle interval. Notably, each m (e.g., 64) cycle interval processes a Dd/Yd (depth) column of input and output pixels/data at a particular (i,j) location (the indexes for the width Dw/Yw and height Dh/Yh dimensions). The m (e.g., 64) cycle execution interval is repeated for each of the Dw*Dh depth columns for this stage.

In one embodiment, the filter weights or weight data are loaded into memory (e.g., the L1/L0 SRAM memories) from, for example, an external memory or processor before the stage processing started (see, e.g., the '345 and '306 applications). Moreover, in one embodiment (e.g., where m=64), the input stage has Dw=512, Dh=256, and Dd=128, and the output stage has Yw=512, Yh=256, and Yd=64. Note that only 64 of the 128 Dd input are processed in each 64×64 MAC execution operation.

With continued reference to FIG. 1A (and where m=64), the method implemented by the configuration/architecture illustrated may accommodate arbitrary image/data plane dimensions (Dw/Yw and Dh/Yh) by simply adjusting the number of iterations of the basic 64×64 MAC accumulation operation that are performed. The loop indices "I" and "j" are adjusted by control and sequencing logic circuitry to implement the dimensions of the image/data plane. Moreover, the method may also be adjusted and/or extended to handle a Yd column depth larger than the number of MAC processing elements (e.g., 64 in this illustrative example) in the execution pipeline. In one embodiment, this may be implemented by dividing the depth column of output pixels into blocks (e.g., 64), and repeating the MAC accumulation of FIG. 1A for each of these blocks.

Indeed, the method illustrated in FIG. 1A may be further extended to handle a Dd column depth larger than the number of MAC processing elements/circuits (64 in this illustrative example) in the execution pipeline. This may be implemented, in one embodiment, by initially performing a partial accumulation of a first block of 64 data of the input pixels Dijk into each output pixel Yijl. Thereafter, the partial accumulation values Yijl are read (from the memory $Y_{mem}$) back into the execution pipeline as initial values for a continuing accumulation of the next block of 64 input pixels Dijk into each output pixel Yijl. The memory which stores or holds the continuing accumulation values (e.g., L2 memory) may be organized, partitioned and/or sized to accommodate any extra read/write bandwidth to support the processing operation.

With reference to FIG. 1B, the integrated circuit may include a plurality of multi-bit MAC execution pipelines which are organized as one or more clusters of a processing component. Here, the component may include "resources" such as a bus interfaces (e.g., a PHY and/or GPIO) to facilitate communication with circuitry external to the component and memory (e.g., SRAM and DRAM) for storage and use by the circuitry of the component. For example, with reference to FIG. 1B, in one embodiment, four clusters are included in the component (labeled "X1") wherein each cluster includes a plurality of multi-bit MAC execution pipelines (in this illustrative embodiment 16 64-MAC execution pipelines). Notably, one MAC execution pipeline (which in this illustrative embodiment includes 64 MAC processing circuits) of FIG. 1A is illustrated at the lower right for reference purposes.

With continued reference to FIG. 1B, the memory hierarchy in this exemplary embodiment includes an L0 memory (e.g., SRAM) that stored filter weights or coefficients to be employed by multiplier-accumulator circuits in connection with the multiplication operations implemented thereby. In one embodiment, each MAC execution pipeline includes an L0 memory to store the filter weights or coefficients associated with the data under processing by the circuitry of the MAC execution pipeline. An L1 memory (a larger SRAM resource) is associated with each cluster of MAC execution pipelines. These two memories may store, retain and/or hold the filter weight values FijkIm employed in the accumulation operations.

Notably, the embodiment of FIG. 1B may employ an L2 memory (e.g., an SRAM memory that is larger than the SRAM of L1 or L0 memory). A network-on-chip (NOC) couples the L2 memory to the PHY (physical interface) to provide connection to an external memory (e.g., L3 memory—such as, external DRAM component(s)). The NOC also couples to a PCIe PHY which, in turn, couples to an external host. The NOC also couples to GPIO input/output PHYs, which allow multiple X1 components to be operated concurrently. (See, e.g., U.S. patent application Ser. No. 16/816,164). The control/configure circuit (referred to, at times, as "NLINK" or "NLINK circuit") connect to multiplier-accumulator circuit (which includes a plurality (here, 64) multiplier-accumulator circuits or MAC processors) to, among other things, configure the overall execution pipeline by providing or "steering" data between one or more MAC pipeline(s), via programmable or configurable interconnect paths. In addition, the control/configure circuit may configure the interconnection between the multiplier-accumulator circuit and one or more memories—including external memories (e.g., L3 memory, such as external DRAM)—that may be shared by one or more (or all) of the clusters of MAC execution pipelines. These memories may store, for example, the input image pixels Dijk, output image pixels Yijl (i.e., image data processed via the circuitry of the MAC pipeline(s), as well as filter weight values Fijklm employed in connection with such data processing).

Notably, although the illustrative or exemplary embodiments described and/or illustrated a plurality of different memories (e.g., L3 memory, L2 memory, L1 memory, L0 memory) which are assigned, allocated and/or used to store certain data and/or in certain organizations, one or more of other memories may be added, and/or one or more memories may be omitted and/or combined/consolidated—for example, the L3 memory or L2 memory, and/or the organizations may be changed, supplemented and/or modified. The inventions are not limited to the illustrative/exemplary embodiments of the memory organization and/or allocation set forth in the application (i.e., text and drawings). All combinations are intended to fall within the scope of the present inventions.

As mentioned above, in the illustrative embodiments set forth herein (text and drawings), the multiplier-accumulator circuit(s) and/or circuitry, and/or multiplier-accumulator circuit pipeline is, at times, labeled "MAC", "MAC circuit", "MAC pipeline" or "MAC execution pipeline", "MAC processing pipeline" or the like.

With continued reference to FIG. 1B, in one embodiment, the integrated circuit(s) includes a plurality of clusters (e.g., two, four or eight) wherein each cluster includes a plurality of MAC execution pipelines (e.g., 16) wherein each pipeline includes a plurality of MACs (e.g., 64), for example, serially interconnected into a linear pipeline. Each MAC of the MAC execution pipeline performs a plurality of multiply and accumulate operations. The plurality of MACs of a MAC execution pipeline of a cluster may be arranged in one or more rows or columns (collectively hereinafter "rows"). In one embodiment, a plurality of rows of MACs of a cluster and/or one or more rows of MACs a plurality of clusters are interconnected to form a processing pipeline (a linear processing pipeline including a plurality of serially interconnected MACs). The integrated circuit (or portion thereof) or component (such integrated circuit (or portion thereof) is often identified in the figures as "X1" or "X1 component") that may include memory (e.g., SRAM, MRAM and/or Flash), a switch interconnect network to interconnect circuitry of the component (e.g., the multiplier-accumulator circuits and/or MAC execution pipeline(s) of the X1 component) and/or circuitry to interconnect with circuitry of one or more other X1 components or other circuitry (external to the component). Here, the multiplier-accumulator circuits of the one or more MAC execution pipelines of a plurality of clusters of a X1 component may be configured to concurrently process related data (e.g., image data). That is, the plurality of separate multiplier-accumulator circuits of a plurality of MAC execution pipelines may concurrently process related data to, for example, increase the data throughput of the X1 component.

Notably, in one embodiment, the X1 component also includes interface circuitry (e.g., PHY and/or GPIO circuitry) to interface with, for example, external memory (e.g., DRAM, MRAM, SRAM and/or Flash memory).

In one embodiment, the MAC execution pipeline may be any size or length (e.g., 16, 32, 64, 96 or 128 multiplier-accumulator circuits). Indeed, the size or length of the pipeline may be configurable or programmable (e.g., one-time or multiple times—such as, in situ (i.e., during operation of the integrated circuit) and/or at or during power-up, start-up, initialization, re-initialization, configuration, re-configuration or the like).

In another embodiment, the one or more integrated circuits include a plurality of components or X1 components (e.g., 2, 4, . . . ), wherein each component includes a plurality of the clusters having a plurality of MAC execution pipelines. For example, in one embodiment, one integrated circuit includes a plurality of components or X1 components (e.g., 4) wherein each cluster includes a plurality of execution or processing pipelines (e.g., 16, 32 or 64) which may be configured or programmed to process, function and/or operate concurrently to process related data (e.g., image data) concurrently. In this way, the related data is processed by each of the execution pipelines of a plurality of the clusters concurrently to, for example, decrease the processing time of the related data and/or increase data throughput of the X1 components.

As discussed in the '164 and '413 applications, both of which are incorporated by reference herein in their entirety, a plurality of execution or processing pipelines of one or more clusters of a plurality of the X1 components may be interconnected to process data (e.g., image data). In one embodiment, such execution or processing pipelines may be interconnected in a ring configuration or architecture to concurrently process related data. Here, a plurality of MAC execution pipelines of one or more (or all) of the clusters of a plurality of X1 components (which may be integrated/manufactured on a single die or multiple dice) may be interconnected in a ring configuration or architecture (wherein a bus interconnects the components) to concurrently process related data. For example, a plurality of MAC execution pipelines of one or more (or all) of the clusters of each X1 component are configured to process one or more stages of an image frame such that circuitry of each X1 component processes one or more stages of each image frame of a plurality of image frames. In another embodiment, a plurality of MAC execution pipelines of one or more (or all) of the clusters of each X1 component are configured to process one or more portions of each stage of each image frame such that circuitry of each X1 component is configured to process a portion of each stage of each image frame of a plurality of image frames. In yet another embodiment, a plurality of MAC execution pipelines of one or more (or all) of the clusters of each X1 component are configured to process all of the stages of at least one entire image frame such that circuitry of each X1 component is configured to process all of the stage of at least one image frame. Here, each X1 component is configured to process all of the stages of one or more image frames such that the circuitry of each X1 component processes a different image frame. (See, e.g., the '164 application).

As mentioned above, there are many inventions described and illustrated herein. The present inventions are neither limited to any single aspect nor embodiment thereof, nor to any combinations and/or permutations of such aspects and/or embodiments. Moreover, each of the aspects of the present inventions, and/or embodiments thereof, may be employed alone or in combination with one or more of the other aspects of the present inventions and/or embodiments thereof. For the sake of brevity, certain permutations and combinations are not discussed and/or illustrated in detail separately herein.

BRIEF DESCRIPTION OF THE DRAWINGS

The present inventions may be implemented in connection with embodiments illustrated in the drawings hereof. These drawings show different aspects of the present inventions and, where appropriate, reference numerals, nomenclature, or names illustrating like circuits, architectures, structures, components, materials and/or elements in different figures are labeled similarly. It is understood that various combinations of the structures, components, materials and/or elements, other than those specifically shown, are contemplated and are within the scope of the present inventions.

Moreover, there are many inventions described and illustrated herein. The present inventions are neither limited to any single aspect nor embodiment thereof, nor to any combinations and/or permutations of such aspects and/or embodiments. Moreover, each of the aspects of the present inventions, and/or embodiments thereof, may be employed alone or in combination with one or more of the other aspects of the present inventions and/or embodiments thereof. For the sake of brevity, certain permutations and combinations are not discussed and/or illustrated separately herein. Notably, an embodiment or implementation described herein as "exemplary" is not to be construed as preferred or advantageous, for example, over other embodiments or implementations; rather, it is intended reflect or indicate the embodiment(s) is/are "example" embodiment(s).

Figure 2A:
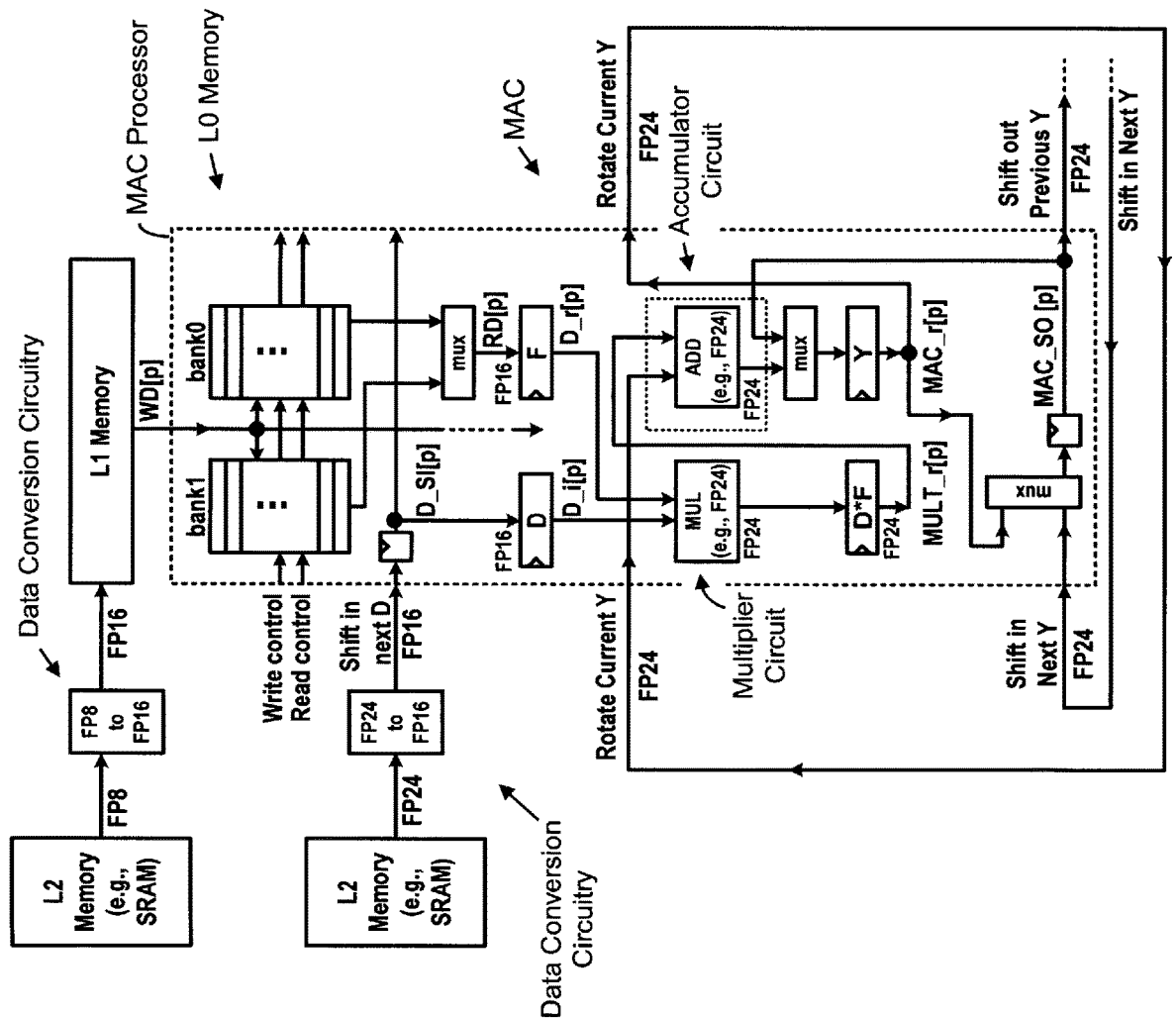

Notably, the configurations, block/data/signal width, data/signal path width, bandwidths, data lengths, values, processes, pseudo-code, operations, and/or algorithms described herein and/or illustrated in the FIGURES, and text associated therewith, are exemplary. Indeed, the inventions are not limited to any particular or exemplary circuit, logical, block, functional and/or physical diagrams, number of multiplier-accumulator circuits employed in an execution pipeline, number of execution pipelines employed in a particular processing configuration, organization/allocation of memory, block/data width, data path width, bandwidths, values, processes, pseudo-code, operations, and/or algorithms illustrated and/or described in accordance with, for example, the exemplary circuit, logical, block, functional and/or physical diagrams. Moreover, although the illustrative/exemplary embodiments include a plurality of memories (e.g., L3 memory, L2 memory, L1 memory, L0 memory) which are assigned, allocated and/or used to store certain data (e.g., filter weights) and/or in certain organizations. Indeed, the organizations of the memories may be changed wherein one or more of memories may be added, and/or one or more memories may be omitted and/or combined/consolidated with other memories—for example, (i) the L3 memory or L2 memory and/or (ii) the L1 memory or L0 memory. Again, the inventions are not limited to the illustrative/exemplary embodiments set forth herein.

Figure 2B:
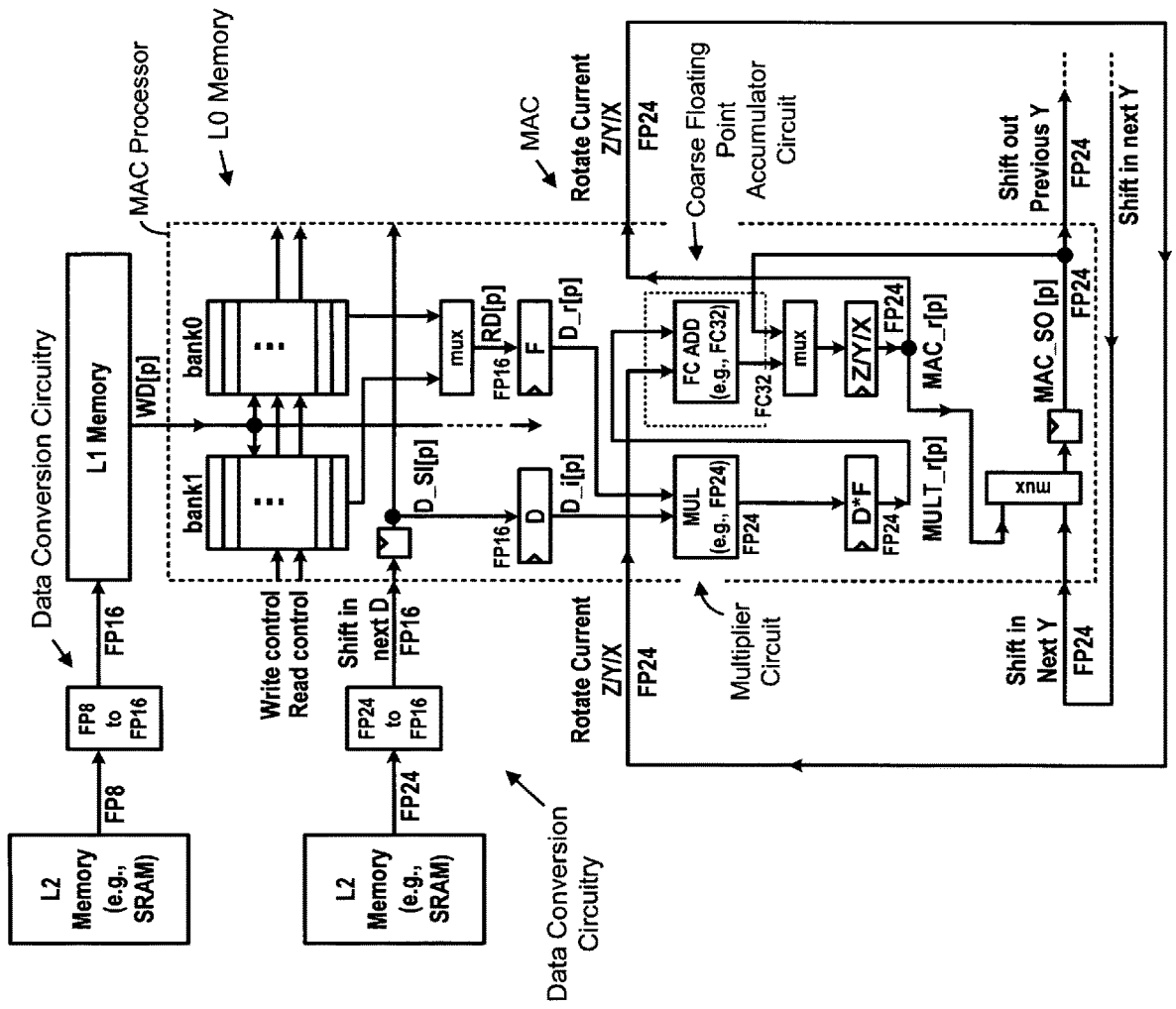
Figure 2C:
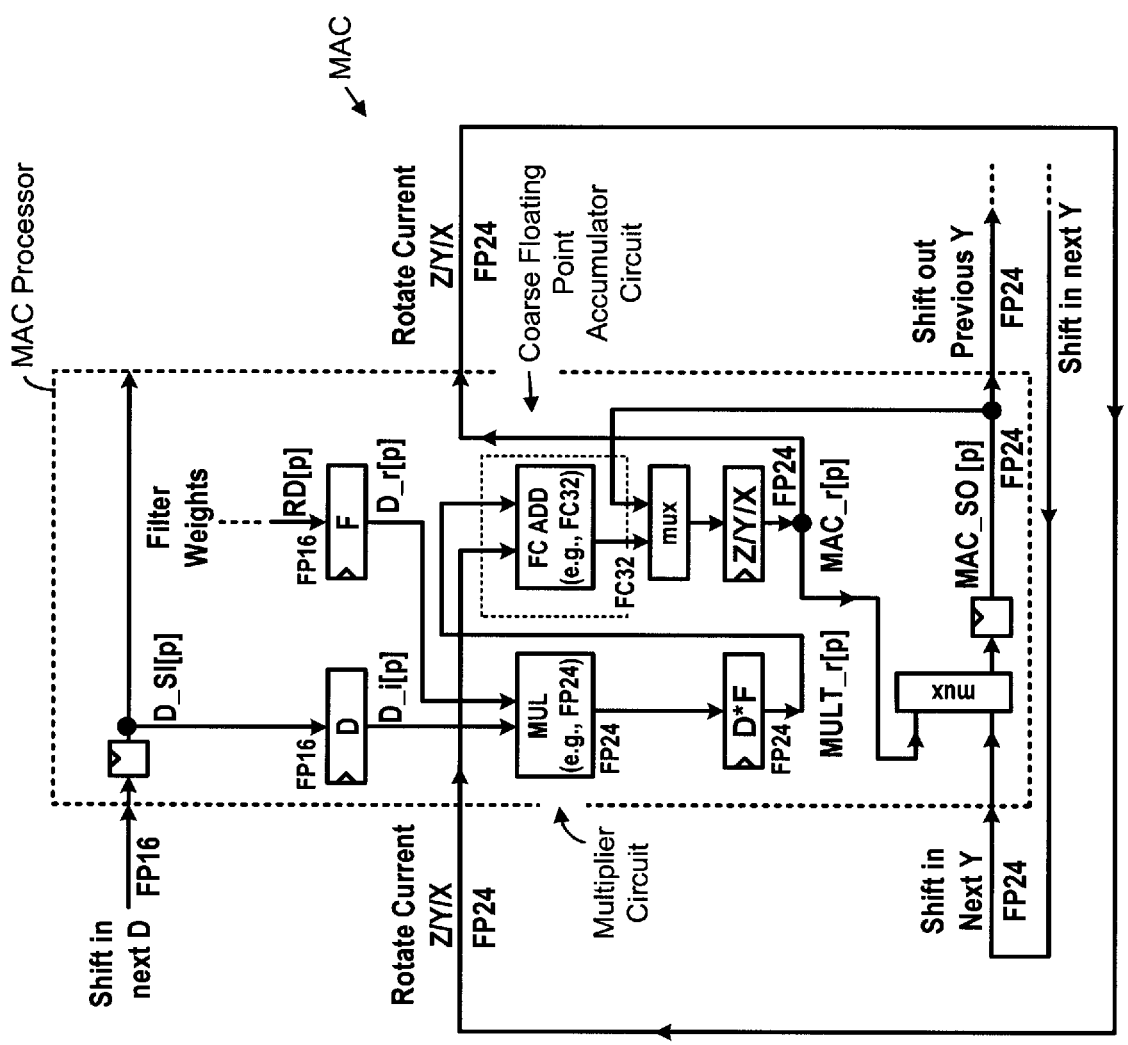
Figure 2D:
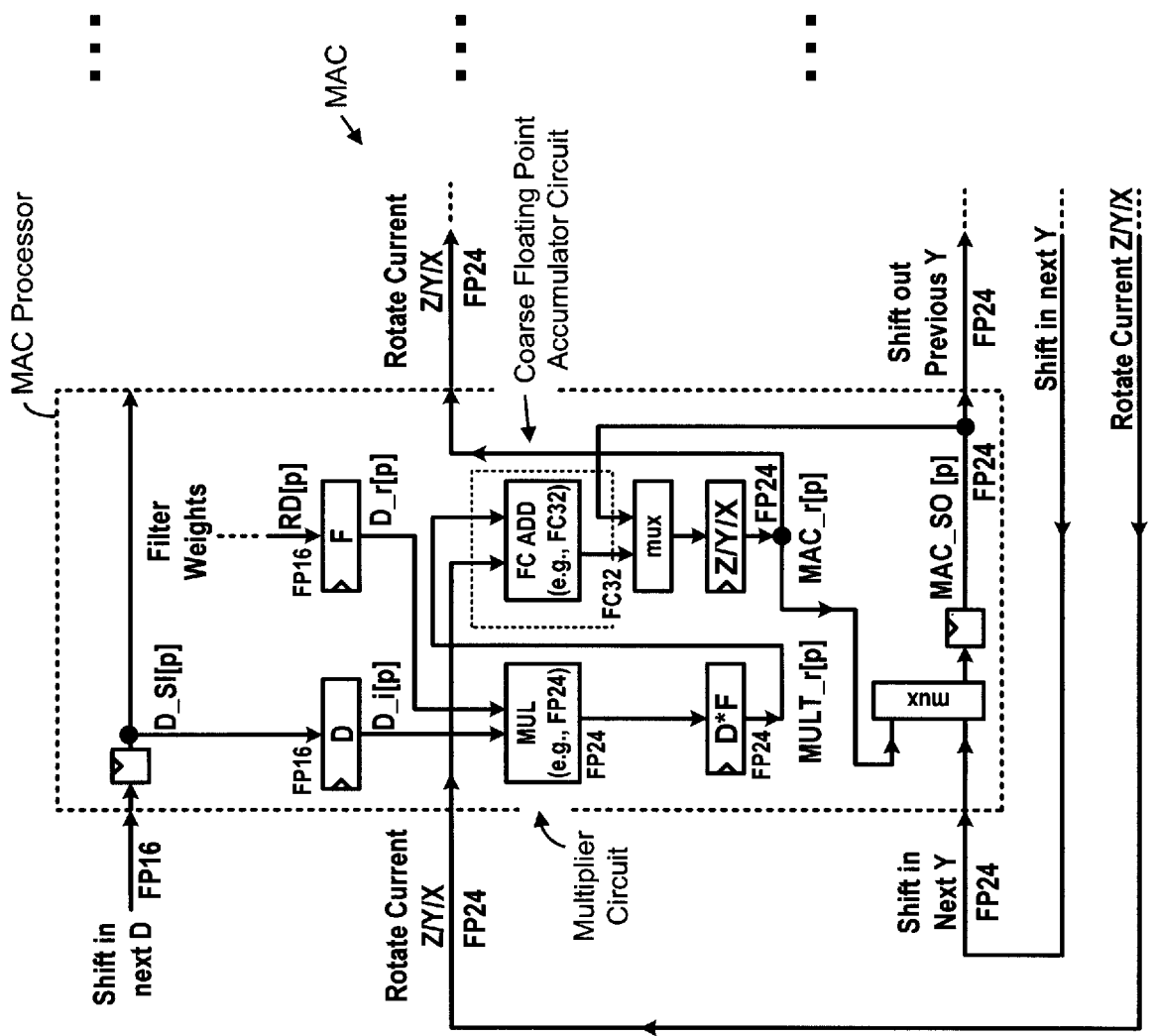
Figure 2E:
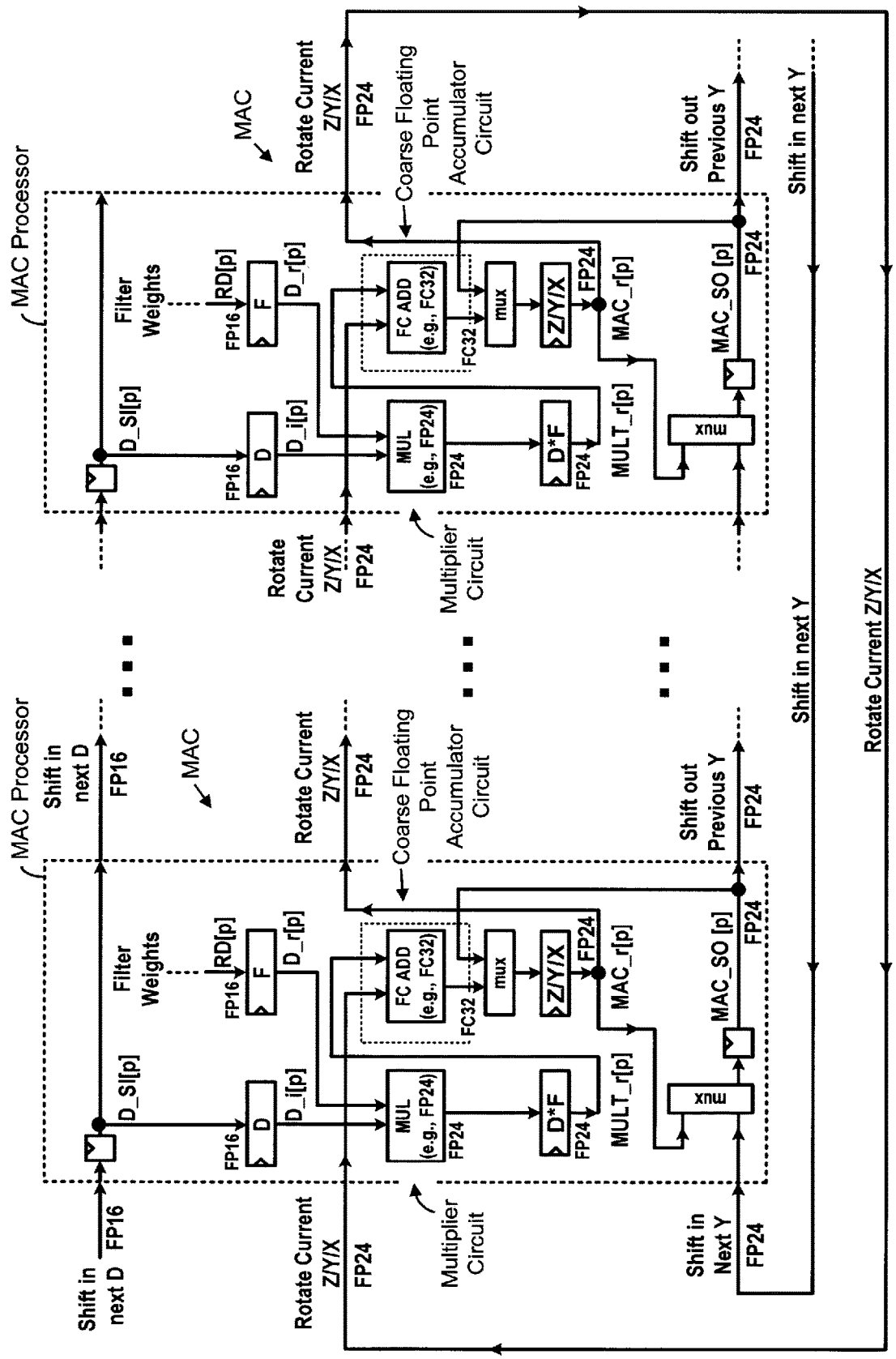
Figure 3:
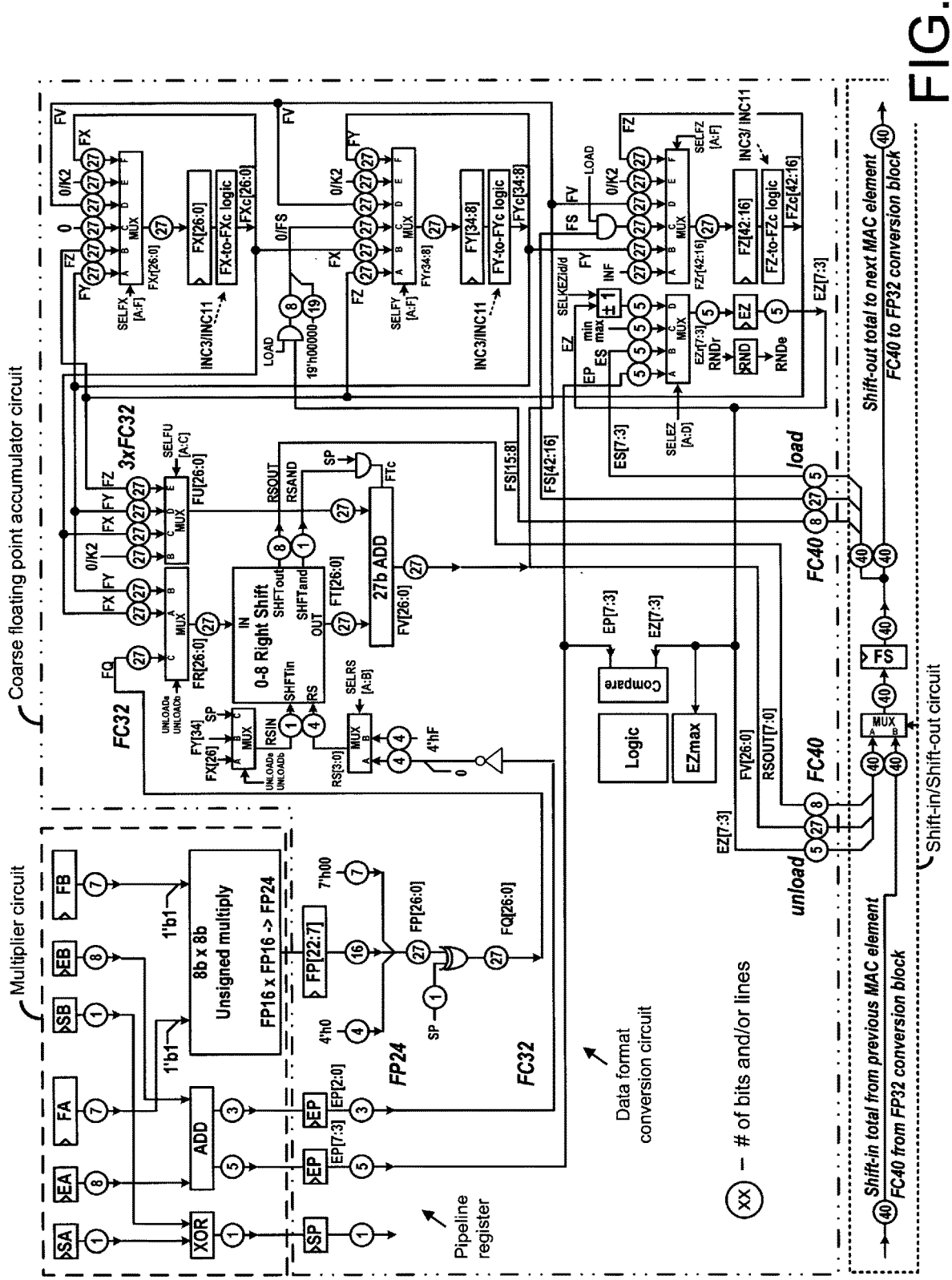
Figure 4:
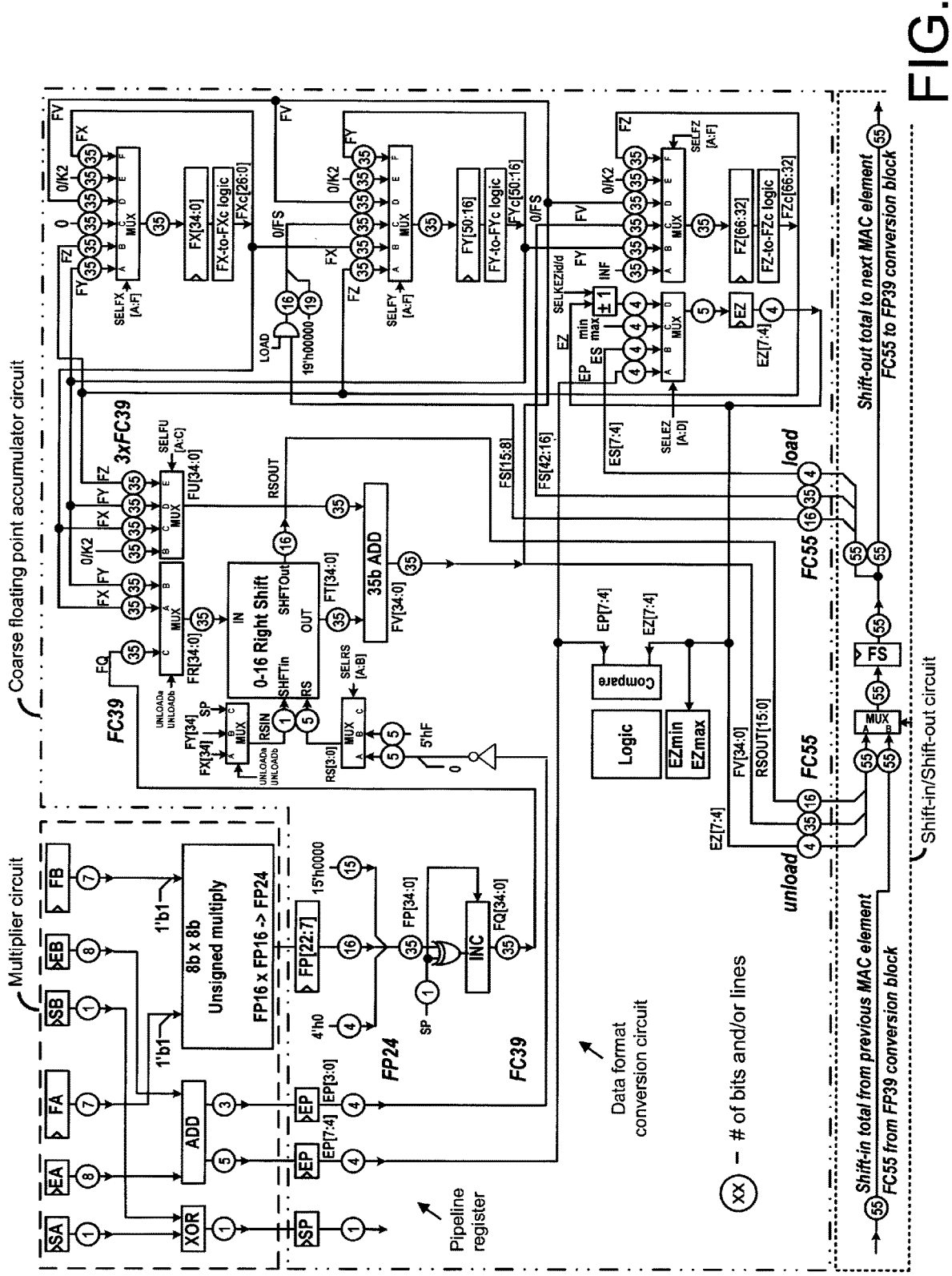
Figure 5:
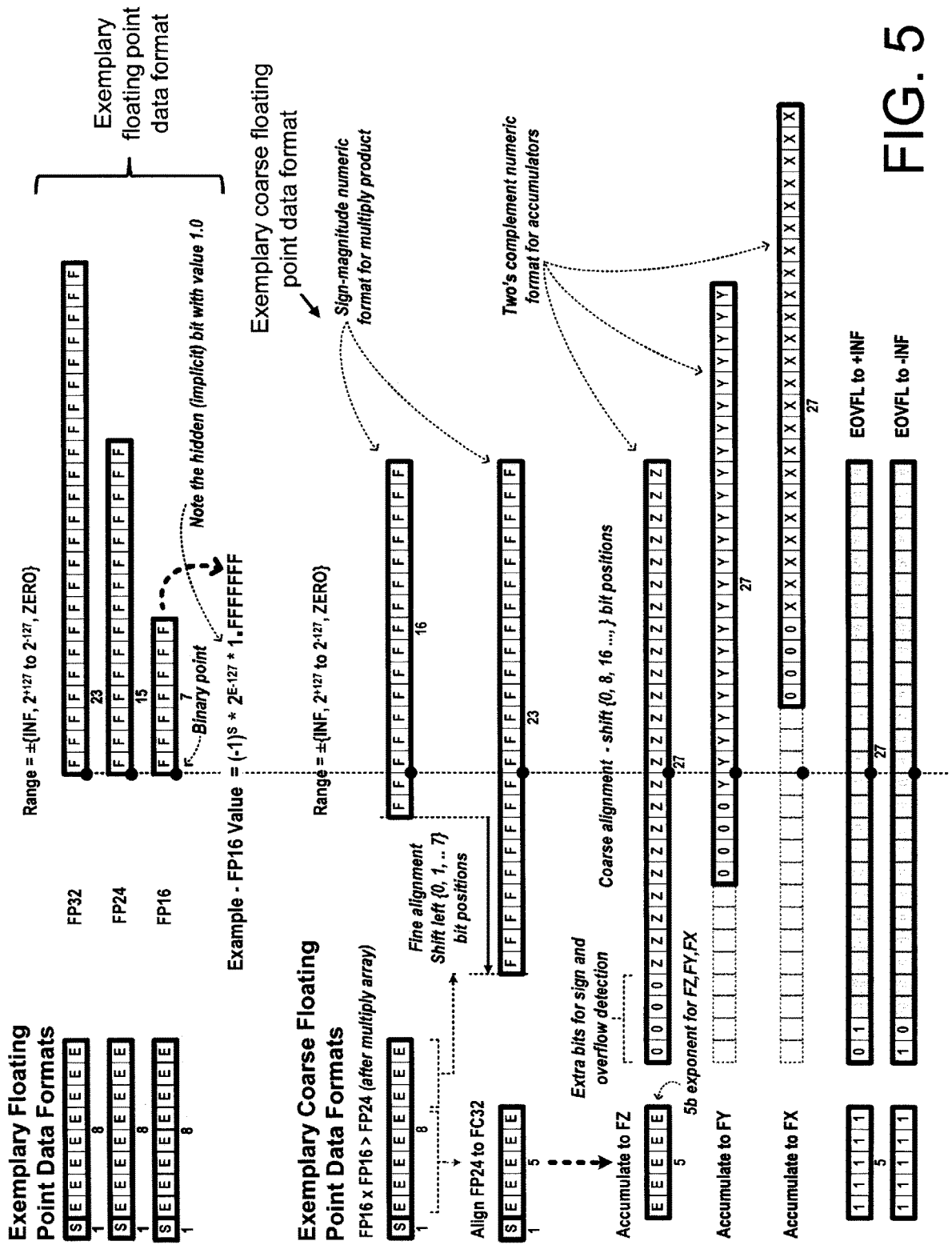
Figure 6:
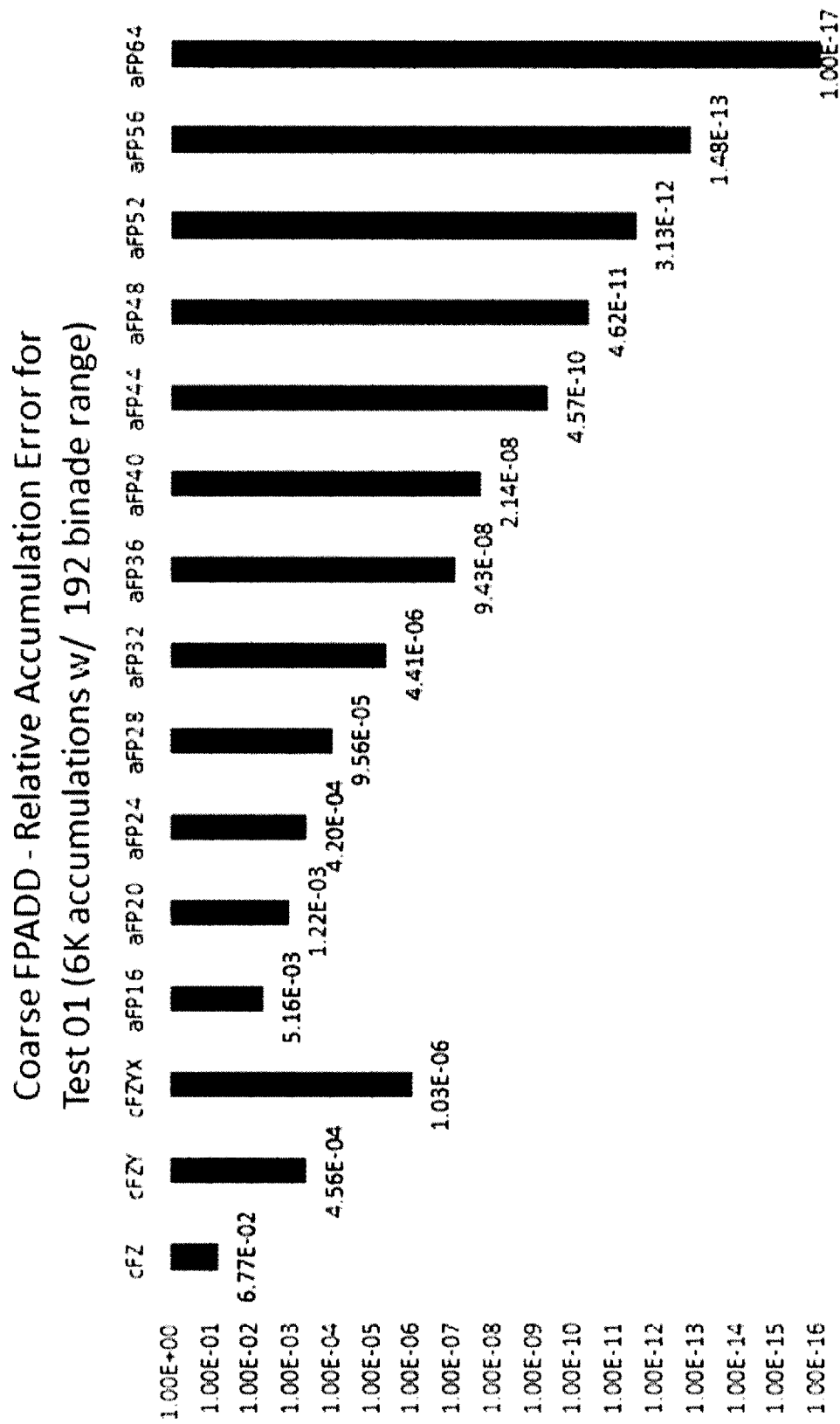
Figure 7C:
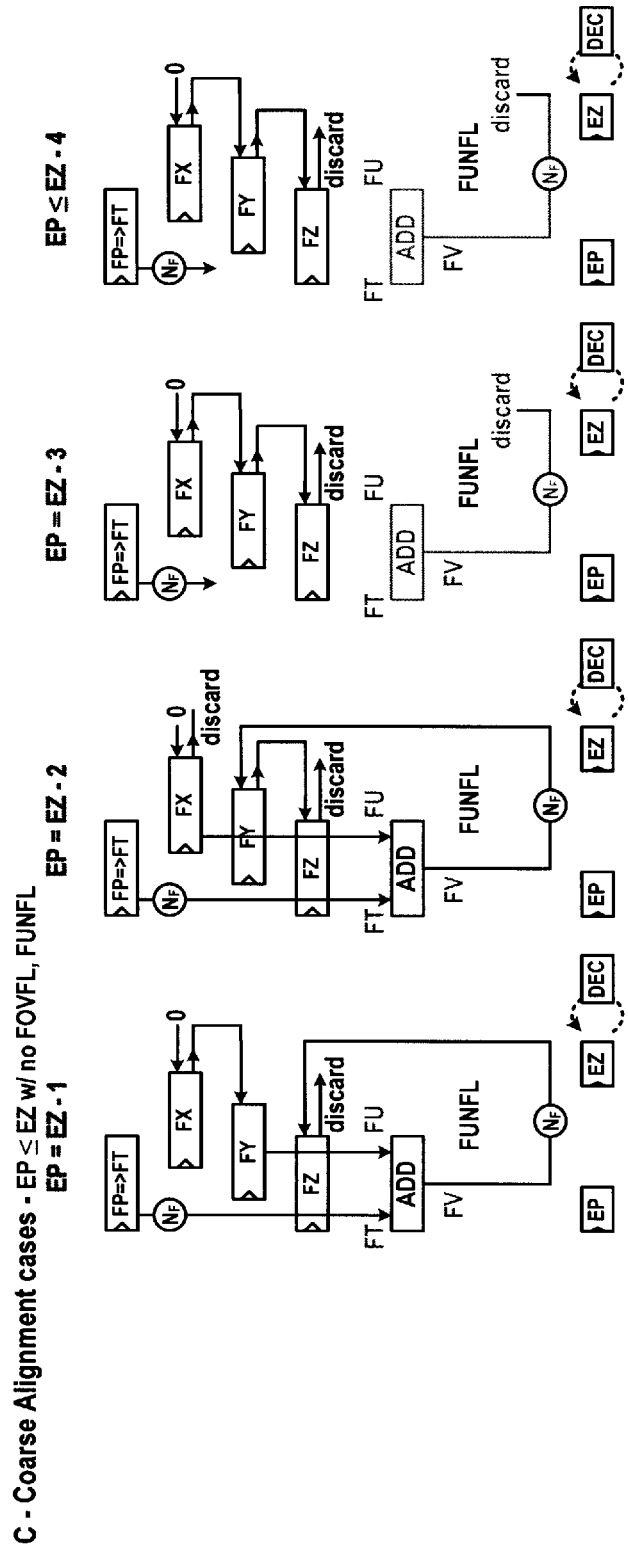
Figure 8C:
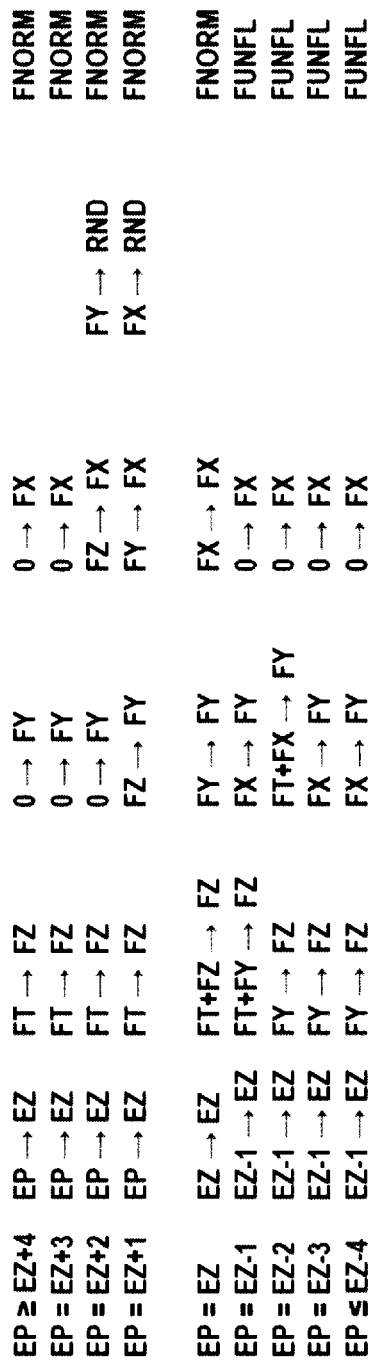
Figure 9A:
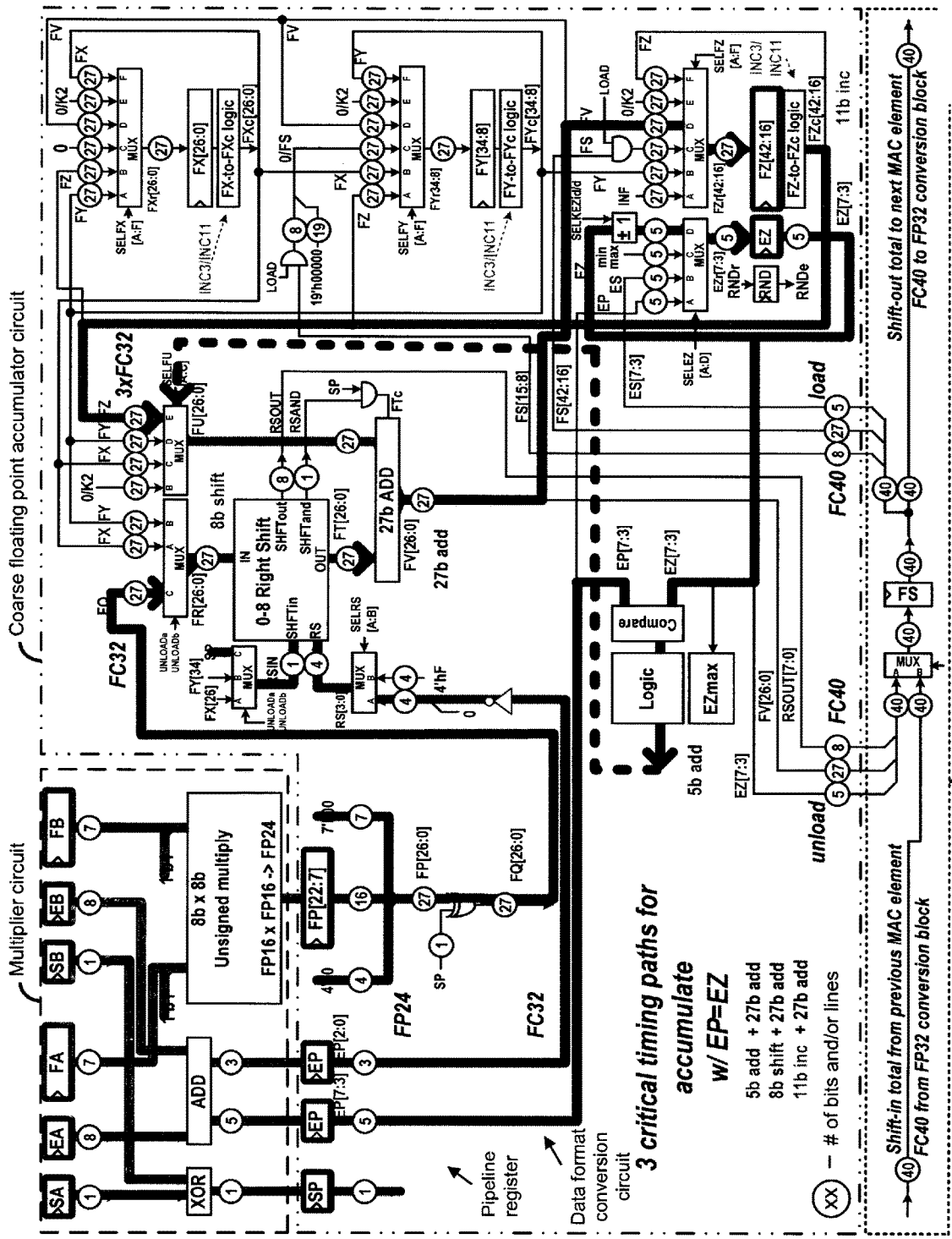
Figure 9B:
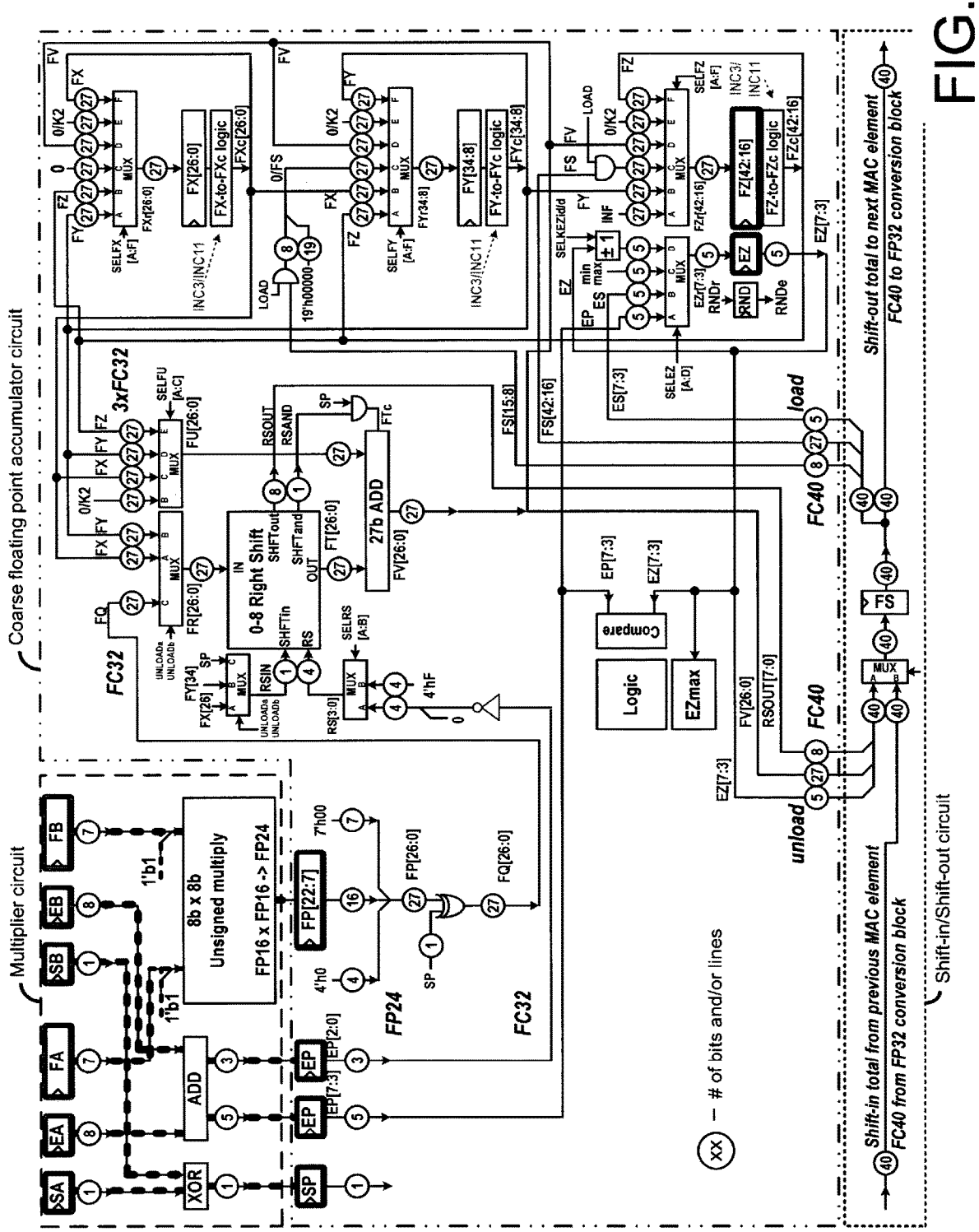
Figure 9C:
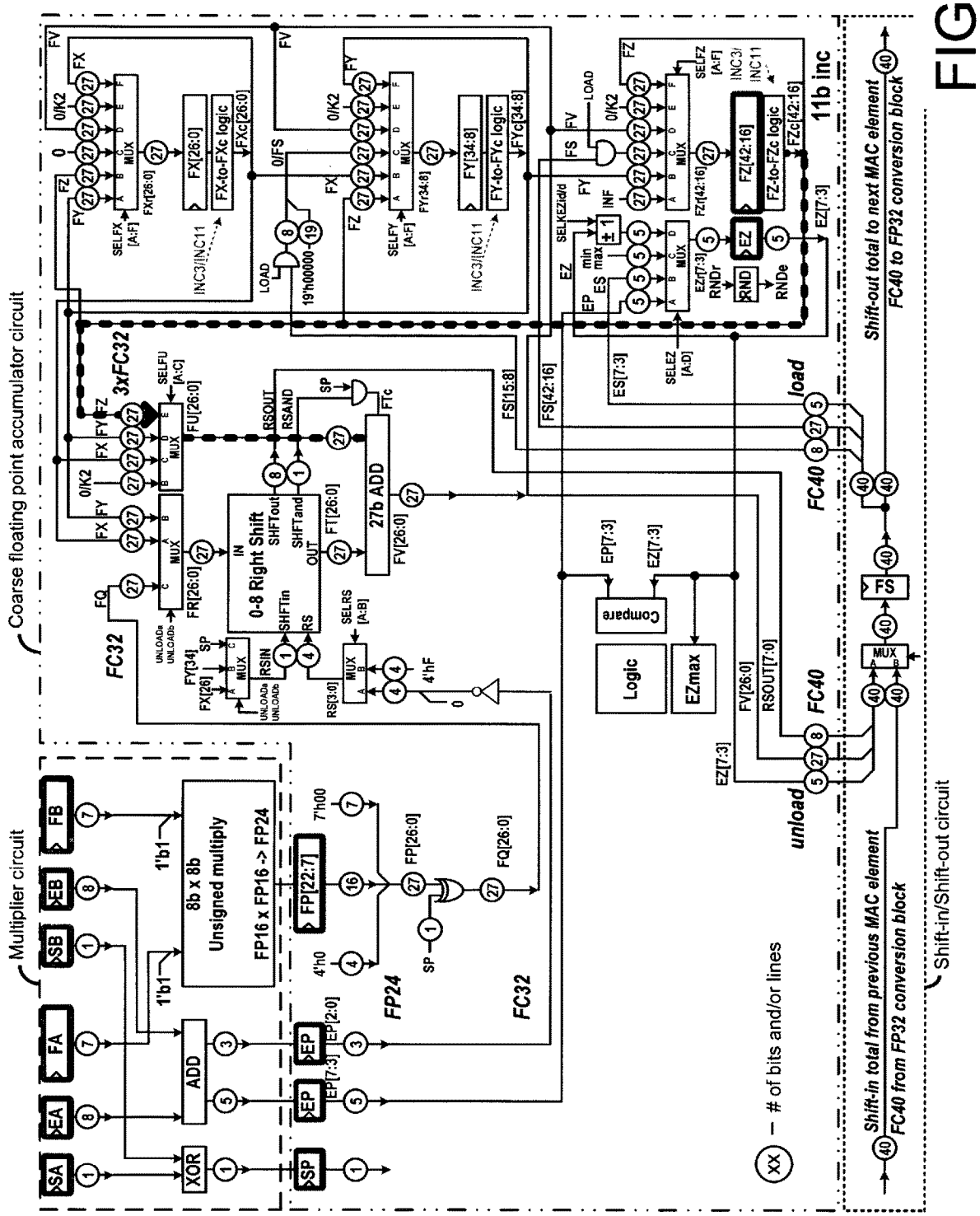
Figure 9D:
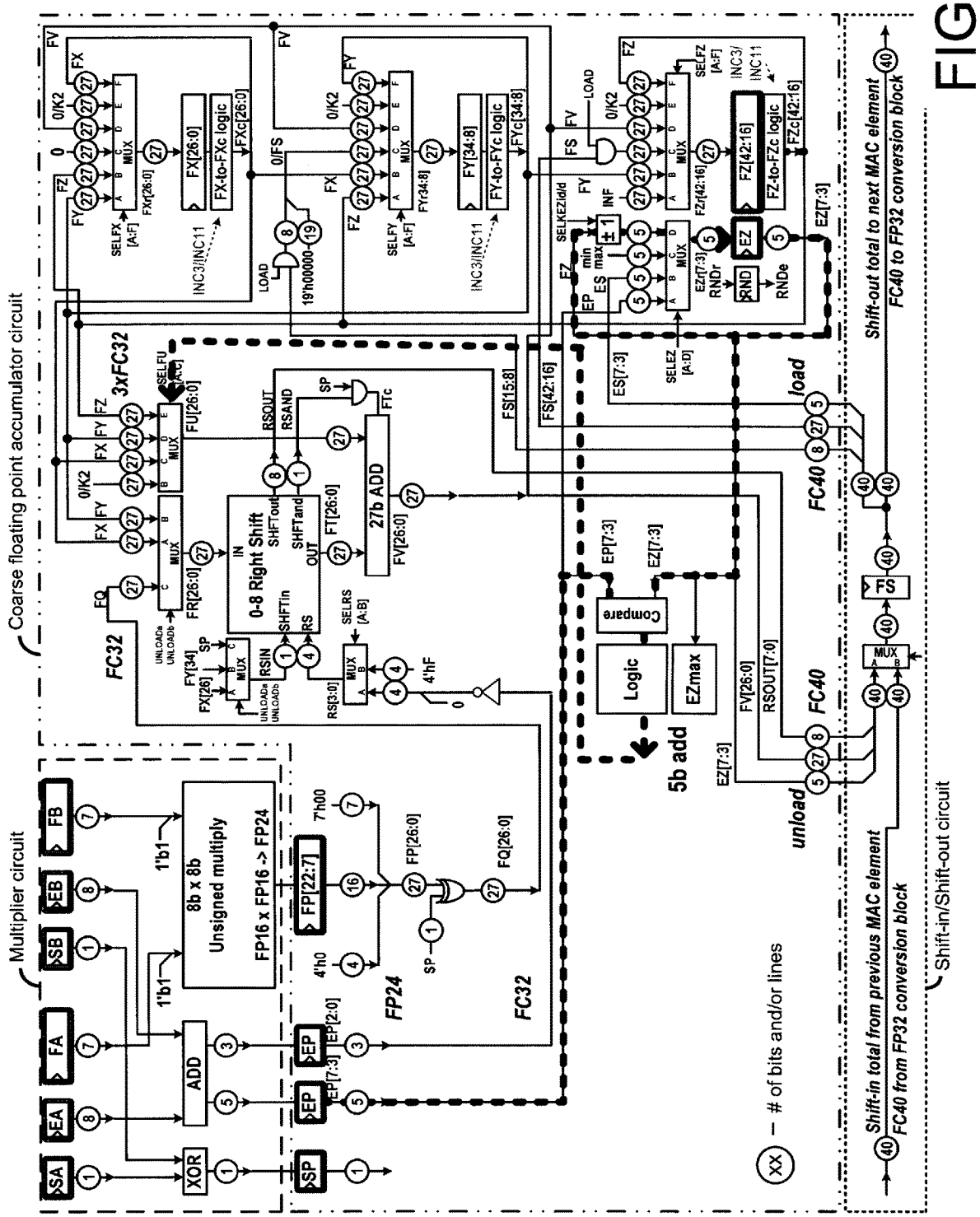
Figure 9E:
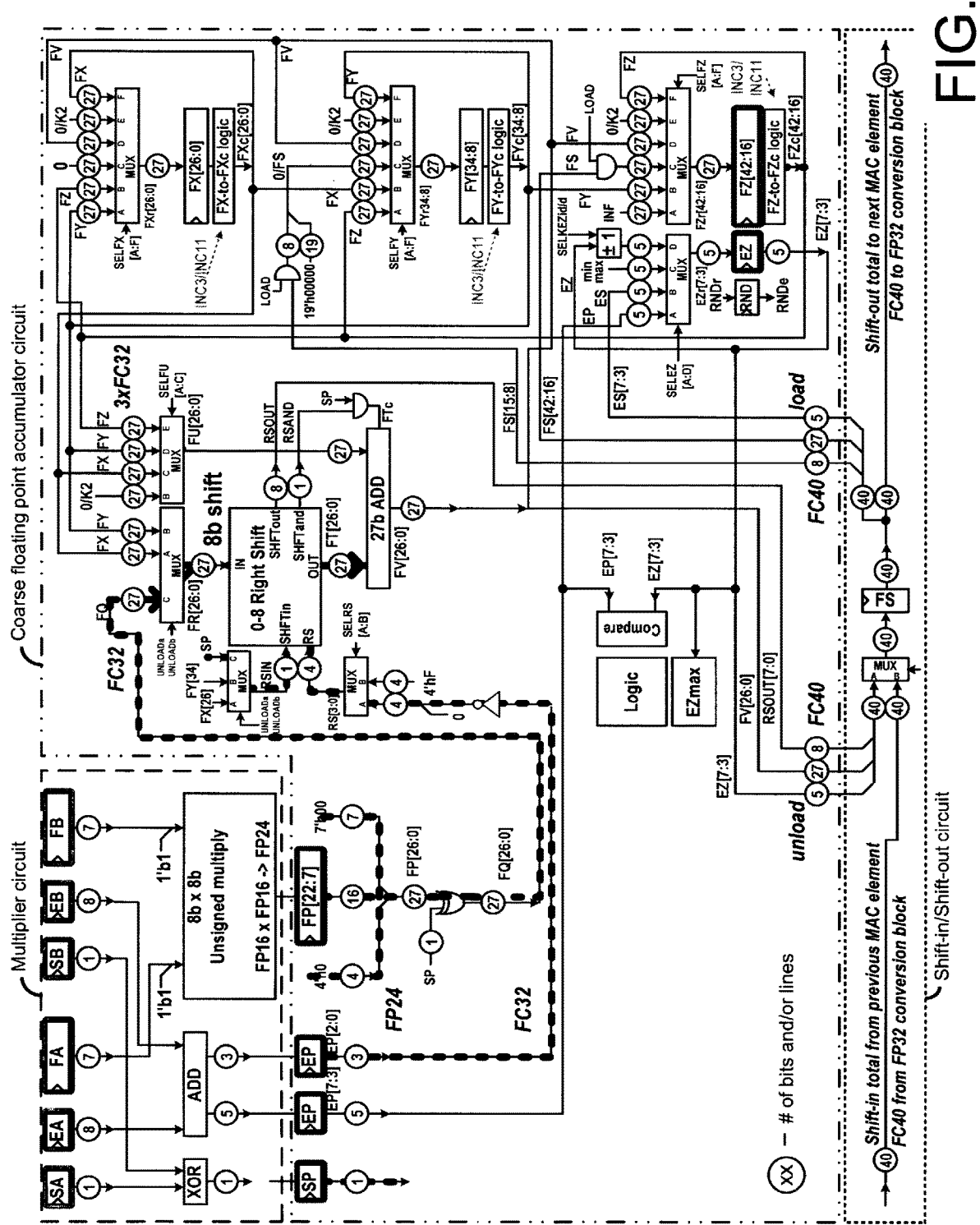
Figure 9F:
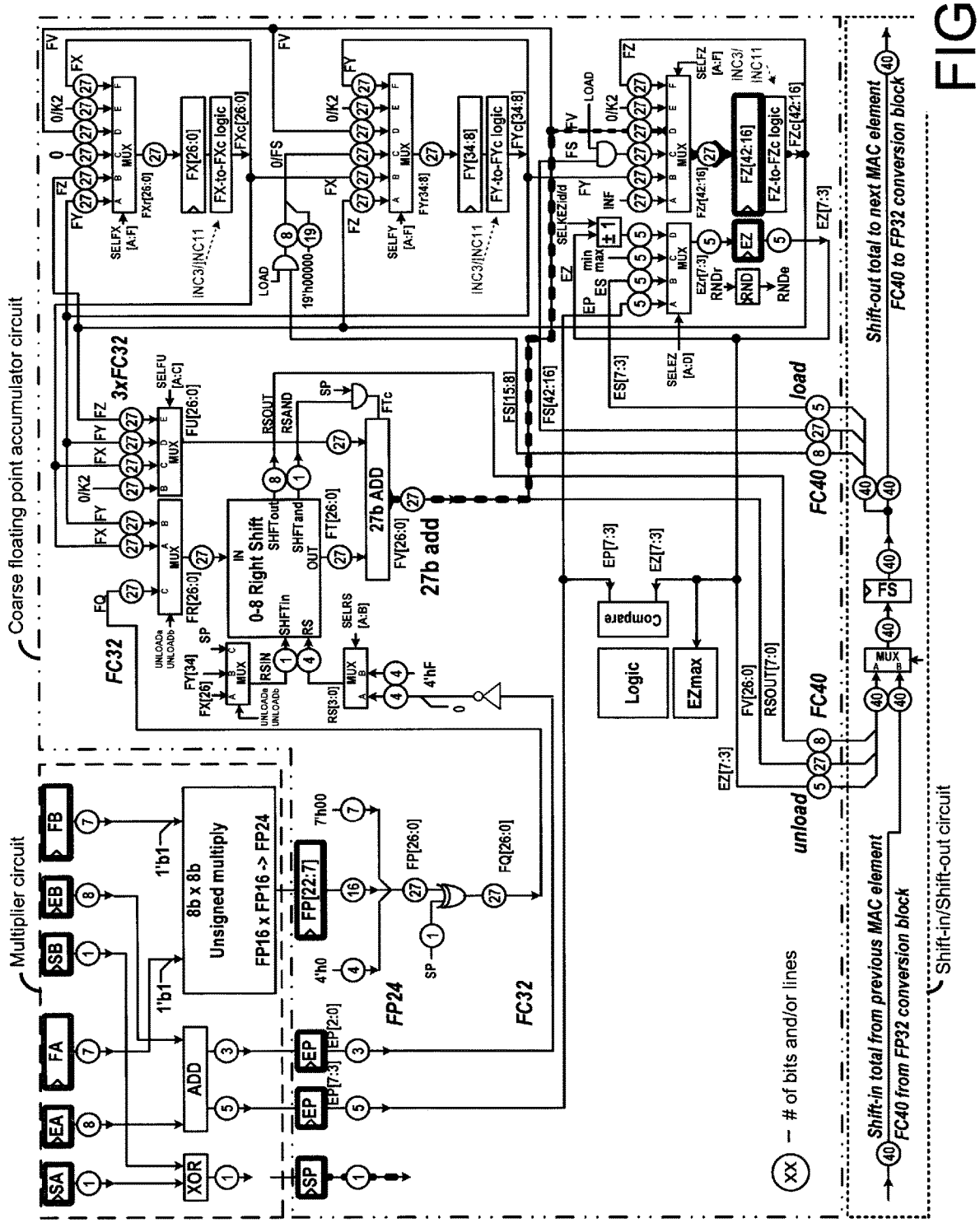
Figure 10:
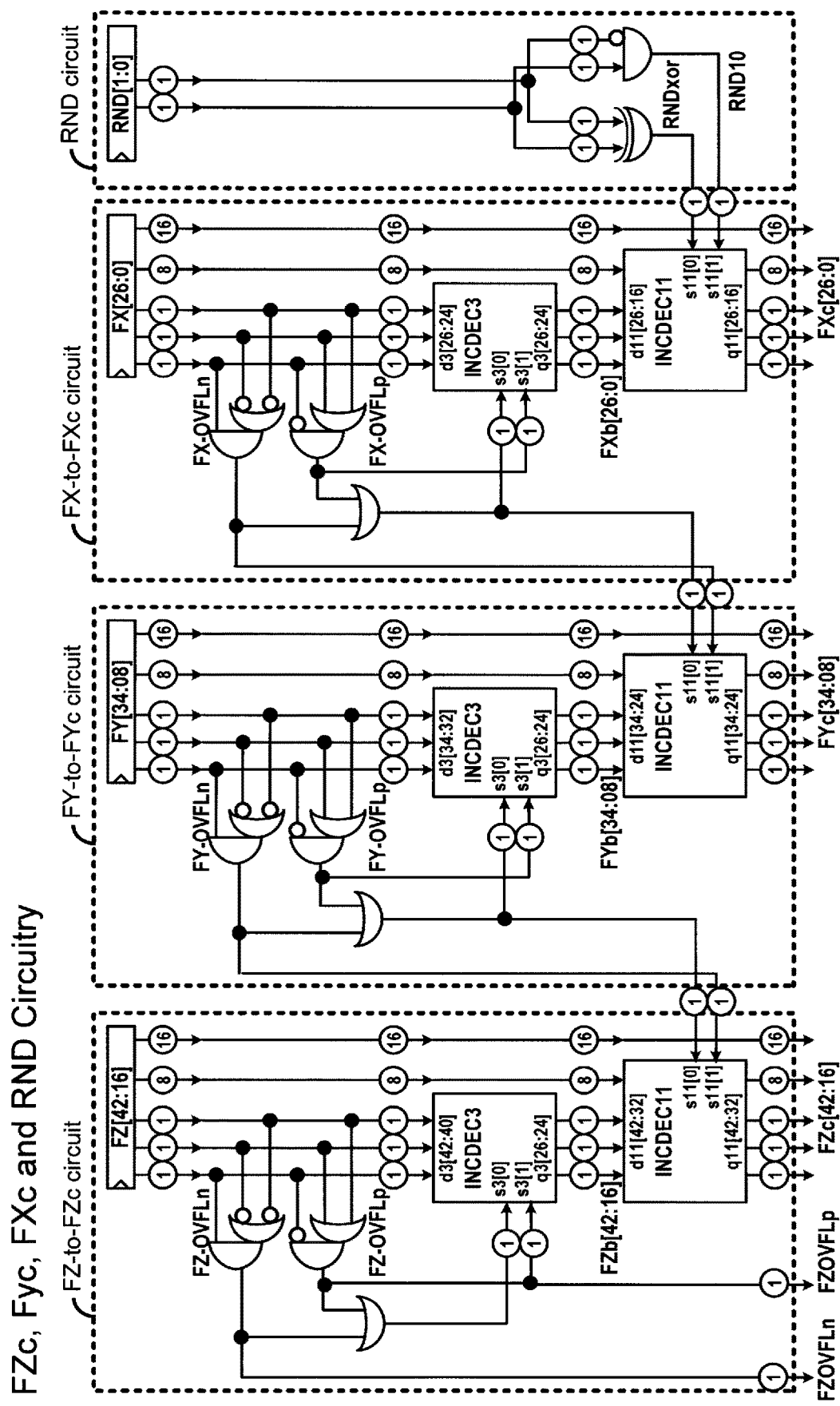
Figure 11:
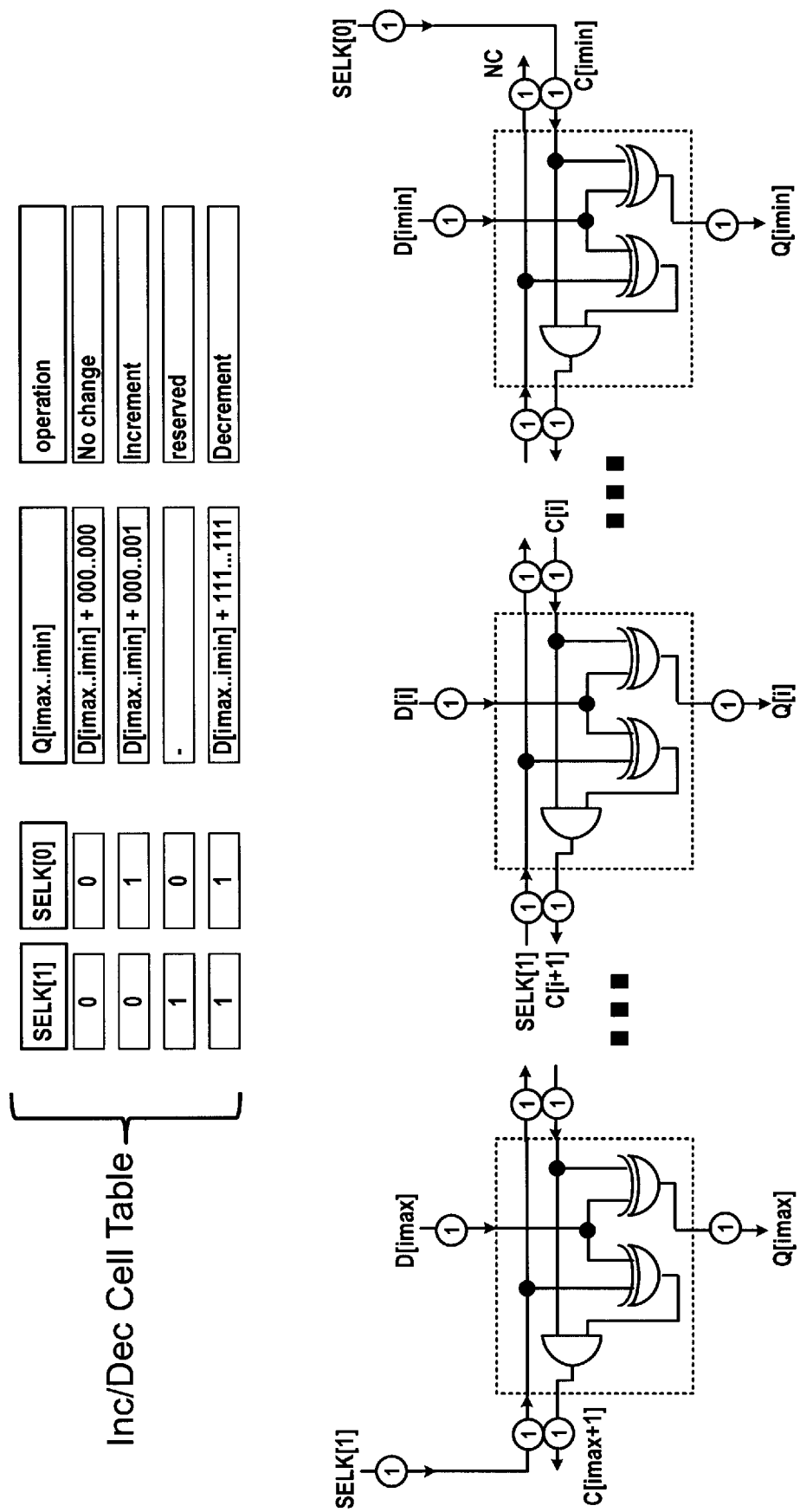
Figure 12A:
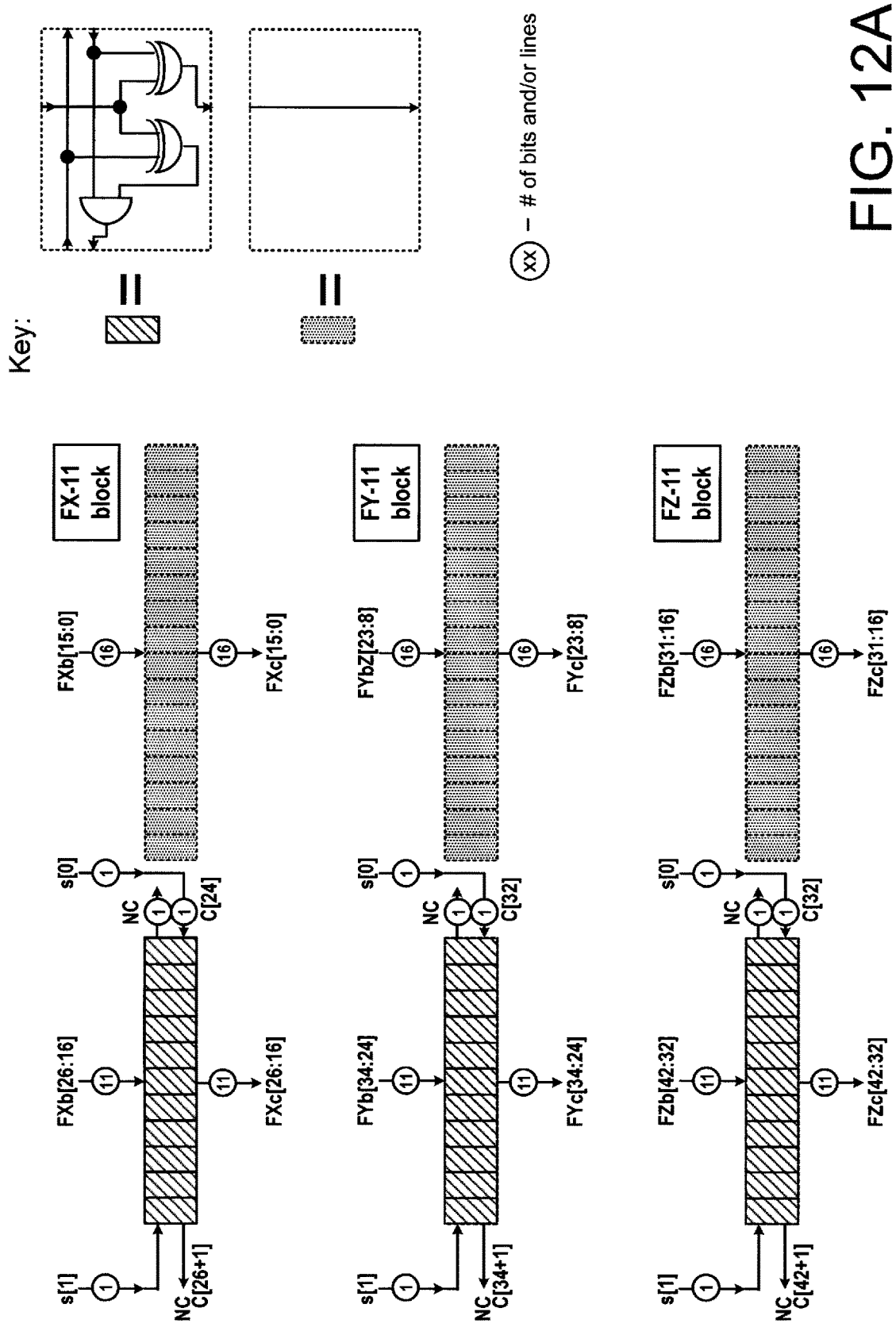
Figure 13:
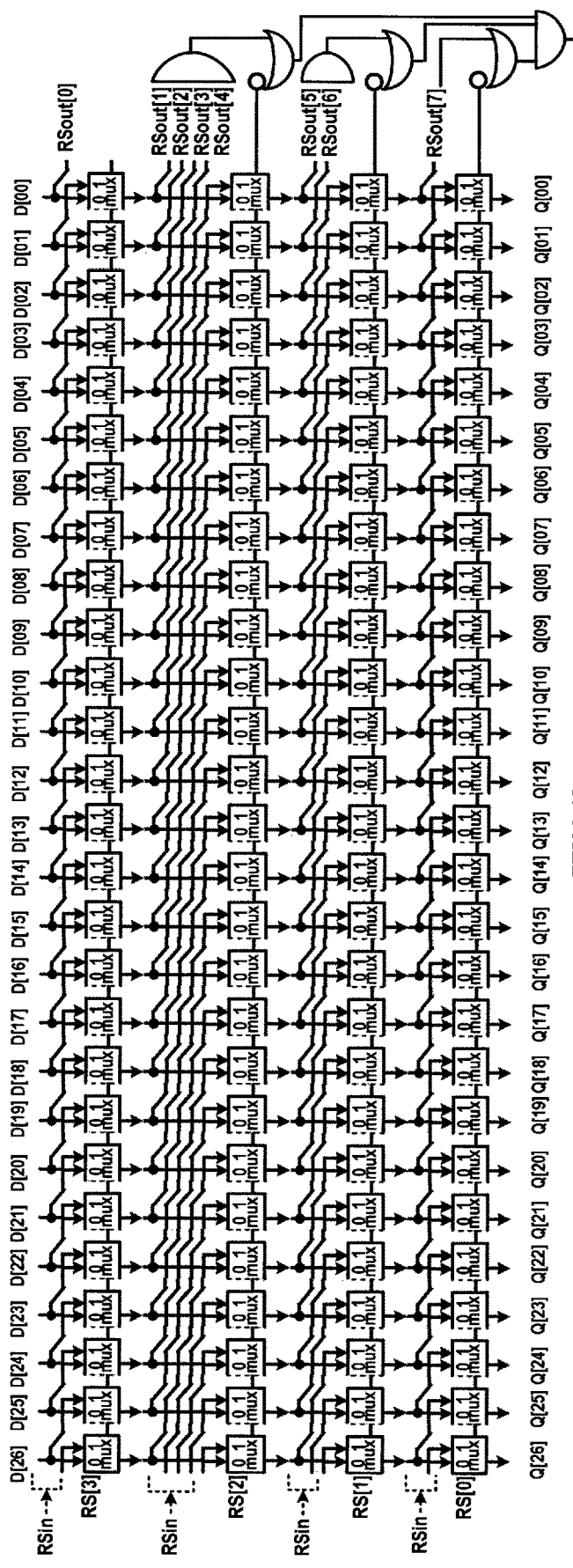
Figure 15A:
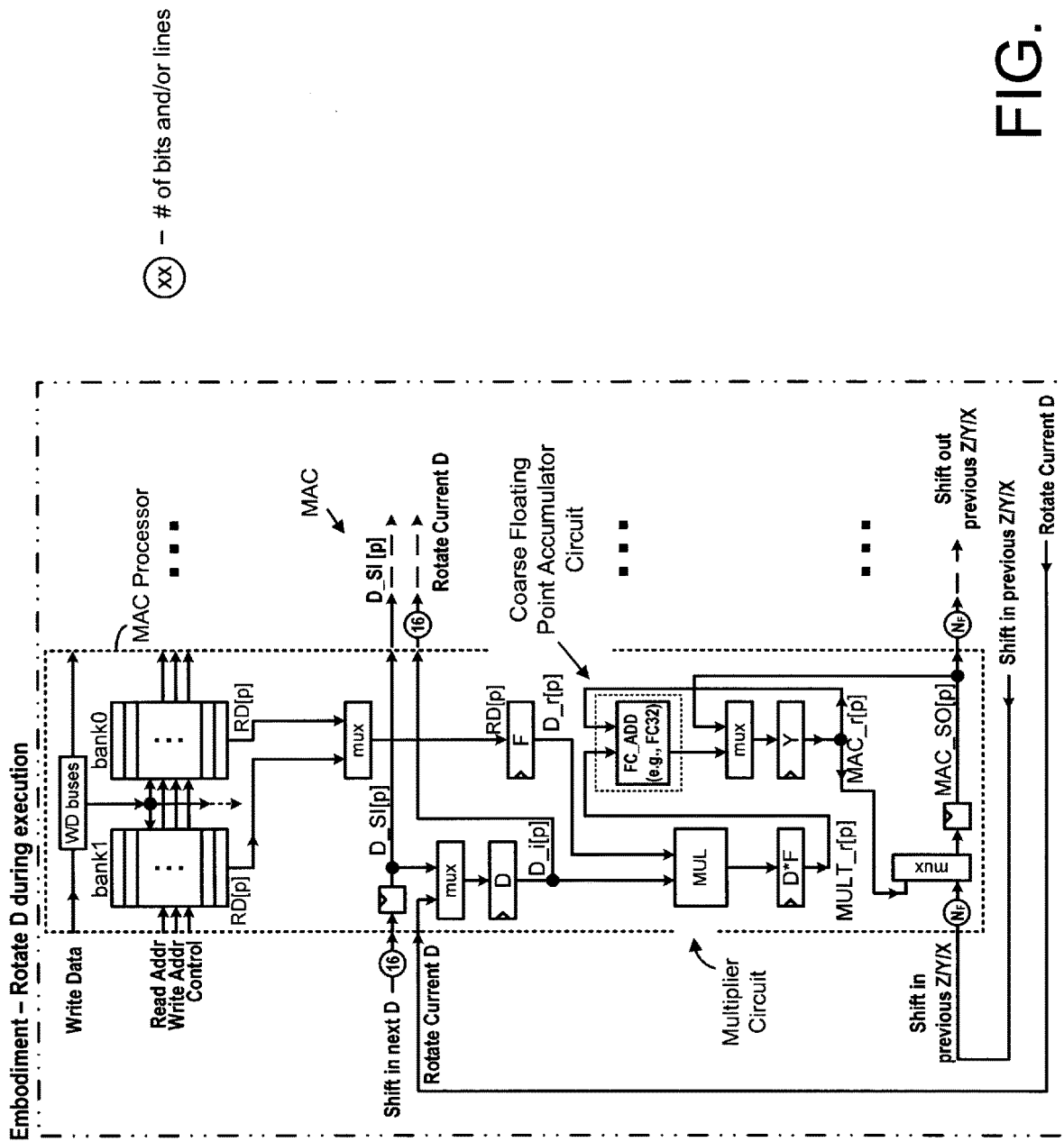
Figure 15B:
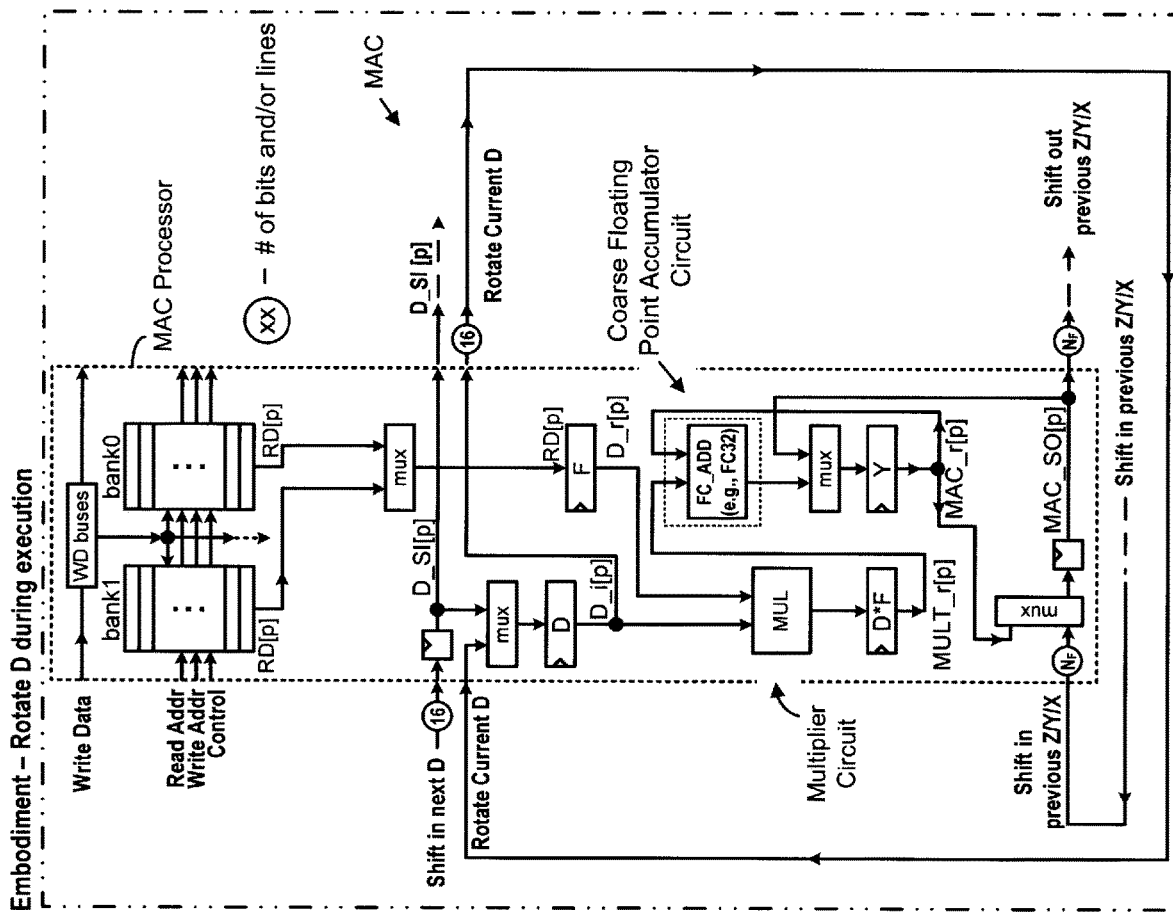
Figure 15C:
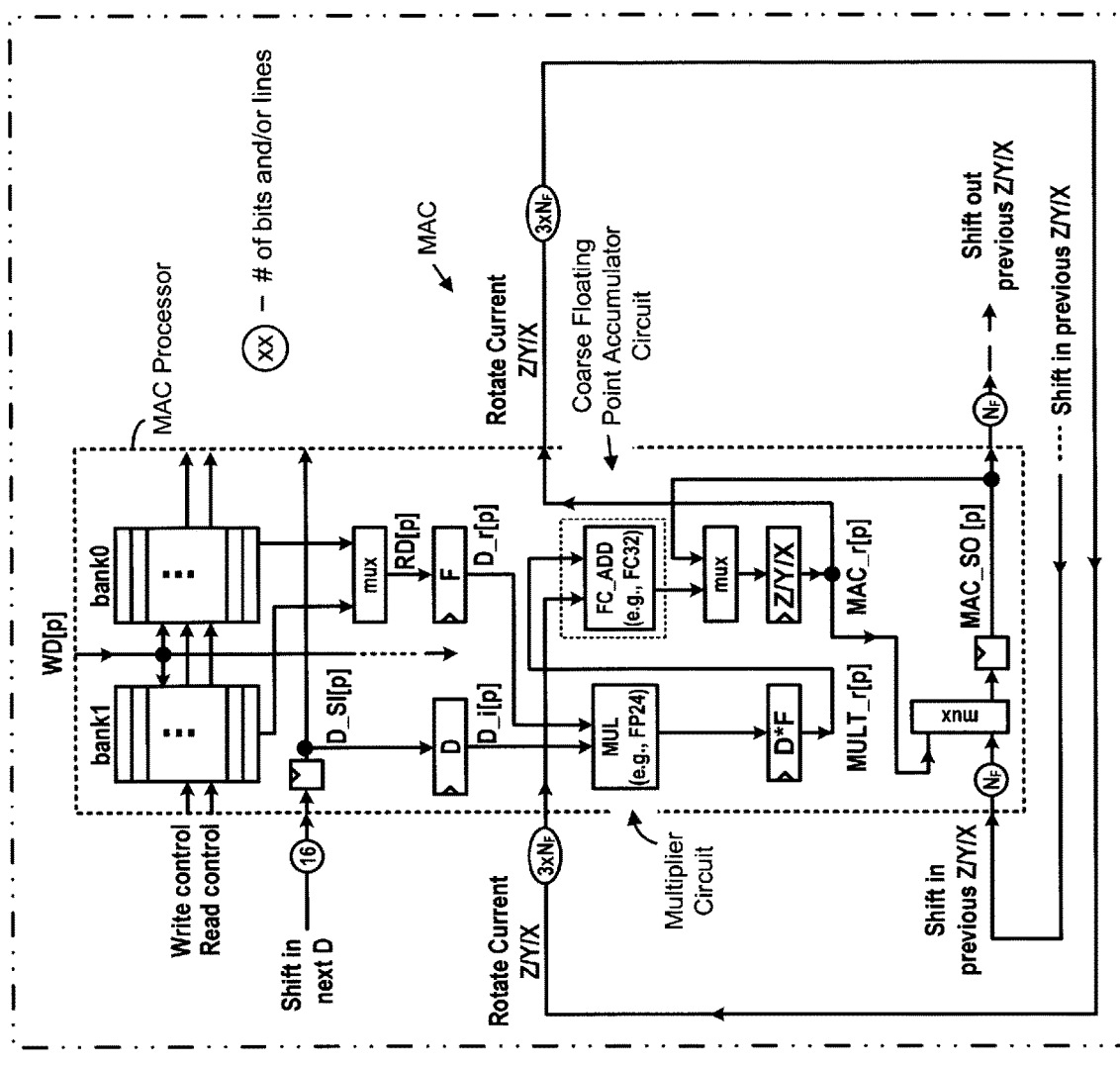
Figure 15D:
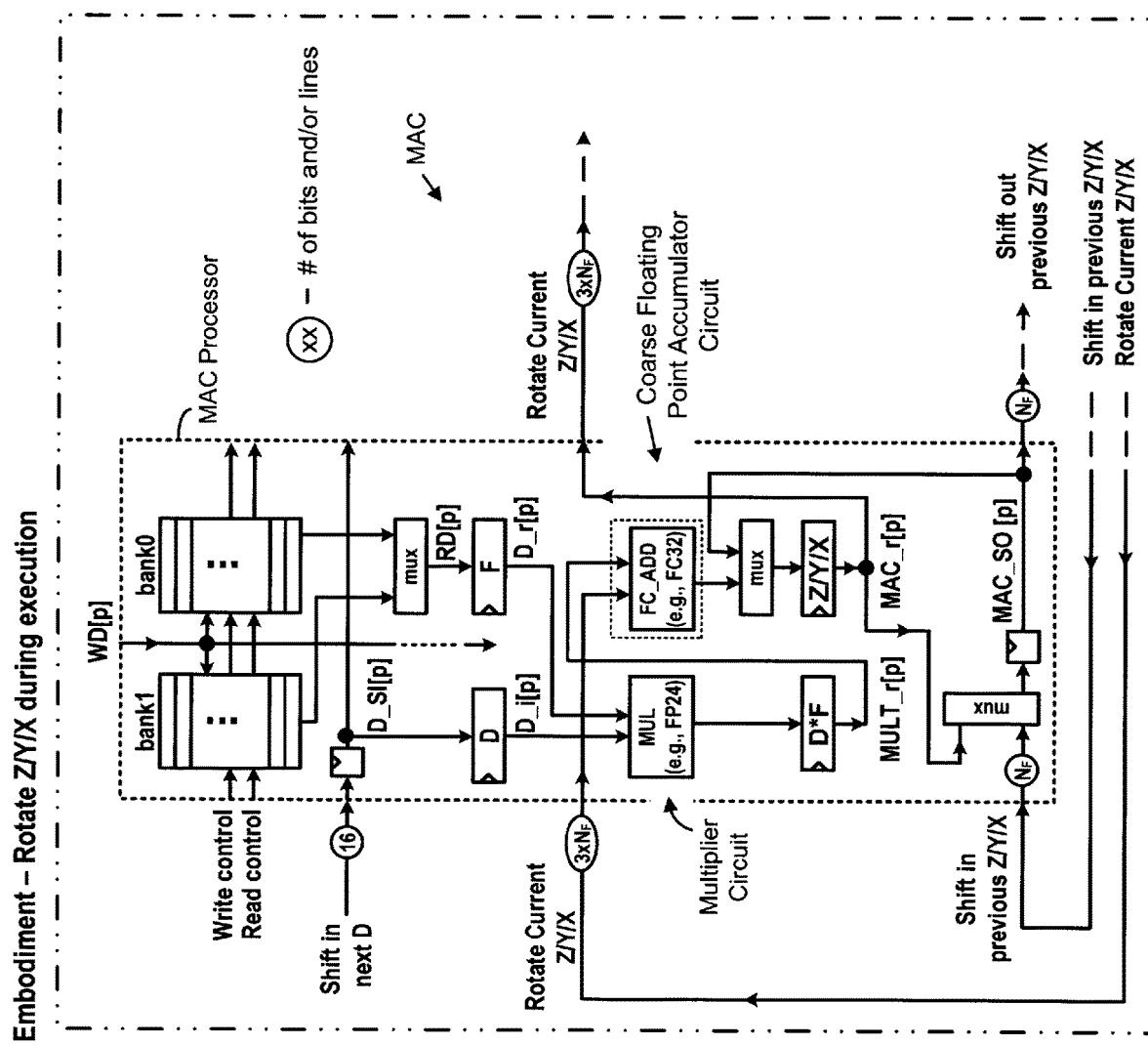
Figure 15E:
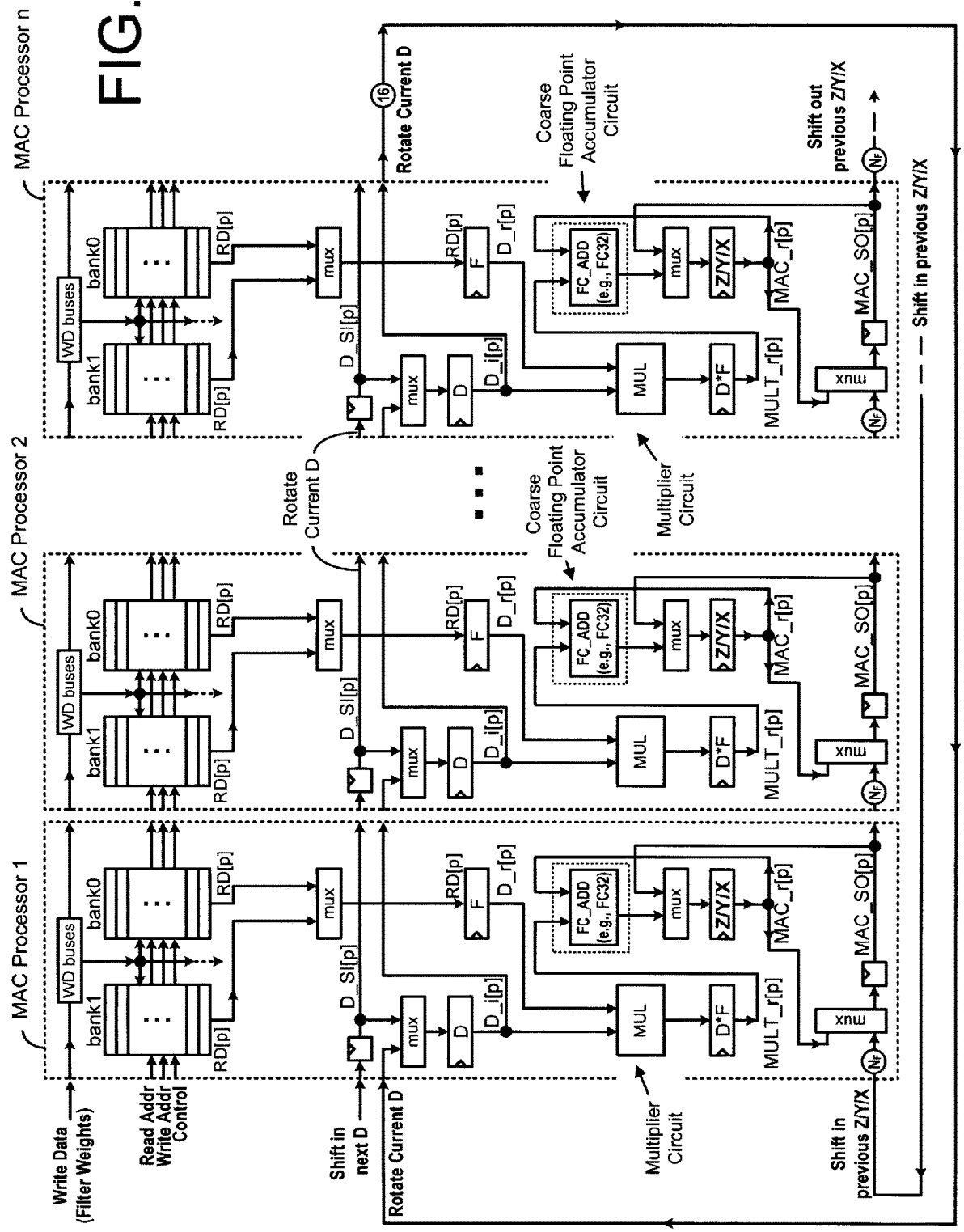
Figure 16:
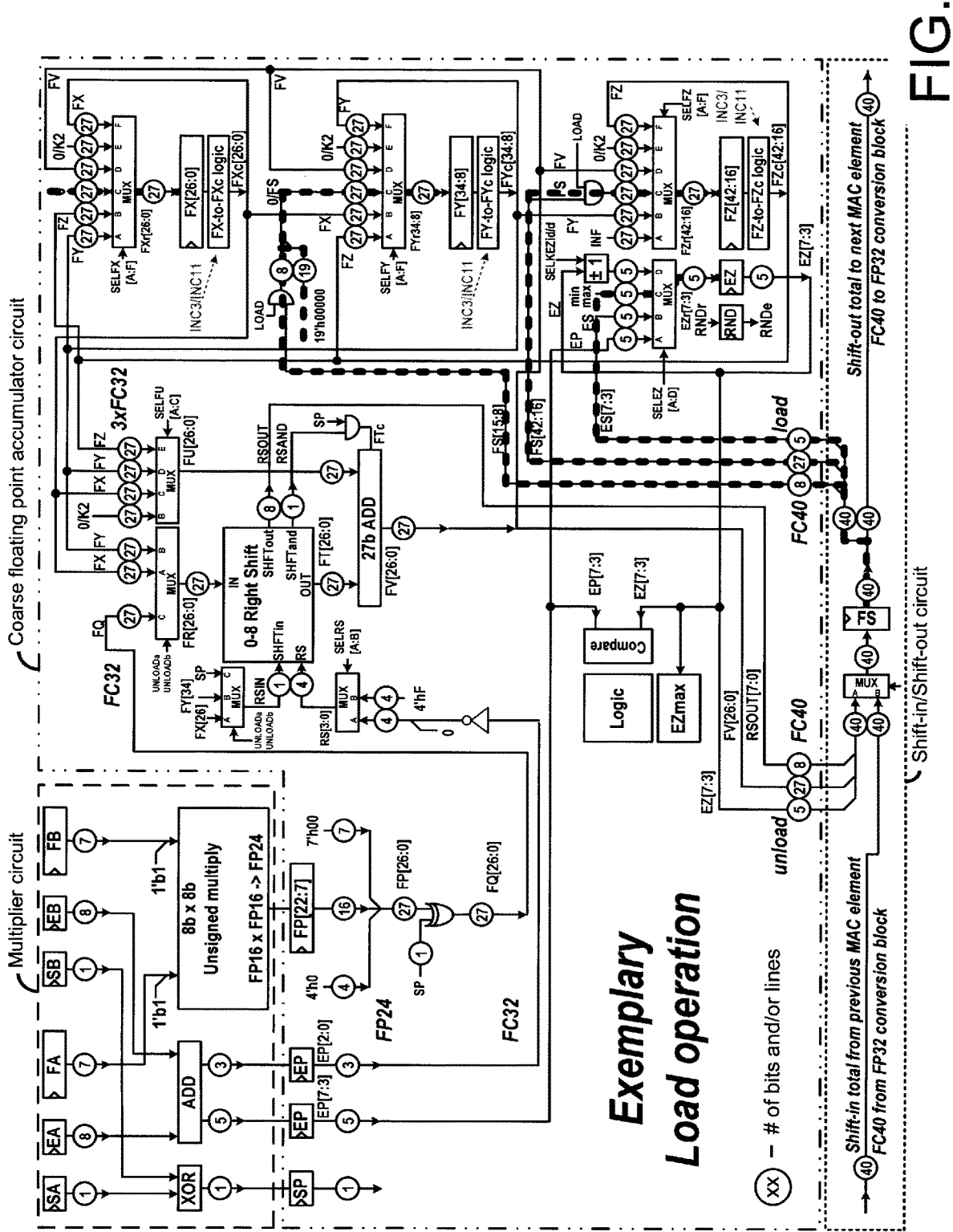
Figure 17:
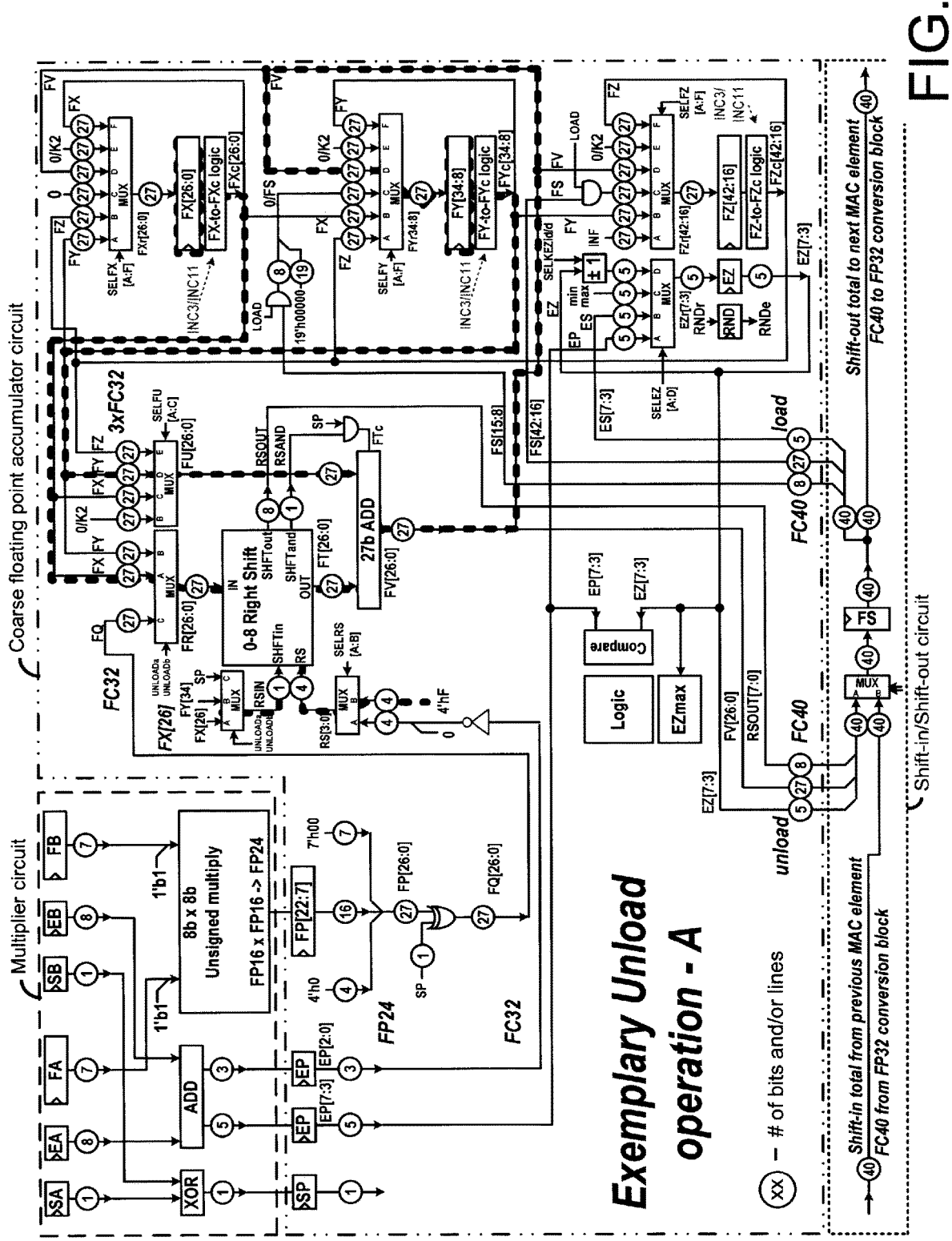
Figure 18:
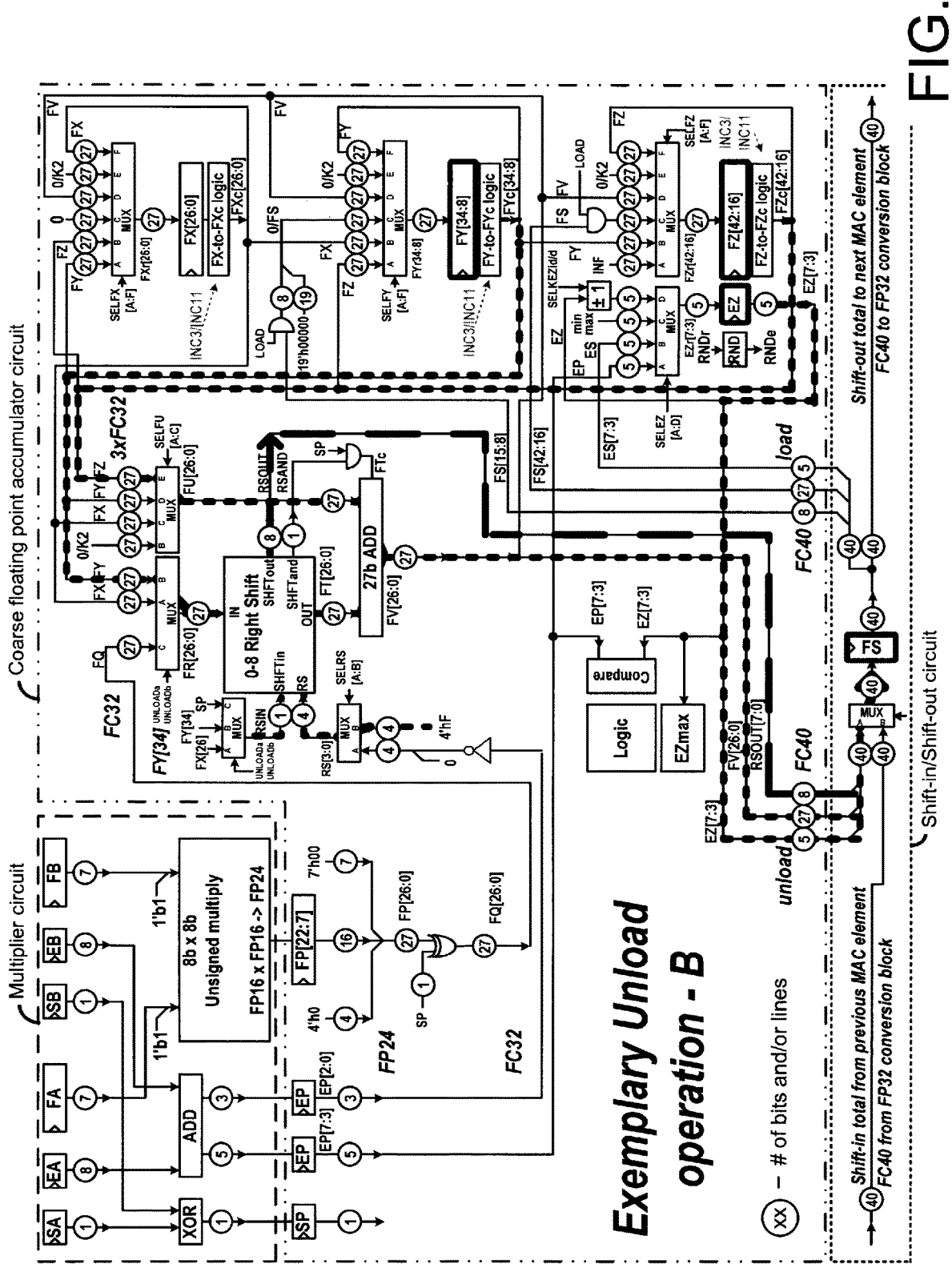
Figure 19:
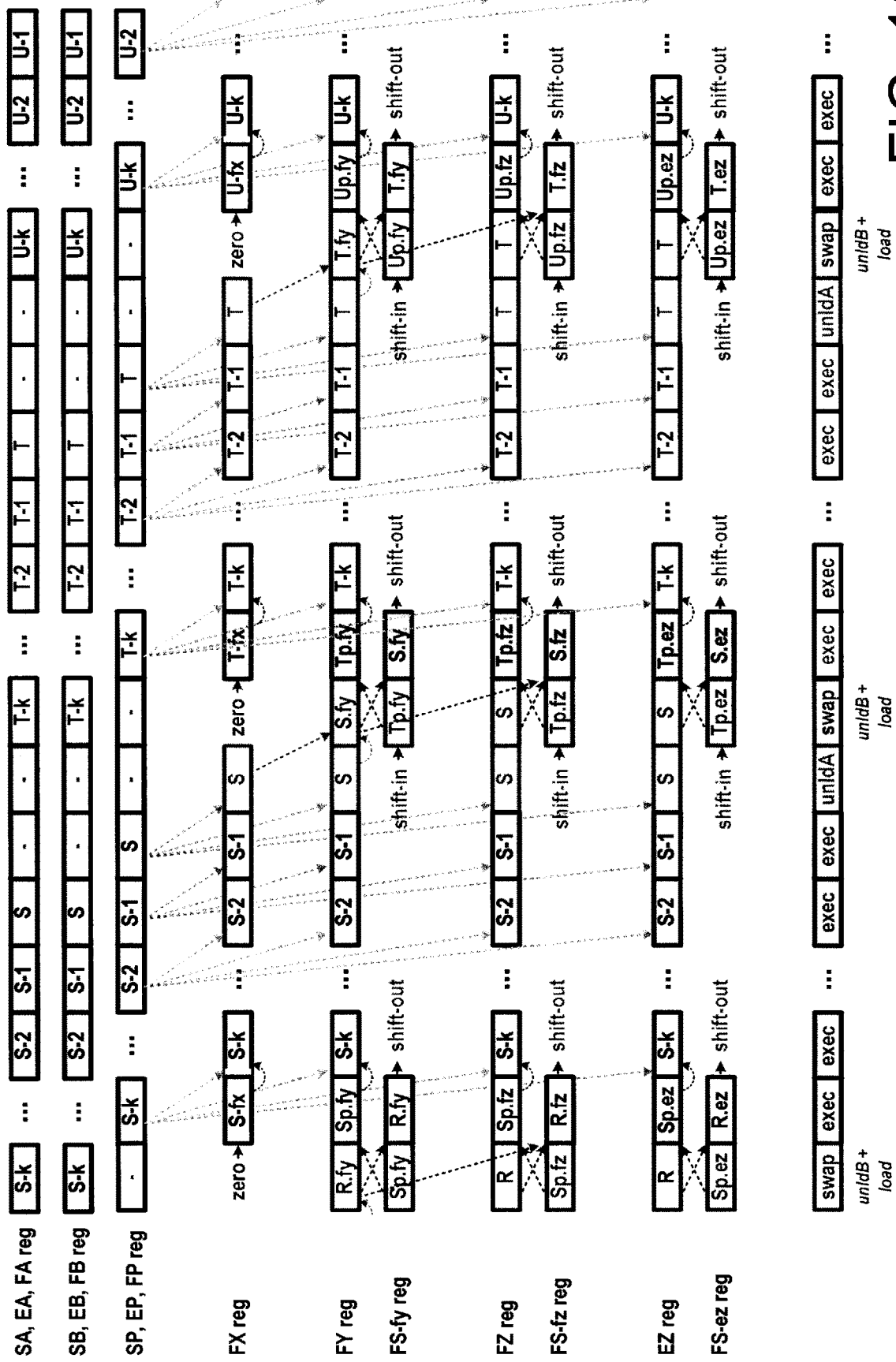
Figure 20A:
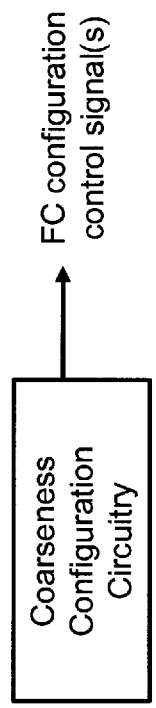
Figure 20B:
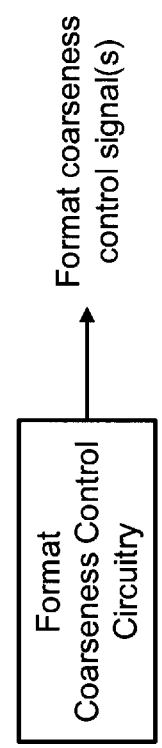
Figure 21:
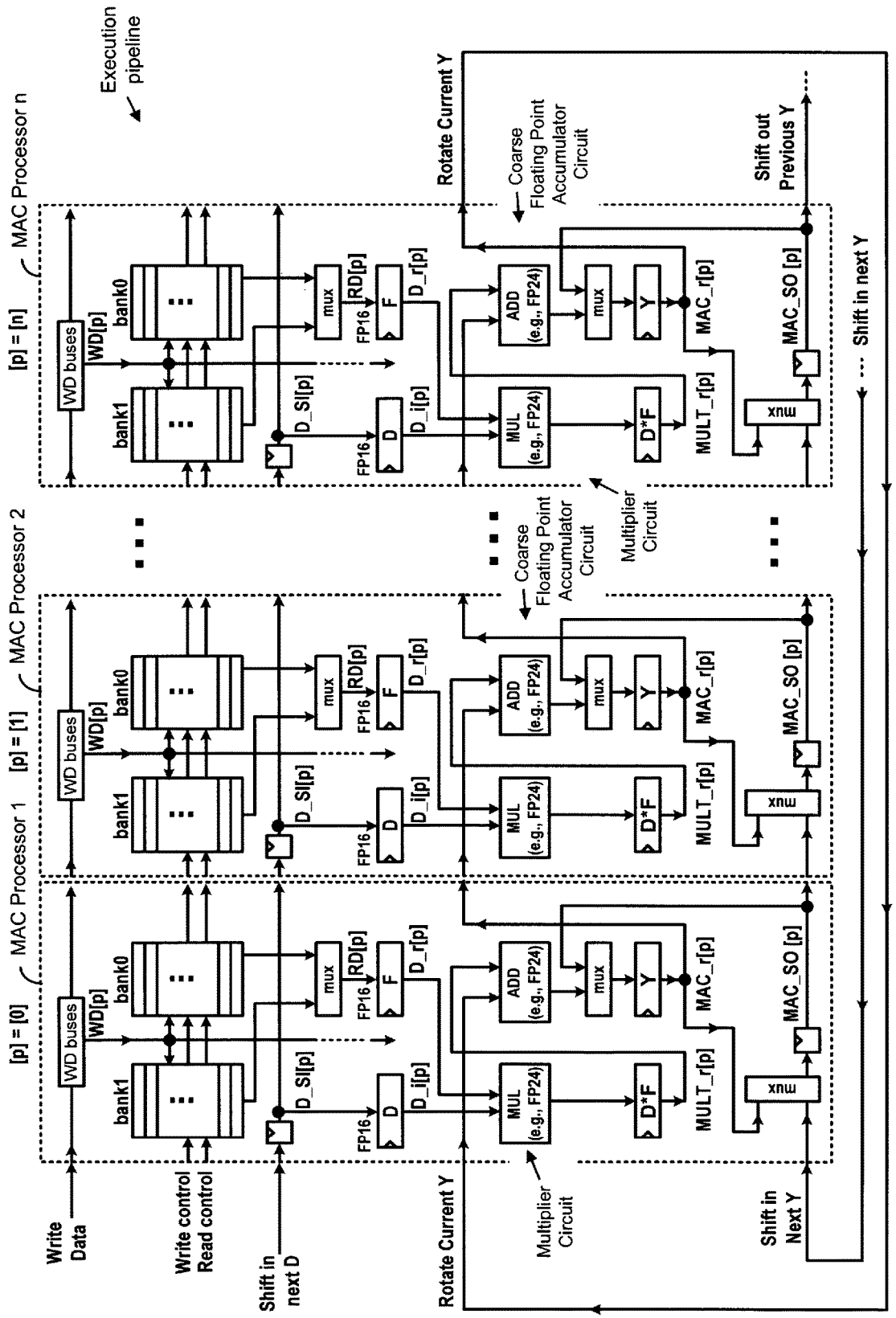
Figure 22A:
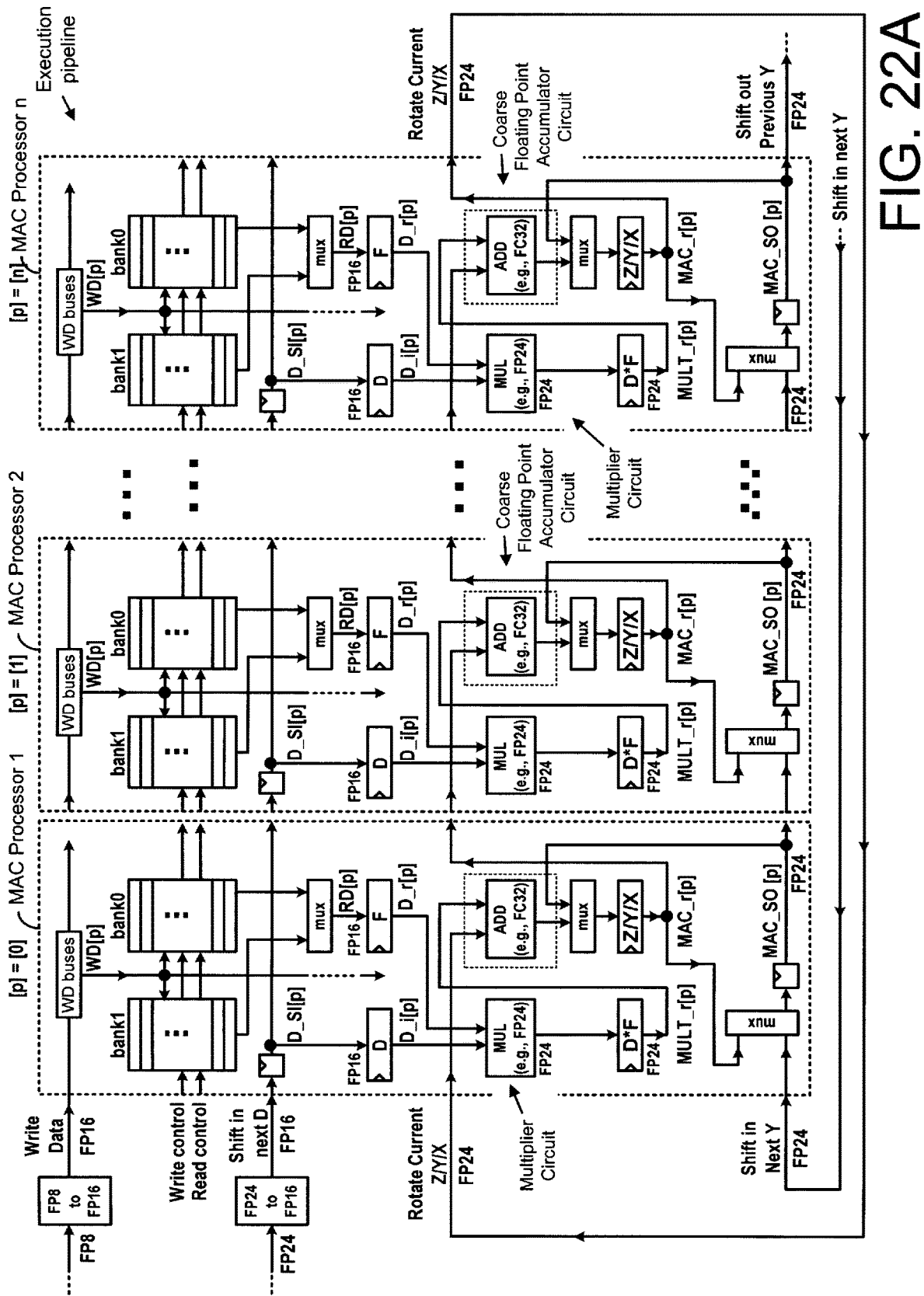
Figure 22B:
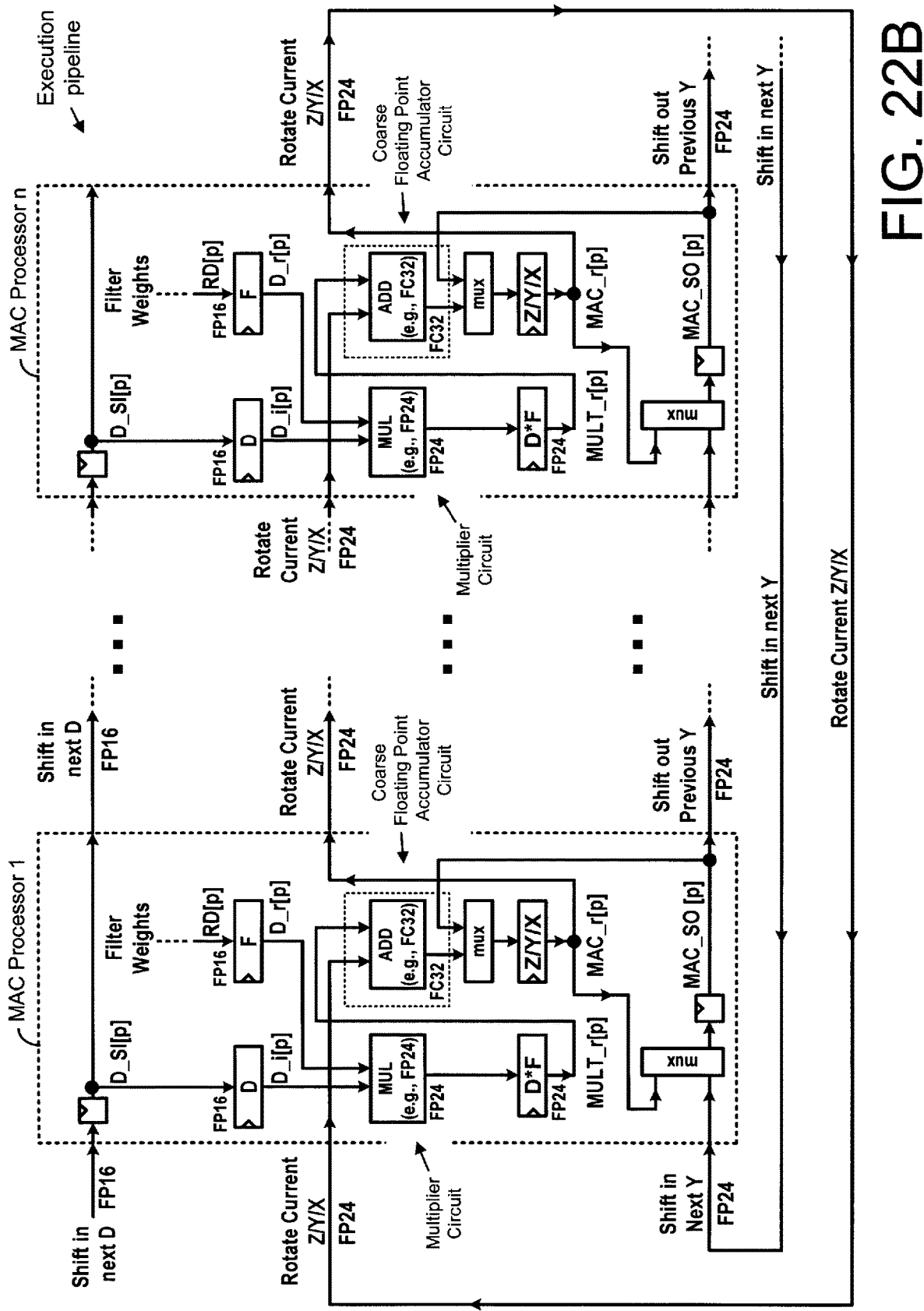
Figure 23:
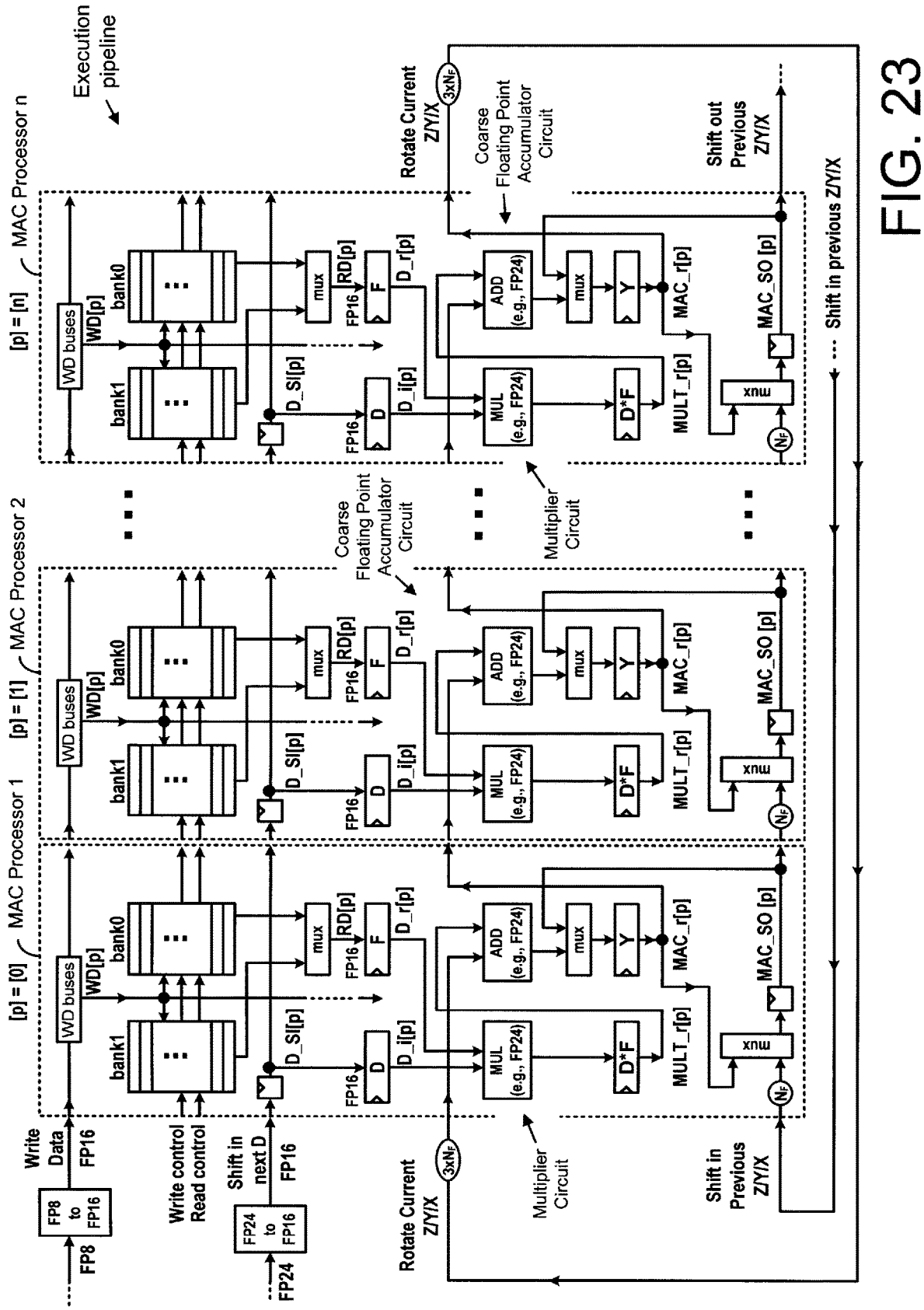
Figure 24:
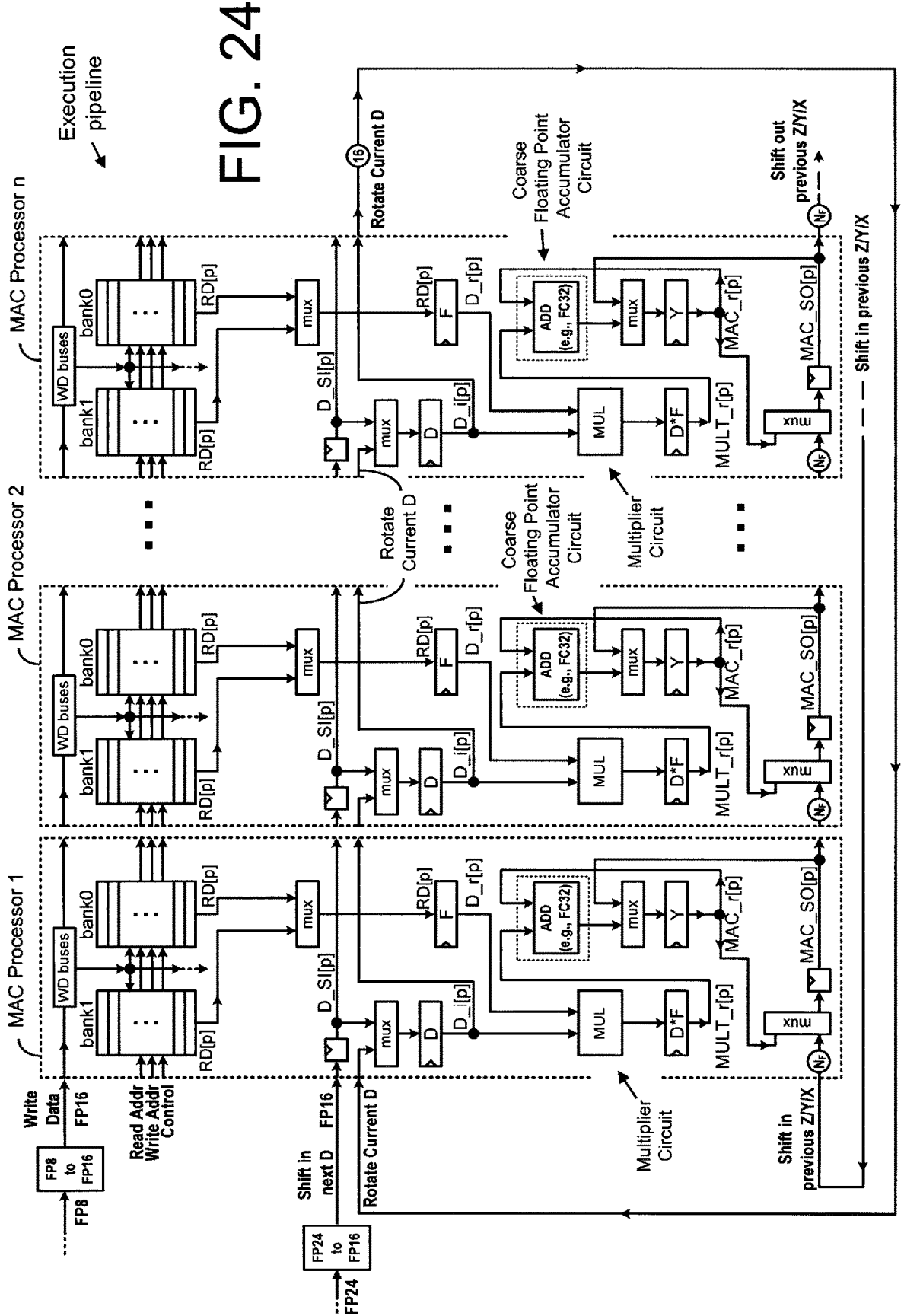
Figure 25:
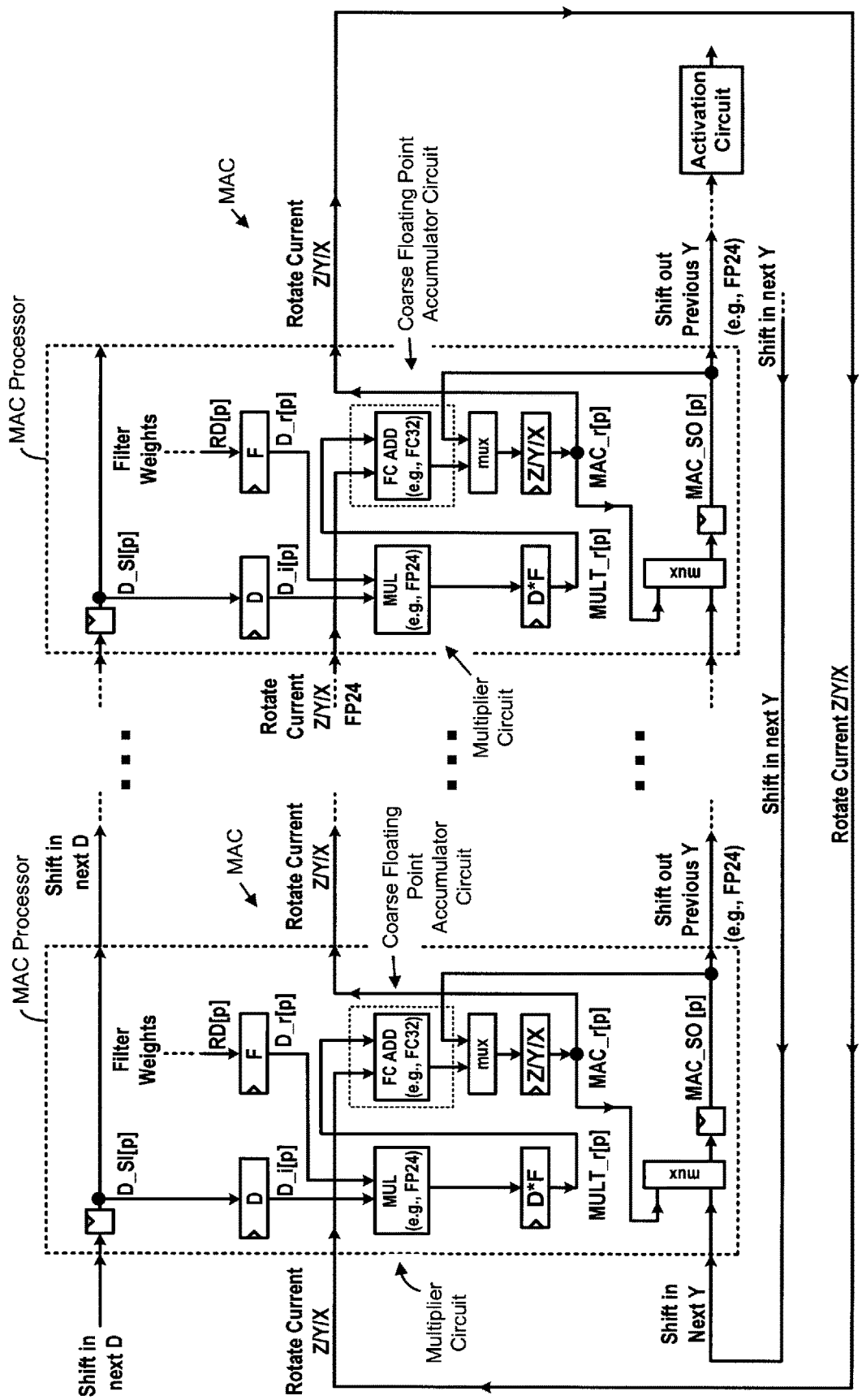
Figure 26:
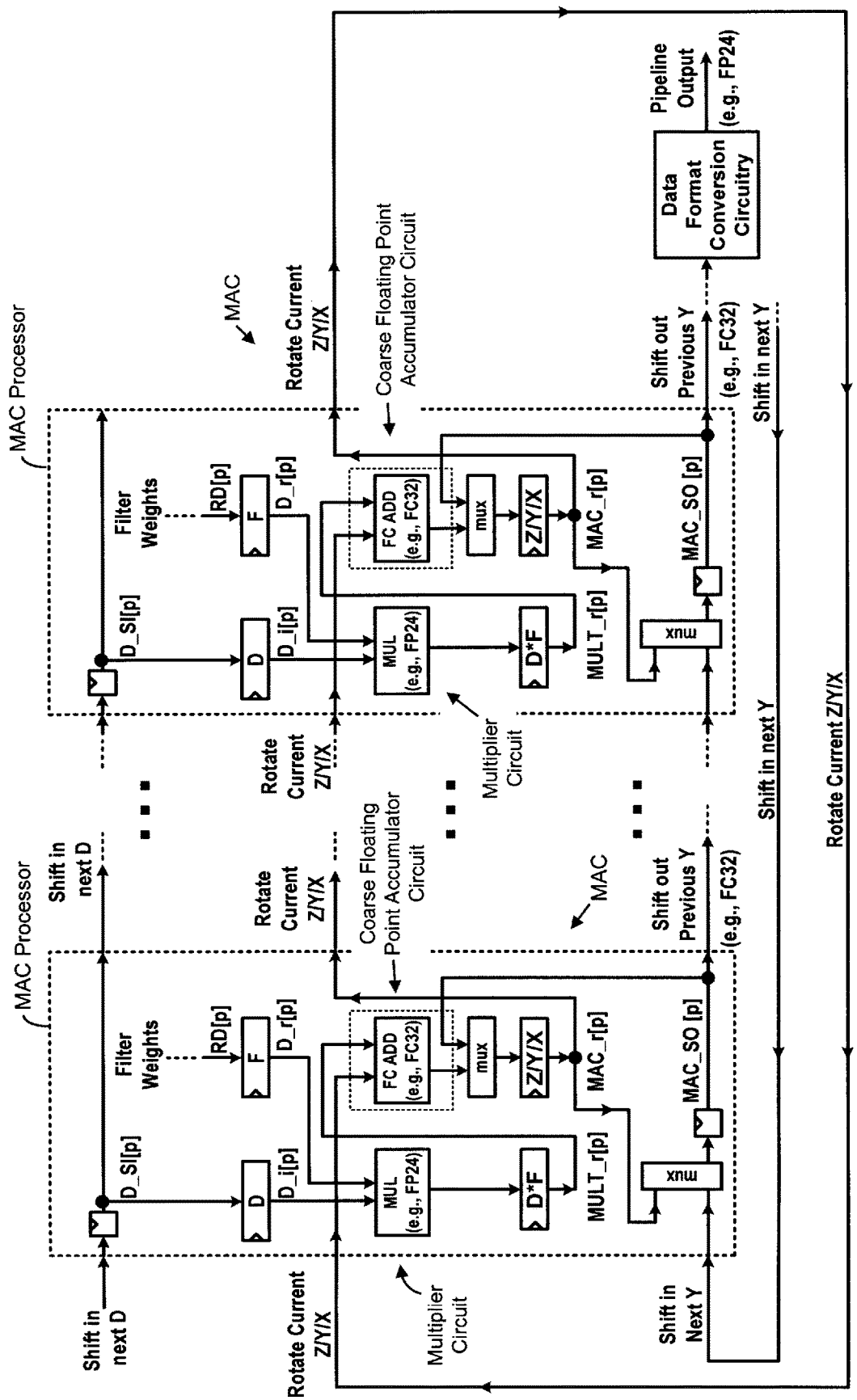

FIG. 1A illustrates a schematic block diagram of a logical overview of an exemplary multiplier-accumulator execution pipeline, connected in a linear pipeline configuration wherein the input data are input or loaded into a plurality of MACs of the pipeline and, in operation, the accumulation values generated by the MACs are rotated, transferred or moved (e.g., before, during or at the completion of each execution cycle of the execution sequence (i.e., set of associated execution cycles)) through MAC circuitry (here, a plurality of serially connected MACs) of the MAC pipeline such that, in one embodiment, each accumulation value generated by a MAC is output before, during or at the completion of each execution cycle to the immediately following MAC of the linear pipeline and employed in the accumulation operation of the accumulator circuit of that immediately following MAC, according to one or more aspects of the present inventions; in this illustrative embodiment, the plurality of MACs is illustrated in block diagram form; an exemplary MAC is illustrated in schematic block diagram form in Inset A; notably, in this exemplary embodiment, "m" (e.g., 64 in one illustrative embodiment) MACs are connected in a linear execution pipeline to operate concurrently whereby the processing circuits perform m×m (e.g., 64×64) multiply and accumulate operations in each m (e.g., 64) cycle interval (here, a cycle may be, for example, nominally 1ns); notably, in one exemplary embodiment, each m (e.g., 64) cycle interval processes a Dd/Yd (depth) column of input and output pixels/data at a particular (i,j) location (the indexes for the width Dw/Yw and height Dh/Yh dimensions of this exemplary embodiment—Dw=512, Dh=256, and Dd=128, and the Yw=512, Yh=256, and Yd=64) wherein the m (e.g., 64) cycle execution interval is repeated for each of the Dw*Dh depth columns for this stage; in addition, in one embodiment, the filter weights or weight data are loaded into memory (e.g., L1/L0 SRAM memories) before the multiplier-accumulator circuit starts processing (see, e.g., the '345, '306 and '212 applications); in one embodiment, the L1 SRAM memory may provide data to a plurality of L0 SRAM memories, wherein each linear pipeline (like that illustrated in block diagram form in FIG. 2A) is associated with a dedicated L0 SRAM memory of the plurality of L0 SRAM memories (associated with the L1 SRAM memory);

FIG. 1B illustrates a high-level block diagram layout of an integrated circuit or a portion of an integrated circuit (which may be referred to, at times, as an X1 component) including a plurality of MAC execution pipelines, each pipeline having a plurality of MACs—each of which implement multiply and accumulate operations, wherein, in operation, the accumulation values (see "Yijl" in the expanded view of a portion of the high-level block diagrams of FIGS. 1A-1C) generated by the MACs are rotated, transferred or moved (e.g., before, during or at the completion of each execution cycle of the execution sequence (i.e., set of associated execution cycles)) through the plurality of serially connected MACs of the pipeline such that each accumulation value generated by a MAC is output before, during or at the completion of each execution cycle to the immediately following MAC of the linear pipeline and employed in the accumulation operation of the accumulator circuit of that immediately following MAC, according to one or more aspects of the present inventions; the multi-bit MAC execution pipelines and/or the plurality of MACs may be configured to implement one or more processing architectures or techniques (singly or in combination with one or more X1 components); notably, in this illustrative embodiment, the multi-bit MAC execution pipelines are organized into clusters (in this illustrative embodiment, four clusters (labeled Clusters A, B, C and D) wherein each cluster includes a plurality of multi-bit MAC execution pipelines (in this illustrative embodiment each cluster includes, e.g., 16, 64-MAC execution or processing pipelines); in one embodiment, the plurality of multiplier-accumulator circuits are configurable (one-time or multiple times, e.g., at start-up and/or in situ) to implement one or more pipelining processing architectures or techniques (in the illustrative embodiment, including, e.g., 64 MACs or MAC processors) which correlates to the schematic block diagram of a logical overview of an exemplary multiplier-accumulator circuit arranged in a linear execution pipeline configuration—see FIGS. 1A-1C, 2A-2C and 3); the processing component in this illustrative embodiment includes memory (e.g., L2 memory, L1 memory and L0 memory (e.g., SRAM)), a bus interfaces (e.g., a PHY and/or GPIO) to facilitate communication with circuitry external to the component and memory (e.g., SRAM and DRAM) for storage and use by the circuitry of the component, and a plurality of switches/multiplexers which are electrically interconnected to form a switch interconnect network "Network-on-Chip" ("NOC") to facilitate interconnecting the clusters of multiplier-accumulator circuits of the MAC execution pipelines; in one embodiment, the NOC includes a switch interconnect network (e.g., a mixed-mode interconnect network (i.e., a hierarchical switch matrix interconnect network and a mesh, torus or the like interconnect network (hereinafter collectively "mesh network" or "mesh interconnect network")), associated data storage elements, input pins and/or look-up tables (LUTs) that, when programmed, determine the operation of the switches/multiplexers; in one embodiment, one or more (or all) of the clusters includes one or more computing elements (e.g., a plurality of interconnected multiplier-accumulator circuits—labeled as "NMAX Rows"—see, e.g., the '345, '306 and '212 applications); notably, in one embodiment, each MAC execution pipeline (which, in one embodiment, consists of a plurality of serially interconnected MACs which are configured in a linear pipeline) is connected to an associated L0 memory (e.g., SRAM memory) that is dedicated to that processing pipeline; the associated L0 memory stores filter weights used by the multiplier circuit of each multiplier-accumulator circuit of that particular MAC processing pipeline in performance of the multiply operations, wherein each MAC processing pipeline of a given cluster is connected to an associated L0 memory (which, in one embodiment, is dedicated to the multiplier-accumulator circuits of that MAC processing pipeline); a plurality (e.g., 16) MAC execution pipelines of a MAC cluster (and, in particular, the L0 memory of each MAC execution pipeline of the cluster) is coupled to an associated L1 memory (e.g., SRAM memory); the associated L1 memory is connected to and shared by each of the MAC execution pipelines of the cluster to receive filter weights to be stored in the L0 memory associated with each MAC execution pipeline of the cluster; in one embodiment, the associated L1 memory is assigned and dedicated to the plurality of pipelines of the MAC cluster; notably, the shift-in and shift-out paths of each 64-MAC execution pipeline is coupled to L2 memory (e.g., SRAM memory) wherein the L2 memory also couples to the L1 memory and L0 memory; the NOC couples the L2 memory to the PHY (physical interface) which may connect to L3 memory (e.g., external DRAM); the NOC also couples to a PCIe or PHY which, in turn, may provide interconnection to or communication with circuitry external to the X1 processing component (e.g., an external processor, such as a host processor); the NOC, in one embodiment, may also connect a plurality of X1 components (e.g., via GPIO input/output PHYs) which allow multiple X1 components to process related data (e.g., image data), as discussed herein, in accordance with one or more aspects of the present inventions;

FIG. 2A illustrates schematic block diagram of an exemplary multiplier-accumulator circuit including a multiplier circuit ("MUL") to perform/implement the multiply operations (in connection with filter weights and input data) and accumulator circuit ("ADD"), for example, a floating point accumulator circuit (such as, e.g., a 24 bit (i.e., FP24)) to perform/implement the accumulate operations, wherein, in this embodiment, the output of the accumulator circuit ("ADD") of the MAC is coupled to the input of the accumulator circuit ("ADD") of the MAC wherein, in this way, accumulation values ("Y") generated by the MACs (see, MAC_r[p]) are rotated, transferred or moved (e.g., before, during or at the completion of each execution cycle of the execution sequence (i.e., set of associated execution cycles)) such that each accumulation value (see, MAC_r[p]—"Rotate current Y") generated by the MAC is output before, during or at the completion of each execution cycle to the input of the accumulator circuit and employed in the accumulation operation of the accumulator circuit ("ADD") of the following cycle; notably, in one exemplary embodiment, MAC processor may include or read from one or more of memory banks (e.g., two SRAM memory banks) that are dedicated to the MAC to store filter weights used by the multiplier circuit of the associated MAC (as described and illustrated in U.S. Provisional Application No. 62/012,111 and/or U.S. Non-Provisional application Ser. No. 17/212,411, which are hereby incorporated by reference herein); notably, the individual MACs and associated L0 memory (whether such memory has one or more memory banks) may, at times, be referred to herein as MAC Processors);

FIGS. 2B and 2C illustrate schematic block diagrams of an exemplary multiplier-accumulator circuits including a multiplier circuit ("MUL") to perform/implement the multiply operations (in connection with filter weights and input data) and coarse floating point accumulator circuit ("ADD"), for example, a 32 bit (i.e., FC32)) to perform/implement the accumulate operations in a coarse floating point data format, wherein, in this embodiment, the output of the accumulator circuit ("ADD") of the MACs is coupled to the input of the accumulator circuit ("ADD") of the MAC wherein, in this way, accumulation values (Z, Y and/or X (all combinations thereof)—illustrated and referred to as "Z/Y/X") generated by the MAC (see, MAC_r[p]) are rotated, transferred or moved (e.g., before, during or at the completion of each execution cycle of the execution sequence (i.e., set of associated execution cycles)) such that each accumulation value (see, MAC_r[p]—"Rotate current Z/Y/X") generated by the MAC is output before, during or at the completion of each execution cycle to the input of the accumulator circuit and employed in the accumulation operation of the accumulator circuit ("ADD") of the following cycle, according to one or more aspects of the present inventions; the accumulation value output from the MAC, in one embodiment, may be converted to a floating point data format prior to being output, via conversion circuitry, which converts the data format of the output of the floating point accumulator circuit to a floating point data format from the coarse floating point data format; in another embodiment, the accumulation data output or rotated between the MAC processor(s) during processing (here, "Rotate Current Z/Y/X") may have a coarse floating point data format and, in one embodiment, converted to a floating point data format after completion of the execution sequence; notably, in one exemplary embodiment, MAC processor may include or read from one or more of memory banks (e.g., two SRAM memory banks—see FIG. 2B) that are dedicated to the MAC to store filter weights used by the multiplier circuit of the associated MAC (as described and illustrated in U.S. Provisional Application No. 62/012,111 and/or U.S. Non-Provisional application Ser. No. 17/212,411, which are hereby incorporated by reference herein); notably, the individual MACs and associated L0 memory (whether such memory has one or more memory banks) may, at times, be referred to herein as MAC Processors);

FIGS. 2D and 2E illustrate schematic block diagrams of one or more exemplary multiplier-accumulator circuits, for example, configured in an exemplary multiplier-accumulator execution or processing pipelines including a plurality of serially connected MACs (e.g., 64; when m=64, see FIG. 1B) wherein the output of each accumulator circuit ("ADD") of the MACs is coupled to the input of the immediately following accumulator circuit ("ADD") of the MACs of the linear processing pipeline wherein, in this way, accumulation values (Z, Y and/or X (all combinations thereof)—illustrated and referred to as "Z/Y/X") generated by the MACs (see, MAC_r[p]) are rotated, transferred or moved (e.g., before, during or at the completion of each execution cycle of the execution sequence (i.e., set of associated execution cycles)) through the plurality of serially connected MACs of the pipeline such that each accumulation value (see, MAC_r[p]—"Rotate current Z/Y/X") generated by a MAC is output before, during or at the completion of each execution cycle to the immediately following MAC of the linear pipeline and employed in the accumulation operation of the accumulator circuit ("ADD") of that immediately following MAC, according to one or more aspects of the present inventions; notably, the accumulation value output from the MAC, in one embodiment, may be converted to a floating point data format prior to being output, via conversion circuitry, which converts the data format of the output of the floating point accumulator circuit to a floating point data format from the coarse floating point data format; in another embodiment, the accumulation data output or rotated between the MAC processor(s) (here, "Rotate Current Z/Y/X") may have a coarse floating point data format and, after completion of the execution cycles of the execution sequence, converted to another data format (e.g., floating point data format (see, e.g., FIG. 26); further, as mentioned above, the MAC includes a multiplier circuit ("MUL") to perform/implement the multiply operations (in connection with filter weights and input data) and accumulator circuit ("ADD") to perform/implement the accumulate operations, according to one or more aspects of the present inventions; notably, although exemplary embodiments illustrated herein are, at times, described and/or illustrated in the context of a particular bit length of a floating point data format and/or a coarse floating point data format, and/or a bit precision of a multiplier circuit and/or an accumulator circuit (including a bit precision of a coarse floating point accumulator), such information is exemplary and useful for purposes of explanation; and the embodiments (and inventions) are not limited to such bit lengths or precisions—but are applicable to other bit lengths and precisions (e.g., FPxx or FCxx where: xx is an integer and is greater than or equal to, for example, 24 and less than or equal to, for example, 64); such other embodiments may or may not be specifically described and/or illustrated herein; as intimated above, the accumulation data output or rotated between the MAC processors during processing (here, "Rotate Current Z/Y/X") may include a coarse floating point data format or a floating point data format;

FIG. 3 illustrates a logic circuit block diagram of a MAC having a coarse floating point accumulator circuit, according to certain aspects of the present inventions, wherein the coarse floating point accumulator circuit receives a floating point output of the multiplier circuit (e.g., a 24 bit product having a floating point data format (FP24)) and, via a data format conversion circuit, converts the floating point output (in the illustrative embodiment, FP24) of the multiplier circuit to a coarse floating point data format before implementing or performing the accumulation operation; notably, the coarse floating point accumulator circuit of this embodiment includes a precision that is comparable or "equivalent" to 32 bit precision of a floating point accumulator; in this illustrative embodiment, the exemplary multiplier circuit, illustrated in the upper left corner, generates the a 24 bit floating point data format product, using the input data (e.g., image data) and the filter weights, and loads or outputs that product data into a pipeline register which, in the illustrative embodiment, consists of a 1-bit sign bit (SP), an 8-bit exponent field (EP[7:0]), and a 15-bit fraction field (FP[22:7]);

FIG. 4 illustrates a logic circuit block diagram of a MAC having a coarse floating point accumulator circuit, according to certain aspects of the present inventions, wherein the coarse floating point accumulator circuit receives a floating point output of the multiplier circuit (e.g., a 24 bit product having a floating point data format (FP24)) and, via a data format conversion circuit, converts the floating point output (in the illustrative embodiment, FP24) of the multiplier circuit to a coarse floating point data format (in the illustrative embodiment, FC35) before implementing or performing the accumulation operation; notably, the coarse floating point accumulator circuit of this embodiment includes a precision that is comparable or "equivalent" to 39 bit precision of a floating point accumulator; in this illustrative embodiment, like that in the exemplary MAC of FIG. 3, the exemplary multiplier circuit, illustrated in the upper left corner, generates the a 24 bit floating point data format product, using the input data (e.g., image data) and the filter weights, and loads or outputs that product data into a pipeline register which, in the illustrative embodiment, consists of a 1-bit sign bit (SP), an 8-bit exponent field (EP[7:0]), and a 15-bit fraction field (FP[22:7]);

FIG. 5 illustrates certain details of a conversion from exemplary floating point data formats having different widths or lengths, including ranges, to exemplary coarse floating point data formats having different widths or lengths, including ranges, wherein the coarse floating point data formats may be "equivalent" to the floating point data formats; three standard/typical bit lengths of the floating point data formats are depicted for reference purposes—namely, FP16, FP24 and FP32, wherein such data format includes a 1-bit sign field, an 8-bit exponent field, and a 7 bit fraction field, 15 bit fraction field and 23 bit fraction field, respectively; there is an implicit bit of weight "1.0" added to each fraction (the format is normalized) that may be employed as a sign bit and the fraction field utilize a sign-magnitude numeric format; here, the exponent field is decremented by a fixed offset of "01111111" to generate the exponent value of the field;

FIG. 6 illustrates a numerical accuracy of an exemplary coarse floating point accumulator circuit—based on a synthetic set of data patterns (e.g., wherein the pattern set includes 6,144 FP24 floating point values, and the sign, exponent and fraction fields are filled with pseudo-random bit values, and the exponent range of the pattern set includes 192 of the possible 256 binades;

FIGS. 7A-7C illustrate functional details of the coarse floating point accumulator circuit, according to certain aspects of the present inventions; wherein the accumulator circuit receives data (i.e., a product of input data and filter weights) from multiplier circuit and, in operation, this data includes an floating point (FP) field and an exponent (EP) field; the exponent field EP[7:3] is subtracted from an accumulation exponent register EZ[7:3] of the accumulator circuit; the difference Δ indicates which of the accumulation fraction registers are to be used; the cases/examples in FIG. 7A assume that no overflow (FOVFL) and no underflow (FUNFL) occur (the FNORM and FNRMz designations indicate that there is no overflow or underflow; the FNRMz designation is employed to differentiate from a similar set of cases in which FUNFL occurs);

FIG. 8A illustrates certain functional details of the coarse floating point accumulator circuit wherein the first four rows indicate that, when EP≥EZ+1, the product exponent EP is loaded to the EZ exponent accumulation register and the shifted product fraction FT is loaded to the FZ fraction accumulation register; the previous values of the FZ fraction accumulation register and FY fraction accumulation register may be loaded into FY or FX registers, or discarded; if such values or the values stored in FZ fraction accumulation register and the FY fraction accumulation register are discarded, the RND register may be can set if they are larger/greater than a rounding threshold; in addition, if FY/FX are not loaded with a previous value of FZ/FY, the values stored in the FZ and FY registers are set to zero;

FIG. 8B illustrates certain additional functional details of the coarse floating point accumulator circuit wherein the first four rows again illustrate that when EP≥EZ+1, the product exponent EP is loaded to the EZ exponent accumulation register and the shifted product fraction FT is loaded to the FZ fraction accumulation register; the previous values of the FZ fraction accumulation register and the FY fraction accumulation register may be loaded into FY or FX registers, or discarded; if the previous values of or stored in the FZ fraction accumulation register and the FY fraction accumulation register are discarded, RND register may be set if they are larger/greater than a rounding threshold; if FY or FX registers are not loaded with a previous value of FY register or FX register, the values therein are set to zero; also, the FOVFL condition causes the K2 constant to be added to FZ/FY/FX registers in the indicated cases;

FIG. 8C illustrates certain further functional details of the coarse floating point accumulator circuit (relative to FIGS. 8A and 8B) wherein first five rows illustrate that when EP 2: EZ, the product exponent EP is loaded to the EZ exponent accumulation register and the shifted product fraction FT is added to the FZ fraction accumulation register; even if FZc has underflowed to zero, the product fraction FT that is added to it will make it non-zero again (notably, these five cases are functionally equivalent to the previously discussed FNORM cases); the previous values stored in the FZ fraction accumulation register and FY fraction accumulation register may be loaded into FY or FX, or discarded. If the previous values are discarded, the RND register is set if they are larger/greater than a rounding threshold; in addition, if FY/FX are not loaded with an old or previous value of FZ or FY, they are set to zero;

FIG. 9A illustrates a logic circuit block diagram of a MAC having a coarse floating point accumulator circuit, according to certain aspects of the present inventions, wherein the coarse floating point accumulator circuit of this embodiment includes a precision that is comparable or "equivalent" to 32 bit precision of a floating point accumulator; here again, the coarse floating point accumulator circuit receives a floating point output of the multiplier circuit (e.g., a 24 bit product having a floating point data format) and, via a data format conversion circuit, converts the floating point output (in this embodiment, FP24) of the multiplier circuit to a coarse floating point data format before implementing or performing the accumulation operation; in this embodiment, critical timing paths are overlayed or outlined on certain paths and/or portions of the circuit/block diagram (highlighted via thick lines), to illustrate "worst case" register-to-register delays; these delays may determine the pipeline clock rate of the circuit;

FIG. 9B illustrates timing paths (highlighted via thick dotted lines) in the multiplier circuit (see upper left corner) of FIG. 9A; as noted above, the exemplary multiplier circuit embodiment generates the FP24 product and loads it into the product pipeline register (i.e., a 1-bit sign SP, an 8-bit exponent EP[7:0], and a 15-bit fraction FP[22:7]);

FIG. 9C illustrates a timing path (highlighted via thick dotted lines) in the accumulator circuit of FIG. 9A for the FZ-to-FZc case wherein the circuit performs a pre-increment by a constant if a fraction overflow occurred in the accumulation operation in the previous cycle; this occurs in the circuits of the FZ-to-FZc, FY-to-FYc, FX-to-FXc logic blocks;

FIG. 9D illustrates a timing path (highlighted via thick dotted lines) in the accumulator circuit of FIG. 9A in connection with the exponent compare operation of the coarse floating point accumulator circuit wherein the EP[7:3] field from the product pipeline register is subtracted from the accumulation exponent register EZ[7:3](a five bit addition); the difference determines which case will take place; the "Logic" block/circuit will generate selection control signals for the various multiplexers in the FCADD circuitry; one of the three fraction values {FZc, FYc, FXc} is selected to be the FU[26:0] operand (value of the fraction field);

FIG. 9E illustrates a timing path (highlighted via thick dotted lines) in the accumulator circuit of FIG. 9A that adjusts the FP[26:0] field from the product pipeline register. It is conditionally complemented to FQ[26:0] and right shifted by the complement of the lower exponent EP[2:0] to give FT[26:0];

FIG. 9F illustrates a common timing path (highlighted via thick dotted lines) in the accumulator circuit of FIG. 9A which is a convergence of the timing paths of FIGS. 9C-9E, and FU[26:0] is added to the shifted product fraction FT[26:0]; the sum FV[26:0] is stored back in the selected accumulation fraction register (FZ in this example);

FIG. 10 illustrates a schematic block diagram of an exemplary embodiment of the FZ-to-FZc circuit, FY-to-FYc circuit, FX-to-FXc circuit, and the RND circuit, according to certain aspects of the present inventions; notably, the FZ-to-FZc circuit, FY-to-FYc circuit, FX-to-FXc circuit itself is logically identical wherein the connections of the input and output ports, and signals thereon, are different between the circuits;

FIG. 11 illustrates a schematic block diagram of an exemplary embodiment of INCDEC circuit/cell, according to certain aspects of the present inventions, wherein the INCDEC circuit/cell, in one embodiment, is used three times or eight times in the FZ-to-FZc circuit, FY-to-FYc circuit, FX-to-FXc circuit; these circuits/cells implement the control table set forth in Inc/Dec Cell Table depicted at the top of FIG. 11; when the select controls are {00,01,11} the input value D[imax . . . imin] is passed, incremented, or decremented to Q[imax . . . imin]; notably, the {10}select code may not be used;

FIG. 12A illustrates an exemplary embodiment of three 27 bit INCDEC11 circuits, and logic details therein, according to certain aspects of the present inventions, wherein the INCDEC circuit/cell, in one embodiment, is implemented 11 times, and a simple wire cell is employed 16 times;

FIG. 12B illustrates an exemplary embodiment of three 27 bit INCDEC3 circuits, and logic details therein, according to certain aspects of the present inventions, wherein the INCDEC circuit/cell, in one embodiment, is implemented 3 times, and a simple wire cell is employed 24 times; also illustrates an exemplary embodiment of 5 bit INCDEC5 circuit/block, and logic details therein, used by the exponent register EZ[7:3] to generate/produce the EZpm1[7:3] value; notably, the INCDEC cell, in one embodiment, the INCDEC5 circuit/block is used 5 times;

FIG. 13 illustrates an exemplary embodiment of a circuit and/or a process of a circuit, or a logical block diagram of right shift circuit—"RSHFT8" or "0-8 Right Shift" circuit/block—of the coarse floating point accumulator circuit illustrated in FIGS. 3 and 9A-9F, according to one embodiment of the present inventions; notably, any manner of implementation of the circuit and/or process a shift operation (e.g., 0-8 bit shift in the exemplary embodiment) during an accumulation operation is intended to fall within the scope of the present inventions (e.g., hardware and software implementations or embodiments, and/or data and/or instructions embodied in various computer-readable media);

FIGS. 14A and 14B illustrate, in tabular form, control signals for an exemplary embodiment, according to one embodiment of the present inventions, of the decode logic circuit (identified as "Logic" in FIGS. 3 and 9A-9F) of the coarse floating point accumulator circuit, wherein the logic circuit generates signals that control the multiplexers during operation of the coarse floating point accumulator circuit;

FIGS. 15A and 15B illustrate schematic block diagrams of exemplary multiplier-accumulator circuit, and pipeline configurations using such circuits, including a multiplier circuit ("MUL") to perform/implement the multiply operations (in connection with filter weights and input data) and accumulator circuit ("ADD") wherein input data values ("D") are rotated, transferred or moved, on a cycle-by-cycle basis; in one embodiment, the input data values are rotated or transferred from one MAC of the linear pipeline to the immediately following MAC of an execution pipeline (see, D_i[p]) and employed in the multiply operation of the multiplier circuit of that next MAC (of the processing pipeline), according to one or more aspects of the present inventions; in this embodiment, the output of each accumulator circuit ("ADD") of the MACs is input into the accumulator circuit ("ADD") of the associated MAC (see, MAC_r[p]) and employed in the accumulation operation; moreover the output of each accumulator circuit ("ADD") of the MACs is not rotated, transferred or moved to the immediately following MAC of the linear processing pipeline (compare, e.g., FIGS. 2D and 2E); in this way, the input data values ("D") are rotated, transferred or moved (e.g., before, during or at the completion of each execution cycle of the execution sequence (i.e., set of associated execution cycles)) through the plurality of serially connected MACs of the pipeline such that, in operation, after input of the initial data input values into the MACs of the linear pipeline (see "Shift in next D"), each input data value (see "Rotate current D") that is input into a MAC is output before, during or at the completion of each execution cycle to the immediately following MAC of the linear pipeline and employed in the multiplication operation of the multiplier circuit ("MUL") of that immediately following MAC, according to one or more aspects of the present inventions; notably, each MAC includes a multiplier circuit ("MUL") to perform/implement the multiply operations and accumulator circuit ("ADD") to perform/implement the accumulate operations, according to one or more aspects of the present inventions; in another embodiment, the input data values are rotated or transferred within the same MAC (see FIG. 15B) wherein the output of each accumulator circuit ("ADD") of the MACs is not rotated, transferred or moved to the immediately following MAC of the linear processing pipeline (compare, e.g., FIGS. 2A-2C); in these exemplary embodiments, the MAC processors may include or read from one or more of memory banks (e.g., two SRAM memory banks) that are dedicated to the MAC to store filter weights used by the multiplier circuit of the associated MAC (as described and illustrated in U.S. Provisional Patent Application No. 62/012,111 (filed Apr. 18, 2020)), which is hereby incorporated by reference herein; notably, the individual MACs may, at times, be referred to herein as MAC processors);

FIGS. 15C-15E illustrate schematic block diagrams of an exemplary multiplier-accumulator circuits including a multiplier circuit ("MUL") to perform/implement the multiply operations (in connection with filter weights and input data) and coarse floating point accumulator circuit ("FC ADD") to perform/implement the accumulate operations in a coarse floating point data format, wherein, in this embodiment, the output of the accumulator circuit ("ADD") of the MACs is coupled to the input of the accumulator circuit ("ADD") of the MAC wherein, in this way, accumulation values (Z, Y and/or X (all combinations thereof)—illustrated and referred to as "Z/Y/X") generated by the MAC (see, MAC_r[p]) are rotated, transferred or moved (e.g., before, during or at the completion of each execution cycle of the execution sequence (i.e., set of associated execution cycles)) such that each accumulation value (see, MAC_r[p]—"Rotate current Z/Y/X") generated by the MAC is output before, during or at the completion of each execution cycle to the input of the accumulator circuit and employed in the accumulation operation of the accumulator circuit ("ADD") of the following cycle, according to one or more aspects of the present inventions; notably, in one exemplary embodiment, MAC processor may include or read from one or more of memory banks that are dedicated to the MAC to store filter weights used by the multiplier circuit of the associated MAC; notably, the individual MACs and associated L0 memory (whether such memory has one or more memory banks) may, at times, be referred to herein as MAC Processors);

FIG. 16 illustrates a logic circuit block diagram of a MAC having a coarse floating point accumulator circuit, according to certain aspects of the present inventions, wherein the coarse floating point accumulator circuit of this embodiment includes a precision that is comparable or "equivalent" to 32 bit precision of a floating point accumulator; the coarse floating point accumulator circuit receives a floating point output of the multiplier circuit (e.g., a 24 bit product having a floating point data format (FP24)) and, via a data format conversion circuit, converts the floating point output (in the illustrative embodiment, FP24) of the multiplier circuit to a coarse floating point data format before implementing or performing the accumulation operation; in this illustrative embodiment, steering paths employed for loading the registers of the coarse floating point accumulator circuit are overlayed or outlined on certain paths and/or portions of the circuit block diagram (highlighted via thick dotted lines); here, the load values may have been previously shifted into the FS register shown at the bottom of the figure (see Shift-in/Shift-out circuit"); in the next pipeline cycle, the LOAD command is asserted, and, in one embodiment, the 40 bits of the FS register are loaded into the registers;

FIG. 17 illustrates a logic circuit block diagram of a MAC having a coarse floating point accumulator circuit, according to certain aspects of the present inventions; in this illustrative embodiment, steering paths employed for unloading the registers of the coarse floating point accumulator circuit are overlayed or outlined on certain paths and/or portions of the circuit block diagram (highlighted via thick dotted lines); in one embodiment, the UNLOADa command is asserted, and the two 27 bit values in the FX and FY registers are added and written back to the FY register;

FIG. 18 illustrates a logic circuit block diagram of a MAC having a coarse floating point accumulator circuit, according to certain aspects of the present inventions; in this illustrative embodiment, steering paths employed for unloading the registers of the coarse floating point accumulator circuit are overlayed or outlined on certain paths and/or portions of the circuit block diagram (highlighted via thick dotted lines); in one embodiment, the UNLOADb command is asserted, and the two 27 bit values in the FY and FZ registers are added and written to the FS register;

FIG. 19 illustrates an exemplary sequencing and timing of the exemplary embodiments of loading and unloading of the exemplary coarse floating point accumulator circuit of FIG. 16-18, wherein the sequencing employed for loading, for execution and for unloading of MACs of a pipeline (e.g., 64), as illustrated in FIG. 15A (i.e. rotating data, stationary accumulation values), according to certain aspects of the present inventions;

FIGS. 20A and 20B illustrate block diagrams of a circuit to implement and control the "coarseness" or amount of "coarseness" of the floating point data format and coarse floating point accumulator circuit (whether dynamic or otherwise), according to one or more aspects of the present inventions, wherein circuitry may control, change or select the configuration of the coarse floating point data format and the coarse floating point accumulator circuit to control the format configuration of the "coarseness" of the floating point data format; in one embodiment, the control circuitry of FIGS. 20A and 20B are the same circuitry;

FIGS. 21-23 illustrate schematic block diagrams of exemplary multiplier-accumulator circuits configured in exemplary MAC processing pipelines including a plurality of serially connected MACs (e.g., 64; when n=64) wherein the output of each coarse floating point accumulator circuit ("FC ADD") of the MACs is coupled to the input of the immediately following coarse floating point accumulator circuit ("FC ADD") of the MACs of the linear processing pipeline wherein, in this way, accumulation values (Y in FIG. 21 or Z, Y and/or X ("Z/Y/X" in FIGS. 22 and 23)) generated by the MACs (see, MAC_r[p]) are rotated, transferred or moved (e.g., before, during or at the completion of each execution cycle of the execution sequence (i.e., set of associated execution cycles)) through the plurality of serially connected MACs of the pipeline such that each accumulation value (see, MAC_r[p]—"Rotate current Y"—FIG. 21 or "Rotate current Z/Y/X"—FIGS. 22 and 23) generated by a MAC is output before, during or at the completion of each execution cycle to the immediately following MAC of the linear pipeline and employed in the accumulation operation of the coarse floating point accumulator circuit ("FC ADD") of that immediately following MAC, according to one or more aspects of the present inventions; as noted above, the MAC includes a multiplier circuit ("MUL") to perform/implement the multiply operations (in connection with filter weights and input data) and coarse floating point accumulator circuit ("FC ADD") to perform/implement the accumulate operations, according to one or more aspects of the present inventions; in these embodiments, the pipeline includes a plurality of serially interconnected MACs (each having a coarse floating point accumulator circuit—for example, as illustrated in FIGS. 2A, 2B, 15A and 15C) to form a linear execution or processing pipeline to process data; notably, although exemplary embodiments illustrated herein are, at times, described and/or illustrated in the context of a particular bit length of a floating point data format and/or a coarse floating point data format, and/or a bit precision of a multiplier circuit and/or an accumulator circuit (including a bit precision of a coarse floating point accumulator), such information is exemplary and useful for purposes of explanation; and the embodiments (and inventions) are not limited to such bit lengths or precisions—but are applicable to other bit lengths and precisions (e.g., FPxx or FCxx where: xx is an integer and is greater than or equal to, for example, 16 and less than or equal to, for example, 64); such other embodiments may or may not be specifically described and/or illustrated herein;

FIG. 24 illustrates a schematic block diagram of exemplary multiplier-accumulator circuits configured in exemplary MAC processing pipeline including a plurality of serially connected MACs (e.g., 64; when n=64) wherein input data values ("D") are rotated, transferred or moved, on a cycle-by-cycle basis, to the plurality of MACs of the pipeline; in this embodiment, the input data values are rotated or transferred from one MAC of the linear pipeline to the immediately following MAC of an execution pipeline (see, D_i[p]) and employed in the multiply operation of the multiplier circuit of that next MAC (of the processing pipeline), according to one or more aspects of the present inventions; in this embodiment, the output of each coarse floating point accumulator circuit ("FC ADD") of the MACs is input into the coarse floating point accumulator circuit ("FC ADD") of the associated MAC (see, MAC_r[p]) and employed in the accumulation operation; moreover the output of each accumulator circuit ("ADD") of the MACs is not rotated, transferred or moved to the immediately following MAC of the linear processing pipeline (compare, e.g., FIGS. 2D and 2E); in this way, the input data values ("D") are rotated, transferred or moved (e.g., before, during or at the completion of each execution cycle of the execution sequence (i.e., set of associated execution cycles)) through the plurality of serially connected MACs of the pipeline such that, in operation, after input of the initial data input values into the MACs of the linear pipeline (see "Shift in next D"), each input data value (see "Rotate current D") that is input into a MAC is output before, during or at the completion of each execution cycle to the immediately following MAC of the linear pipeline and employed in the multiplication operation of the multiplier circuit ("MUL") of that immediately following MAC, according to one or more aspects of the present inventions; notably, each MAC includes a multiplier circuit ("MUL") to perform/implement the multiply operations and accumulator circuit ("ADD") to perform/implement the accumulate operations, according to one or more aspects of the present inventions; notably, although exemplary embodiments illustrated herein are, at times, described and/or illustrated in the context of a particular bit length of a floating point data format and/or a coarse floating point data format, and/or a bit precision of a multiplier circuit and/or an accumulator circuit (including a bit precision of a coarse floating point accumulator), such information is exemplary and useful for purposes of explanation; and the embodiments (and inventions) are not limited to such bit lengths or precisions—but are applicable to other bit lengths and precisions (e.g., FPxx or FCxx where: xx is an integer and is greater than or equal to, for example, 16 and less than or equal to, for example, 64); such other embodiments may or may not be specifically described and/or illustrated herein;

FIG. 25 illustrates a schematic block diagram of exemplary multiplier-accumulator circuits configured in exemplary MAC processing pipelines including a plurality of serially connected MACs (e.g., 64; when n=64) wherein the output of each coarse floating point accumulator circuit ("FC ADD") of the MACs is coupled to the input of the immediately following coarse floating point accumulator circuit ("FC ADD") of the MACs of the linear processing pipeline wherein, in this way, accumulation values (Z, Y and/or X ("Z/Y/X" in this illustrative embodiment)) generated by the MACs (see, MAC_r[p]) are rotated, transferred or moved (e.g., before, during or at the completion of each execution cycle of the execution sequence (i.e., set of associated execution cycles)) through the plurality of serially connected MACs of the pipeline such that each accumulation value (see, MAC_r[p]—"Rotate current Z/Y/X" in this illustrative embodiment) generated by a MAC is output before, during or at the completion of each execution cycle to the immediately following MAC of the linear pipeline and employed in the accumulation operation of the coarse floating point accumulator circuit ("FC ADD") of that immediately following MAC wherein an output of the pipeline is coupled to activation circuitry which, in one embodiment, is programmable to process the output data of the multiplier-accumulator circuits via, for example, linear and/or non-linear activation operations and/or threshold functions, according to one or more aspects of the present inventions; as noted above, the MAC includes a multiplier circuit ("MUL") to perform/implement the multiply operations (in connection with filter weights and input data) and coarse floating point accumulator circuit ("FC ADD") to perform/implement the accumulate operations, according to one or more aspects of the present inventions; notably, the activation circuitry that processes the output data of the multiplier-accumulator circuits via, for example, linear and/or non-linear activation operations and/or threshold functions, may be implemented in any of the embodiments described and/or illustrated herein;

FIG. 26 illustrates a schematic block diagram of exemplary multiplier-accumulator circuits configured in exemplary MAC processing pipelines including a plurality of serially connected MACs (e.g., 64; when n=64) wherein the output of each coarse floating point accumulator circuit ("FC ADD") of the MACs is coupled to the input of the immediately following coarse floating point accumulator circuit ("FC ADD") of the MACs of the linear processing pipeline wherein, in this way, accumulation values (Z, Y and/or X ("Z/Y/X" in this illustrative embodiment)) generated by the MACs (see, MAC_r[p]) are rotated, transferred or moved (e.g., before, during or at the completion of each execution cycle of the execution sequence (i.e., set of associated execution cycles)) through the plurality of serially connected MACs of the pipeline such that each accumulation value (see, MAC_r[p]—"Rotate current Z/Y/X" in this illustrative embodiment) generated by a MAC is output before, during or at the completion of each execution cycle to the immediately following MAC of the linear pipeline and employed in the accumulation operation of the coarse floating point accumulator circuit ("FC ADD") of that immediately following MAC wherein an output of the MAC processing pipeline is coupled to data format conversion circuitry which, in one embodiment, is programmable to convert, at the completion of the execution sequence, the data format of the output data from a coarse floating point data format to a different data format—for example, floating point or fixed point (e.g., integer data format), according to one or more aspects of the present inventions; notably, the data format conversion circuitry may be implemented in any of the embodiments described and/or illustrated herein.

As stated above, the pseudo-code, operations, configurations, block/data width, data path width, bandwidths, data lengths, values, processes and/or algorithms described and/or illustrated in the FIGURES are exemplary and the inventions hereof are not limited to any particular or exemplary circuit, logical, block, functional and/or physical diagrams, number of multiplier-accumulator circuits employed in an execution pipeline, number of execution pipelines employed in a particular processing configuration/architecture, organization/allocation of memory, block/data width, data path width, bandwidths, values, processes, pseudo-code, operations, and/or algorithms illustrated and/or described in accordance with, for example, the exemplary circuit, logical, block, functional and/or physical diagrams. Moreover, although the illustrative/exemplary embodiments include a plurality of memories (e.g., L3 memory, L2 memory, L1 memory, L0 memory) which are assigned, allocated and/or used to store certain data (e.g., filter weights) and/or in certain organizations. Indeed, the organizations of the memories may be changed wherein one or more of memories may be added, and/or one or more memories may be omitted and/or combined/consolidated with other memories—for example, (i) the L3 memory or L2 memory and/or (ii) the L1 memory or L0 memory.

Again, there are many inventions described and illustrated herein. The present inventions are neither limited to any single aspect nor embodiment thereof, nor to any combinations and/or permutations of such aspects and/or embodiments. Each of the aspects of the present inventions, and/or embodiments thereof, may be employed alone or in combination with one or more of the other aspects of the present inventions and/or embodiments thereof. For the sake of brevity, many of those combinations and permutations are not discussed or illustrated separately herein.

DETAILED DESCRIPTION

In a first aspect, the present inventions are directed to one or more integrated circuits having multiplier-accumulator circuit (and methods of operating such circuitry) including an execution pipeline (in one embodiment, each pipeline includes a plurality of interconnected multiplier-accumulator circuits (referred to herein, at times, as "MAC" or "MAC circuit" or, in plural form, "MACs" or "MAC circuits")) for data processing (e.g., image filtering) wherein the MAC(s) each include an accumulator circuit to (i) perform accumulation operations, of operands, using fixed point addition circuitry wherein one or both operands have floating point data formats, and/or (ii) implement accumulation operations based on a coarse floating point data format (which may be based on operands having floating point data formats). In one embodiment, the accumulator circuit is implemented in one or more MACs of an execution or processing pipeline. For example, the MAC(s) of the processing pipeline may include a coarse floating point accumulator circuit and/or floating point accumulator circuit implementing accumulation operations based on or employing one or more coarse floating point data formats.

A coarse floating point data format, in one embodiment, includes: [1] a fractional field which is broken across or separated into two or more fields, [2] the two or more fields are shifted (with respect to the numeric weights of their bits), [3] the two or more fields may or may not be normalized (e.g., possessing a bit of one in the most significant position of the field), [4] the two or more fields may use a two's complements numeric format (in lieu of a sign-magnitude numeric format), and [5] a smaller bit length of the exponent field (relative to, for example, a standard eight bit floating point format) may be employed to accommodate the lack-of-normalization element [3]—in the event the two or more fractional fields are not normalized. Under these circumstances, the accumulation operation performed by the accumulator circuit of multiplier-accumulator circuit of, for example, an execution or processing pipeline(s) may employ a fixed point addition following a pre-alignment shift.

For example, an exemplary coarse floating point format may include: [1] three fractional fields each with 27 bits, [2] relative to the first field the second field is shifted 8 bit positions and the third field is shifted 16 bit positions, [3] the three fields may be unnormalized, [4] the three fields use two's complement numeric format, and [5] the exponent field is five bits. Such a data format allows the accumulator circuit of the multiplier-accumulator circuit to perform the accumulation operation via fixed point addition following a pre-alignment shift.

The data format (e.g., the "coarseness") of the coarse floating point data format employed may be user or system defined and/or may be one-time programmable (e.g., at manufacture) or more than one-time programmable (e.g., (i) at or via power-up, start-up or performance/completion of the initialization sequence/process sequence, and/or (ii) in situ or during normal operation). In one embodiment, the circuitry (e.g., the accumulator circuit) of the execution pipelines includes adjustable precision—which also may be one-time programmable (e.g., at manufacture) or more than one-time programmable (e.g., (i) at or via power-up, start-up or performance/completion of the initialization sequence/process sequence, and/or (ii) in situ or during normal operation).

With reference to FIG. 2A, in one embodiment, the data processing circuitry includes one or more MACs, having a floating point adder or accumulator circuit, to process data in a floating point data format. With reference to FIGS. 2B-2E, in another embodiment, the data processing circuitry includes one or more MACs, having a coarse floating point adder or accumulator circuit, to process of data, for example, in a coarse floating point data format. The MACs may be serially interconnected and configured in a linear pipeline. (See FIG. 2E). Notably, the numerical precision illustrated at various points of circuitry of the MAC processor, as indicated in FIGS. 2A-2E, have been adjusted to simplify the discussion, provide one or more examples, as well as for the purposes of improving the clarity of explanation of certain aspects of the embodiments of the present inventions.

Briefly, with reference to FIG. 2A, the data processing circuitry of the exemplary illustrative embodiment includes four major aspects or portions—including input data circuit/path, filter weight circuit/path, multiplier circuit and accumulator circuit, and output data circuit/path. Briefly, input data (e.g., image pixel values) are, in one embodiment, accessed in or read from memory (e.g., an L2 memory). The input data may or may not be in a floating point format and/or may not be a data width/length (e.g., 16 bit) that is correlated to or consistent with the data format and width/length employed by the circuits of the MAC. If not, data conversion circuitry may be employed to convert the input data to the appropriate data format and/or data width/length (e.g., FP16). For example, if the input data (e.g., image data) have been generated by an earlier filtering operation and/or stored in memory (e.g., SRAM such as L2 memory) after generation/acquisition, such data may be in a 24 bit floating point data format (FP24—24 bits for sign, exponent, fraction). If so, in one embodiment, the data/pixels may be converted (e.g., on-the-fly—i.e., immediately prior to such data processing) into a 16 bit floating point data format (FP16) which is a data format and length that is consistent with the circuits of the MAC (e.g., the multiplier circuit). Thereafter, the input data are shifted into the MAC circuit using a loading register "D_SI". In one embodiment, such data is thereafter parallel-loaded into the data register "D" and thereafter input to the multiplier circuit (identified as "MUL") for the processing.

In one embodiment, the input filter weight values may be temporarily stored in and accessed/read by the MAC from a local memory (identified as "L0 Memory") (i.e., a memory that is dedicated to and associated with the MAC). With continued reference to FIG. 2A, the filter weights may be previously stored in an L2 memory and loaded into L1 memory for managing access to such filter weights by the MAC. The filter weights stored in the L1 memory may thereafter be written to the L0 memory and subsequently accessed by the MAC. In one embodiment, the filter weights are stored in L2 memory in an 8 bit floating point data format (FP8—8 bits for sign, exponent, fraction fields). The filter weight values, in this embodiment, are read from memory (L2—SRAM memory), converted (via data conversion circuitry) on-the-fly into an FP16 data format, for storage in the L1 memory and L0 memory (e.g., SRAM memories). Thereafter, the filter weights in an FP16 data format (which is consistent with the circuits of the processing regime of the multiplier circuit of the MAC) are loaded into the filter weight register "F" and available/accessible to the multiplier circuit of the MAC of the data processing circuitry.

Alternatively, in one embodiment, the filter weights are stored in memory (e.g., L2 memory) in an FP16 format (16 bits for sign, exponent, fraction). The filter weight values, in this embodiment, are read from memory (L2—SRAM memory) and directly stored in the L1 and L0 memory levels (i.e., without conversion). Thereafter, the filter weights are loaded into the filter weight register "F" and are available/accessible to the multiplier circuit to implement the multiplication operation of the execution circuitry/process of the data processing circuitry. In yet another embodiment, the filter weight values are read from memory (e.g., L2 or L1—SRAM memory) and directly loaded into the filter weight register "F" for use by the multiplier circuit of the execution circuitry/process of the data processing circuitry.

Note that other numerical precision choices may be made for the various values which are to be processed—the values that are illustrated or discussed in this exemplary embodiment represent a precision (e.g., minimum precision) that is practical for a floating point data format. Here, the values that are shown in this embodiment represent a suitable or good tradeoff between circuit/wire area and the numerical precision and range for the floating point data albeit such precisions are not limiting in any respect wherein many other precisions may be employed.

The multiplier circuit (MUL) of the MAC reads the "D" and "F" values and multiplies those values to generate a product which, in this embodiment includes a 24 bit floating point data format (FP24). The product or output of the multiplier circuit, in FP24 format, is provided or output to the accumulator circuit ("ADD"), via the "D*F" register. In this embodiment, the accumulator circuit (with FP24 precision) accumulates the output of the multiplier circuit with the previous accumulation output value—which is a value stored in the "Y" register.

After each result "Y" has accumulated a predetermined number of outputs of the multiplier circuit (i.e., products—e.g., 64 products), the accumulation totals are output to (e.g., parallel-loaded) the output data circuit/path "MAC-SO" register. Thereafter, the accumulation data is serially shifted out during the next execution sequence.

With reference to FIGS. 2B-2E, the processing circuitry according to certain aspects of the present inventions includes a coarse floating point accumulator circuit (identified as "FC ADD") to (i) perform accumulation operations, of operands, using fixed point addition circuitry wherein one or both operands have floating point data formats, and/or (ii) implement accumulation operations based on a coarse floating point data format (which may be based on operands having floating point data formats). For example, the processing circuitry of the MAC has been modified, relative to the MAC of FIG. 2A, to employ coarse floating point accumulator circuit to process data in a coarse floating point data format for the accumulation of product values during execution processes implemented by the processing circuitry. In one embodiment, the data format of the data (in this illustrative embodiment, partially processed data which is output from the multiplier circuit) is remapped so that the binary fractional field of a standard floating point format includes two or more fixed-point fields. Here, the standard floating point exponent may also be modified—as described in detail below. As such, the coarse floating point accumulator circuit implements the accumulation operation with a pre-alignment shift and fixed point addition. In this way, the area and power (energy per operation) of, for example, the processing circuitry (due largely to the coarse floating point accumulator circuit) may be reduced relative to the processing circuitry of FIG. 2A (which includes a conventional floating point accumulator circuit).

With continued reference to FIG. 2B, the input data (e.g., image pixel values) are accessed from memory (e.g., L2 memory) and read into the processing circuitry. If the data format of the input data requires conversion to a format that is suitable with or correlates to the format employed by the processing circuitry, such data may be converted to the appropriate format—for example, on-the-fly. That is, the data format of the input data may or may not be consistent with the format (e.g., a floating point format (e.g., 16 bit)) employed by the MAC (here, multiplier circuit thereof). If not, the processing circuitry may convert the data format of the input data, via conversion circuitry, to the appropriate format (e.g., FP16). For example, if the input data have been generated by an earlier filtering operation and/or stored in memory (e.g., SRAM such as L2 memory) after generation/acquisition, such data may be in an FP24 format (24 bits for sign, exponent, fraction). If so, in one embodiment, the input data are converted (e.g., on-the-fly—read from memory, converted into data format that is consistent with processing (e.g., an FP16 format) and immediately input into the circuitry of the MAC processor (e.g., without re-storing the data)). Thereafter, the data may be shifted or written into the register "D_SI" for access by the multiplier circuit (MUL) of the MAC. In one embodiment, the input data are parallel-loaded into the data register "D" for access by or input into the multiplier circuit in connection with the execution process implemented by the processing circuitry.

With continued reference to FIG. 2B, the input filter weight values are read from memory (L0 memory—which, in one embodiment, may have been previously loaded from memory L2 to memory L1, and then from memory L1 to memory L0) and provided to the multiplier circuit to implement processing of the input data. If the data format of the filter weights is correlates to the multiplier circuit of the processing circuitry, such data may be provided directly to the multiplier circuit. If the data format of the filter weights requires conversion to a format that is consistent with the multiplier circuit, such data may be converted, via data conversion circuitry, on-the-fly and then input into the multiplier circuit. For example, the filter weight values, in one embodiment, are maintained in memory (e.g., SRAM such as L2 memory) in an 8 bit floating point data format (FP8—8 bits for the sign, exponent and fraction). In this embodiment, where the multiplier circuit employs a floating point format (e.g., FP16), the filter weight values may be converted (e.g., on-the-fly) into a 16 bit floating point data format (FP16) and stored in a local memory (e.g., an L1 and L0 memory). Thereafter, filter weights may be loaded or input into the filter weight register "F" and input into the multiplier circuit (in this exemplary embodiment, MUL) in connection with the processing of the input data.

Alternatively, as noted above, the filter weights may be stored in memory (e.g., L2 memory) in an FP16 format (16 bits for sign, exponent, fraction). The filter weight values, in this embodiment, are read from memory (L2—SRAM memory) and directly stored in the L1 and L0 memory levels (i.e., without conversion). Thereafter, the filter weights are loaded into the filter weight register "F" and are available/accessible to the multiplier circuit to implement the multiplication operation of the execution circuitry/process of the data processing circuitry. In yet another embodiment, the filter weight values are read from memory (e.g., L2 or L1—SRAM memory) and directly loaded into the filter weight register "F" for use by the multiplier circuit of the execution circuitry/process of the data processing circuitry.

With reference to FIGS. 2B-2E, the multiplier circuit acquires/reads input data and the filter weights from the "D" and "F" registers, respectively, and multiplies that data, and outputs the product. In one embodiment, the output of the multiplier circuit is stored in the "D*F" register. That product data may be in a floating point data format (e.g., a 24 bit floating point data format) and is available to the coarse floating point accumulator circuit (FC ADD) of the accumulation stage of the processing circuitry.

With continued reference to FIGS. 2B-2E, the coarse floating point accumulator circuit (FC ADD) accumulates the product values/data (in this example, data having a floating point data format (e.g., 24 bit—i.e., FP24)). The coarse floating point accumulator circuit performs accumulation operations, of operands, using fixed point addition circuitry wherein one or both operands have floating point data formats, and/or implements accumulation operations based on a coarse floating point data format (which may be based on operands having floating point data formats). In this embodiment, in operation, the coarse floating point accumulator circuit utilizes more than one accumulation register to implement or perform the accumulation process. For example, in one embodiment, the coarse floating point accumulator circuit employs three separate registers—referred to as "Z", "Y", and "X" registers (illustrated in block diagram form as "Z/Y/X") wherein each accumulation register is rotated right to the adjacent processing element for the next accumulation operation. As discussed in detail below, the "Z" register, "Y" register, and "X" register accumulations in the same processing element rotate the data register "D" values.

Notably, in one embodiment, the coarse floating point accumulator circuit rotates the values stored in Z/Y/X registers between processing elements and not rotate the D values. (Compare 15B and 15C). As discussed in detail below, in another embodiment, the coarse floating point accumulator circuit does not rotate the Z, Y and X values between processing elements; however, circuitry rotates the D or input values/data (see, e.g., FIG. 15A). Although the alternatives generate the same results, there may be certain tradeoffs with respect to circuit/wire area. To be sure, the present inventions may be implemented in connection with a pipeline architecture whereby MAC processors rotates the D or input values/data—and the discussions of the coarse floating point accumulator circuit below are entirely applicable thereto.

With continued reference to FIGS. 2B-2E, after one or more (or all) of the 64 "Z", "Y", and "X" registers have accumulated a predetermined number of outputs of the multiplier circuit (i.e., products—e.g., 64 products), the accumulation data totals are output to (e.g., parallel-loaded) the output data circuit/path "MAC-SO" register. Thereafter, the accumulation data totals are output (e.g., serially shifted out) during the next execution sequence.

Notably, in terms processing circuitry implementation, a coarse floating point accumulator circuit ("FC ADD") may provide size/area, power consumption and delay advantages relative to a conventional floating point accumulator circuit ("ADD" or "FP ADD"). For example, in one embodiment, the conventional floating point accumulator circuit performs a full pre-alignment on one of the operands, and a full post-normalization of the result. This may entail full width shifters (right and left), adder, incrementer, and deep multiplexing trees to steer the intermediate values for the various cases. In contrast, the coarse floating point accumulator circuit may implement a single shift (e.g., up to 8 bits) and a fixed point addition (e.g., one fixed point addition operation). In one embodiment, the area of the coarse floating point accumulator circuit is approximately ⅙ of the conventional floating point accumulator circuit. In the present inventions, the coarse floating point accumulator circuit may be smaller in size, may consume less energy per floating point addition operation, and/or may provide a shorter critical delay path between registers.

With reference to FIG. 3, in one embodiment of a coarse floating point accumulator circuit, according to certain aspects of the present inventions, the accumulator circuit receives the output of multiplier circuit. In this exemplary embodiment, the multiplier circuit, illustrated in the upper left corner of FIG. 3, generates a product having a 24 bit floating point data format (FP24) using the image data and the filter weights. Thereafter, the output of the multiplier circuit is loaded into or output to a pipeline register which, in one embodiment, includes registers to temporarily store a 1-bit sign bit (SP), an 8-bit exponent field (EP[7:0]), and a 15-bit fraction field (FP[22:7]).

With continued reference to FIG. 3, in one embodiment, the coarse floating point accumulator circuit performs (where the product is less than or equal to $x2^{23}$ of the accumulation total) the following operation:

[1] The exponent is separated into two fields EP[7:3] and EP[2:0]

[2] The fraction is extended to 27-bits FP[26:0] and conditionally complemented to FQ[26:0] if SP is one (negative)

[3] The upper exponent is EP[7:3] is subtracted from the accumulation exponent register EZ[7:3]. The difference Δ indicates which of the accumulation fraction registers are to be used:
(Δ=5'h00→Z reg, Δ=5'h01→Y reg, Δ=5'h02→X reg).

[4] The product fraction FQ[26:0] is right shifted by the complement of the lower exponent EP[2:0] to give FT[26:0].

[5] The three accumulation fraction registers may need to be pre-incremented by a constant if a fraction overflow occurred in the accumulation operation in the previous cycle (this will be described in more detail in a later section.

[6] The selected accumulation fraction FU[26:0] is added to the shifted product fraction FT[26:0], with a increment if SP is one.

[7] The sum FV[26:0] is stored back in the selected accumulation fraction register.

Where, however, the product is greater/larger than the accumulation total or more than $x2^{23}$, the accumulation total is effectively zero and the product becomes the new accumulation total. Notably, none these additional sequences or operations likely involve more logic complexity than the steps described above; rather, such other sequences/operations simply cause the accumulation fraction registers and the accumulation exponent register to be loaded with one or more different sets of values.

The accumulation fraction registers and accumulation exponent register may be pre-loaded from a shift-in path (illustrated at the bottom of FIG. 3 and labeled "Shift-in/Shift-out circuit"; which correlates to or is representative of the output data path/circuit in FIGS. 2A-2E). In one embodiment, the shift-in/shift-out circuit will be employed when implemented in a pipeline and the pipeline is accumulating more than product values (e.g., 64 product values). Likewise, the accumulation fraction registers and accumulation exponent register may be un-loaded to the shift-out path at the bottom of the figure—this will be employed when the pipeline has finished with the current accumulation of product values (e.g., 64 product values). The shift-out path is 40-bits wide—this included a 5-bit EZ[7:3] value and a 35-bit fraction FV[27:0]/RSOUT[7:0]. In one embodiment, the output may thereafter be converted to a predetermined format (FP16/FP24/FP32) by a conversion circuitry (see, e.g., FIG. 26) in the shift-out path.

Notably, the precision of the exemplary embodiment of the coarse floating point accumulator circuit of FIG. 3 may be referred to as a 32 bit coarse floating point data format "FC32" because the precision is comparable, approximately as accurate as, and/or "equivalent" to 32 bit accumulator circuit (i.e., a conventional floating point adder (FPADD) with FP32 precision). That is, in this embodiment, the three 27b accumulation fraction registers, in operation, generate an accumulation value that is approximately as accurate as a conventional floating point accumulator circuit with 32 precision.

With reference to FIG. 4, in another embodiment, the width of each of the three accumulation fraction registers is 35 bits—compared to the 27 bits in the coarse floating point accumulator circuit of the embodiment illustrated in FIG. 3. The right shift block/circuit is modified for {0, 1, . . . 16}bit shifts—compared to the {0, 1, . . . 8}bits in the coarse floating point accumulator circuit of the embodiment illustrated in FIG. 3. Although these modifications enhance precision of the coarse floating point accumulator circuit to correlate to greater or higher precision/accuracy, the modifications may also increase the area allocated to the data path and coarse floating point accumulator circuit.

With reference to FIG. 4, briefly, the multiplier circuit, illustrated in the upper left corner, performs a multiplication operation (e.g., having 24 bit floating point precision (FP24)) in connection with the input data (e.g., image data) and the filter weights—like that in the embodiment of FIG. 3. Thereafter, the multiplier circuit loads or outputs the product data into a pipeline register which, in one embodiment, includes registers to temporality store a 1-bit sign bit (SP), an 8-bit exponent field (EP[7:0]), and a 15-bit fraction field (FP[22:7]).

With continued reference to FIG. 4, in one embodiment, the coarse floating point accumulator circuit performs (where the product is less than or equal to $x2^{47}$ of the accumulation total) the following operation:
[1] The exponent is separated into two fields EP[7:4] and EP[3:0]
[2] The fraction is extended to 35-bits FP[34:0] and conditionally complemented to FQ[34:0] is SP is one (negative)
[3] The upper exponent is EP[7:4] is subtracted from the accumulation exponent register EZ[7:4]. The difference $\Delta$ indicates which of the accumulation fraction registers are to be used:
($\Delta$=4'h0→Z reg, $\Delta$=4'h1→Y reg, $\Delta$=4'h2→X reg).
[4] The product fraction FQ[34:0] is right shifted by the complement of the lower exponent EP[3:0] to give FT[34:0].
[5] The three accumulation fraction registers may need to be pre-incremented by a constant if a fraction overflow occurred in the accumulation operation in the previous cycle (this will be described in more detail in a later section.
[6] The selected accumulation fraction FU[34:0] is added to the shifted product fraction Ft[34:0], with a increment if SP is one.
[7] The sum FV[34:0] is stored back in the selected accumulation fraction register.

Where, however, the product is greater/larger than the accumulation total or more than $x2^{23}$, additional sequences/operations may be performed—including, for example, setting one or more status registers to indicate an overflow or an underflow result. Notably, none these additional sequences or operations likely involve more logic complexity than the steps described above; rather, such other sequences/operations simply cause the accumulation fraction registers and the accumulation exponent register to be loaded with one or more different sets of values.

The three accumulation fraction registers and the one accumulation exponent register may be pre-loaded from the shift-in path—depicted at the bottom of the circuit block diagram of FIG. 4 (see "Shift-in/Shift-out circuit"; which correlates to or is representative of the output data circuit/path of FIGS. 2A and 2B). In one embodiment, the shift-in/shift-out circuit will be employed when implemented in a pipeline and the pipeline is accumulating more than product values (e.g., 64 product values). Likewise, the accumulation fraction registers and accumulation exponent register may be un-loaded to the shift-out path at the bottom of the figure—this will be employed when the pipeline has finished with the current accumulation of product values (e.g., 64 product values). The output of the shift-out path, in this embodiment, is 55-bits wide—which includes a 4-bit EZ[7:4] value and a 51-bit fraction FV[34:0]/RSOUT[15:0]. The data format of the output data from the shift-out path may be converted to another data format (e.g., bit length)—for example, FP16, FP24, FP32, FP40 by a data format conversion circuit (not illustrated) in the shift-out path.

Notably, the exemplary embodiment of the coarse floating point accumulator circuit illustrated in FIG. 4 may also be referred to as "FC40" accumulation because accumulation value generated by the accumulator circuit is also approximately as accurate as a conventional floating point adder (FPADD) with a FP40 precision. Here, the three 35b accumulation fraction registers, in operation, generate an accumulation value that is approximately as accurate as a conventional FPADD with FP40 precision.

Briefly, in this embodiment, data in a floating point data format is converted into data having a coarse floating point data format prior to the accumulator circuit performing accumulation operations. FIG. 5 illustrates numerical details of the conversion into a coarse floating point format. Three standard floating point data formats are depicted for reference purposes—namely, FP16, FP24 and FP32. Each data format includes a 1-bit sign field, an 8-bit exponent field, and a 7 bit fraction field, 15 bit fraction field and 23 bit fraction field, respectively. There is an implicit bit of weight "1.0" added to each fraction (the format is normalized). That is, the sign bit and the fraction field utilize a sign-magnitude numeric format. The exponent field is decremented by a fixed offset of "01111111" to generate the exponent value of the number.

The multiplier circuit, in one embodiment, generates and outputs product data in a floating point data format having 24 bits (FP24) using the image/input data and the filter weight data. (See, FIGS. 2B, 3 and 4). The product fraction is in the range 1.0 to 3.9999, and is shown in the first coarse format.

With continued reference to FIG. 5, in one embodiment, the product exponent is separated into two fields E[7:3] and E[2:0]. The product fraction is right shifted by the complement of the lower exponent EP[2:0](this is equivalent to left-shifting by the lower exponent EP[2:0], as is shown in the second coarse format). This is referred to as a fine alignment—the logic circuitry for implementing this shift is relatively small.

In each embodiment, the fraction field is extended to 27-bits and conditionally complemented if S is one (i.e., negative). In this way, the fraction is converted into a two's complement numeric format. In addition, the upper exponent is E[7:3] is subtracted from the accumulation exponent register EZ[7:3]. The difference indicates which of the accumulation fraction registers are to be used:
($\Delta$=5'h00→Z reg, $\Delta$=5'h01→Y reg, $\Delta$=5'h02→X reg).
This is referred to as a coarse alignment. Notably, it is not necessary here to implement shifting; rather, in this embodiment, the fine-shifted product is accumulated into the correct accumulation fraction register.

Here, the accumulation exponent register EZ[7:3] may be shared by the three accumulation fraction registers. The exponent register will increment if an FP24 product is generated with an exponent larger/greater than the current Z accumulation exponent register EZ[7:3]. The exponent will decrement if the accumulation fraction register Z has a value of zero (exact cancellation).

Moreover, if the accumulation exponent register EZ[7:3] increments to a maximum threshold, it will be set to the exponent overflow value, as shown in the final two formats illustrated in FIG. 5. The two values represent positive infinity and negative infinity—these are the saturating overflow values that are also used in the standard floating point formats. Note that there is also room to add NAN (not-a-number) encodings to the INF formats.

Alternatively, if the accumulation exponent register EZ[7:3] decrements to a minimum threshold, it will be set to the exponent underflow value (zero)—this is the non-saturating underflow value that is also used in the standard floating point formats.

Notably, for the purposes of illustration, the conventional floating point data formats FP16, FP24, and FP32 and the coarse floating point data formats FC32 and FC40 are employed to describe or illustrate certain circuitry and/or methods of certain aspects or certain features of the present inventions. Moreover, such FC32 and FC40 formats are often described herein in the context of the accumulation or addition operation. The inventions, however, are not limited to (i) particular coarse floating point format(s), operations (e.g., addition, subtraction, etc.), block/data width, data path width, bandwidths, values, processes and/or algorithms illustrated, nor (ii) the exemplary logical or physical overview configurations, and/or exemplary module/circuitry configuration.

The amount of "coarseness" or precision of the coarse floating point accumulator circuit employed may be user or system defined and/or may be one-time programmable (e.g., at manufacture) or more than one-time programmable (e.g., (i) at or via power-up, start-up or performance/completion of the initialization sequence/process sequence, and/or (ii) in situ (i.e., during operation of the integrated circuit), at manufacture, and/or at or during power-up, start-up, initialization, re-initialization, configuration, re-configuration or the like. In one embodiment, control circuitry may evaluate the input data and, based thereon, implement or select a precision and configuration of the coarse floating point accumulator circuit, and the coarse floating point data format, to employ, for example, in the processing pipeline. In response, the circuitry of the pipeline (e.g., coarse floating point accumulator circuit) may receive configuration instruction signals from internal or external circuitry (i.e., external to the one or more integrated circuits—for example, a host computer/processor) including one or more data storage elements (e.g., one or more memory cells, register, flip-flop, latch, block/array of memory), one or more input pins/conductors, a look-up table LUT (of any kind), a processor or controller and/or discrete control logic. That circuitry, in response thereto, may employ such signal(s) to implement the selected/defined configuration (e.g., in situ and/or at or during power-up, start-up, initialization, re-initialization, configuration, re-configuration or the like) of the data format of the coarse floating point accumulator circuit.

The numerical accuracy of the coarse floating point accumulator circuit is illustrated in FIG. 6—based on a synthetic set of data patterns. Briefly, the pattern set includes 6,144 FP24 floating point values. The sign, exponent and fraction fields are filled with pseudo-random bit values. The exponent range of the pattern set includes 192 of the possible 256 binades. The results shown for Test 01 are representative of the results for other similar tests.

An accumulation total of the 6144 values is generated for each of the floating point formats shown. These include:
cFZ—the 5b EZ exponent register and the 27b FZ fraction accumulation registers
cFZY—the 5b EZ exponent register and the 27b FZ+FY fraction accumulation register
cFZYX—the 5b EZ exponent register and the 27b FZ+FY+FX fraction accumulation registers FP16—1b sign, 8b exponent, 7b fraction format
FP20—1b sign, 8b exponent, 11b fraction format
FP24—1b sign, 8b exponent, 15b fraction format
FP28—1b sign, 8b exponent, 19b fraction format
FP32—1b sign, 8b exponent, 23b fraction format
FP36—1b sign, 8b exponent, 27b fraction format
FP40—1b sign, 8b exponent, 31 b fraction format
FP44—1b sign, 8b exponent, 35b fraction format
FP48—1b sign, 8b exponent, 39b fraction format
FP52—1b sign, 8b exponent, 43b fraction format
FP56—1b sign, 8b exponent, 47b fraction format
FP64—1b sign, 11 b exponent, 52b fraction format Notably, the 64 bit floating point (FP64) accumulation result may be used as the reference value, and the representations in FIG. 6 plots the relative error of the other formats to FP64 (note that the FP64 error is zero, but is forced to $10^{-17}$ because of the log scale). In short, the results illustrate that, for this pattern set, the cFZYX format generates a relative error between that of the FP32 and FP36 formats. The cFZYX format generates a final accumulation value from all three accumulator registers (Z, Y, and X). The cFZY format is approximately as accurate as FP24. In general terms, this would be the result of employing two accumulator registers (i.e., a two-accumulator-register implementation), for example, the FZ and FY fraction accumulation registers.

FIGS. 7A-7C illustrate functional details of an exemplary embodiment of a coarse floating point accumulator circuit, according to certain aspects of the present inventions. This data includes a floating point (FP) field and an exponent (EP) field. With reference to FIG. 7A, in operation, the exponent field EP[7:3] is subtracted from an accumulation exponent register EZ[7:3] of the accumulator circuit. The difference (A) indicates which of the accumulation fraction registers are to be used. The cases in FIG. 7A assume that no overflow (FOVFL) and no underflow (FUNFL) occur. The FNORM and FNRMz designations indicate that there is no overflow or underflow (the FNRMz designation is employed to differentiate from a similar set of cases in which FUNFL occurs).

With reference to FIG. 8A, the table entries (which reflects functional details of the coarse floating point accumulator circuit) in the first four rows indicate that, when EP≥EZ+1, the product exponent EP is loaded to the EZ exponent accumulation register and the shifted product fraction FT is loaded to the FZ fraction accumulation register. The old or previous values of the FZ fraction accumulation register and FY fraction accumulation register may be loaded into FY or FX registers, or discarded. If they are discarded, the RND register may be can set if they are larger/greater than a rounding threshold. If FY/FX are not loaded with an old or previous value of FZ/FY, the values stored in the FZ and FY registers are set to zero.

With continued reference to FIG. 8A, the entries in the next three rows of the table indicate that when EP={EZ, EZ−1, EZ−2}, the shifted product fraction FT is added to the {FZ, FY, FX} fraction accumulation register, respectively. The other two fraction accumulation registers will retain their old or previous values. The EZ exponent accumulation register will also retain its old or previous value.

Finally, the table entries in the last two rows show that when EP≤EZ−3, the product is discarded and each of the FZ, FY, and FX fraction accumulation registers and the EZ exponent accumulation register retain their old or previous value.

With reference to FIG. 7B, again—the multiplier circuit generates a FP24 product, which includes a fractional (FP) field and an exponent (EP) field. In operation, the product exponent EP[7:3] is subtracted from the accumulation exponent register EZ[7:3]. The difference (Δ) indicates which of the accumulation fraction registers are to be used. The cases in this FIG. 7B assume that FOVFL occurs (fraction overflow of the FZc modified fraction accumulation register value). This FZ overflow is the result of the accumulation operation from the previous cycle.

With reference to FIG. 8B, the table entries (which reflects functional details of the coarse floating point accumulator circuit) in the first four rows again show that when EP≥EZ+1, the product exponent EP is loaded to the EZ exponent accumulation register and the shifted product fraction FT is loaded to the FZ fraction accumulation register. The old or previous values of the FZ fraction accumulation register and the FY fraction accumulation register may be loaded into FY or FX registers, or discarded. If the old or previous values are discarded, they may set the RND register if they are larger/greater than a rounding threshold. If FY or FX registers are not loaded with a previous value of FY register or FX register, the values therein are set to zero. Also, the FOVFL condition causes the K2 constant to be added to FZ/FY/FX registers in the indicated cases.

With continued reference to FIG. 8B, the table entries in the next three rows show that when EP={EZ, EZ−1, EZ−2}, the shifted product fraction FT is added to the {FZ, FY, FX} register, respectively. The modified {FZ, FY, FX} values will be stored in the {FY, FX, RND} registers, respectively. The EZ exponent accumulation register will be incremented. Also, the FOVFL condition causes the K2 constant to be added to FZ/FY/FX in the indicated cases. Finally, the table entries in the last two rows show that when EP s EZ−3, the FT product is discarded, and the old or previous {FZ, FY, FX} values will be stored in the {FY, FX, RND} registers, respectively. The EZ exponent accumulation register will be incremented. Also, the FOVFL condition causes the K2 constant to be added in the indicated cases.

With reference to FIG. 7C, again—the multiplier circuit generates a FP24 product, which includes a fractional (FP) field and an exponent (EP) field. In operation, the product exponent EP[7:3] is subtracted from the accumulation exponent register EZ[7:3]. The difference (Δ) indicates which of the accumulation fraction registers are to be used. The cases in this FIG. 7C assume that FUNFL occurs (i.e., fraction underflow to zero of the FZc modified fraction accumulation register value). This FZ underflow is the result of the accumulation operation from the previous cycle.

With reference to FIG. 8C, the table entries (which reflects functional details of the coarse floating point accumulator circuit) in the first five rows show that when EP≥EZ, the product exponent EP is loaded to the EZ exponent accumulation register and the shifted product fraction FT is added to the FZ fraction accumulation register. Note that even if FZc has underflowed to zero, the product fraction FT that is added to it will make it non-zero again. Thus, these five cases in the table of FIG. 8C are functionally equivalent to the previously discussed FNORM cases. The old or previous values of the FZ fraction accumulation register and FY fraction accumulation register may be loaded into FY or FX, or discarded. If the previous values are discarded, the RND register is set if they are larger/greater than a rounding threshold. If FY/FX are not loaded with an old or previous value of FZ or FY, they are set to zero.

With continued reference to FIG. 8C, the table entries in the next two rows show that, when EP={EZ−1, EZ−2}, the shifted product fraction FT is added to the {FY, FX} fraction accumulation register, respectively. The modified {FY, FX} values will be stored in the {FZ, FY} registers, respectively. The EZ exponent accumulation register will be decremented. Finally, the table entries in the last two rows show that, when EP s EZ−3, the FT product is discarded, and the old or previous {FY, FX} values are stored in the {FZ, FY} registers, respectively. The EZ exponent accumulation register will again be decremented.

With reference to FIG. 9A, in a high-level logic block diagram of one embodiment of MAC including a coarse floating point accumulator circuit, according to certain aspects of the present inventions. As noted above, the accumulator circuit receives the output of multiplier circuit (e.g., a product having a 24 bit floating point data format (FP24)). In this illustration, certain critical timing paths are outlined, in portions of the multiplier circuit and the accumulator circuit, to illustrate "worst case" register-to-register delays. These delays may impact or determine the pipeline clocking rate of MAC when employed in an execution pipeline (see, e.g., FIG. 2E).

With reference to FIGS. 9A and 9B, the FP24 multiplier circuit is located in the upper left corner and its timing paths are outlined and highlighted via thick dotted lines (see FIG. 9B). In short, the multiplier circuit generates the FP24 product and loads it into a pipeline register which includes registers to temporarily store a 1-bit sign SP, an 8-bit exponent EP[7:0], and a 15-bit fraction FP[22:7].

With reference to FIGS. 9A and 9C, a first timing path, highlighted via thick dotted lines (see FIG. 9C), correlates to the FZ-to-FZc case/operation wherein the coarse floating point accumulator circuit performs a pre-increment by a constant if a fraction overflow occurred in the accumulation operation in the previous cycle. This takes place in the {FZ-to-FZc, FY-to-FYc, FX-to-FXc} logic.

With reference to FIGS. 9A and 9D, a second, parallel timing path in the coarse floating point accumulator circuit is the exponent compare operation, highlighted via thick dotted lines (see FIG. 9D). The EP[7:3] field from the product pipeline register is subtracted from the accumulation exponent register EZ[7:3] (a five bit addition). The difference determines which case will take place. The "Logic" block or circuit generates selection control signals for the various multiplexers in the coarse floating point accumulator circuit. One of the three fraction values {FZc, FYc, FXc} is selected to be the FU[26:0] operand.

With reference to FIGS. 9A and 9E, a third, parallel timing path in the coarse floating point accumulator circuit, highlighted via thick dotted lines (see FIG. 9E), corresponds to adjusting the FP[26:0] field from the product pipeline register. It is conditionally complemented to FQ[26:0] and right shifted by the complement of the lower exponent EP[2:0] to give FT[26:0].

With continued reference to FIGS. 9A and 9F, the three timing paths discussed above converge into a final common timing path, highlighted via thick dotted lines (see FIG. 9F), and FU[26:0] is added to the shifted product fraction FT[26:0]. The sum FV[26:0] is stored back in the selected accumulation fraction register (FZ in this example).

For cases in which the product is larger/greater than the accumulation total or more than $x2^{24}$ smaller, other sequences will need to be performed. None of these other sequences involve longer timing paths than the processes described above; they simply cause the accumulation fraction registers and the accumulation exponent register to be loaded with different sets of values.

FIG. 10 illustrates a schematic block diagram of an exemplary embodiment of the FZ-to-FZc circuitry, FY-to-FYc circuitry, FX-to-FXc circuitry, and the RND circuitry, according to certain aspects of the present inventions. The FZ-to-FZc circuitry, FY-to-FYc circuitry, FX-to-FXc circuitry are logically identical. The connections of the input and output ports, and signals thereon, are different between the circuitry. As such, the discussion below is in reference to the operation of FY-to-FYc circuitry—however, that discussion is application to the operation of the FZ-to-FZc circuitry FX-to-FXc circuitry as well because, in this embodiment, the operation of the FZ-to-FZc circuitry and FX-to-FXc circuitry is the same as the operation of the FY-to-FYc circuitry.

With that in mind, the FY[34:08] accumulation register is clocked after each pipeline cycle. In some cases, the previous accumulation operation may have created a two's complement overflow of the FY value. This is detected by examining the upper three bits FY[34:32]. If they are {111, 000}, then it is determined that no overflow has occurred. However, if they are {101,100,110}then a negative overflow has been determined to have occurred, and it is necessary to add a bit to FY[32]. If they are {011,010,001}then a positive overflow has been determined to have occurred, and it is necessary to subtract a bit from FY[32]. The logic gates in the FY-to-FYc circuitry assert the s3[0] and s3[1] select controls for the INCDEC3 block/circuit to make this correction.

With continued reference to FIG. 10, in the case of a negative overflow for FY, it is necessary to add a bit to FZ[32]. Similarly, in the case of a positive overflow for FY, it is necessary to subtract a bit from FZ[32]. The FY[34:32] logic in the FY-to-FYc block/circuit generates the s11[0] and s11[1] select controls for the INCDEC11 block in the FZ-to-FZc block/circuit to make this correction.

As noted above, the FX-to-FXc circuitry and FZ-to-FZc circuitry operate in a similar manner, with the ability to add or subtract a bit in two different positions in the 27 bit register value. The result buses {FZc, FYc, FXc} are passed to the 27 bit adder for the next accumulation operation.

With respect to the FZ-to-FZc circuitry, the FZ-OVFLn and FZ-OVFLp signals produced by the FZ-to-FZc circuitry are used to perform an increment of the EZ[7:3] value—the fraction field overflow requires the exponent value to be modified.

With respect to the FX-to-FXc circuitry, the s11[0] and s11[1] select controls for the INCDEC11 circuitry in the FX-to-FXc circuitry are not needed for an overflow correction (there are no lower order accumulators). Instead, they are used as a rounding input, when a previous accumulation operation has discarded a fraction register. If the discarded register is larger/greater or smaller/less than two threshold values, a bit is added to or subtracted from the FX[16] bit position.

FIG. 11 illustrates a schematic block diagram of an exemplary embodiment of INCDEC circuitry/cell, according to certain aspects of the present inventions. The INCDEC circuitry/cell is used three times or eight times in the FZ-to-FZc circuitry, FY-to-FYc circuitry, FX-to-FXc circuitry. The cells implement the control table set forth in Inc/Dec Cell Table shown at the top of the figure. When the select controls are {00, 01, 11} the input value D[imax . . . imin] is passed, incremented, or decremented to Q[imax . . . imin]. The {10}select code is not used.

The logic detail of the three 27 bit INCDEC11 circuits is illustrated in the block diagram of FIG. 12A. The INCDEC cell is used 11 times, and a simple wire cell is used 16 times.

The logic detail of the three 27 bit INCDEC3 circuits is illustrated in the block diagram of FIG. 12B. The INCDEC cell is used 3 times, and a simple wire cell is used 24 times.

Notably, FIG. 12B also illustrates the logic detail of the 5 bit INCDEC5 block/circuit (used by the exponent register EZ[7:3] to produce the EZpm1[7:3] value. The INCDEC cell is used 5 times.

FIG. 13 illustrates a schematic block diagram of an exemplary embodiment of the right shift circuitry (identified as "RSHFT8" or "0-8 Right Shift" in FIGS. 3 and 9A) of the coarse floating point accumulator circuit which performs a 0-8 bit shift during an accumulation operation. The RS[2:0] value is generated by complementing the EP[2:0] product pipeline register field. The Rsin is the SP product pipeline register field. The RSand value is generated as part of the two's-complement negation operation of the FP[26:0] product pipeline register field. The Rsout[7:0] is unused for an accumulation operation. Notably, the circuitry also performs an 8 bit shift for an unload operation. The Rsout[7:0] contains the eight bits that are shifted out.

FIGS. 14A and 14B illustrate, in tabular form, control signals for an exemplary embodiment of the decode logic of the coarse floating point accumulator circuit, illustrated in FIGS. 3 and 9A (see "Logic" block), wherein the logic circuitry generates control signals that control the multiplexers during operation of the accumulator circuit. The horizontal axis illustrates different cases that are decoded from the difference (EZ[7:3] minus EP[7:3]) and by the OP[2:0] command. The commands LOAD, UNLOADa, and UNLOADb, and impact thereof, are illustrated on the left. The remaining cases correspond to EXEC commands.

Briefly, with reference to FIGS. 14A and 14B, the EOVFL case occurs when there is an overflow of the FZ value (FOVFL) and the EZ exponent increments to the overflow threshold. The INF constant is produced. The FOVFL cases occur when there is an overflow of the FZ value (FOVFL) and no EOVFL. The (EZ[7:3] minus EP[7:3]) difference is split into seven ranges.

The FNORM cases occur when there is no overflow of the FZ value (FOVFL) and no EOVFL. The (EZ[7:3] minus EP[7:3]) difference is split into seven ranges. The lower three ranges are further split into the FNRMz/FUNFL subcases. The FUNFL sub-case occurs when there is exact cancellation of the FZ value to zero, causing the exponent to decrement. If the exponent decrements to an underflow threshold, EUNFL has occurred. The ZERO constant is produced.

With continued reference to FIGS. 14A and 14B, the vertical axis corresponds to various select signals that are generated. The SELFUb/c/d/e signals select the FU operand for the adder. In short, in this embodiment, there are six select signals generated for each of the three accumulation registers—they have a common assignment pattern, as illustrated for FY:

SELFYf holds the current FY value,
SELFYe selects a FOVFL overflow constant K2,
SELFYd selects the adder result FV,
SELFYc selects the LOAD value FS,
SELFYb selects the next smaller fraction register FX, and
SELFYa selects the next larger fraction register FZ.

Notably, the six signals for FX and FZ are similar to the six signals for FY.

There are six select signals for the EZ exponent register:
SELEZd holds the current EZ value,
SELEZc selects the MIIN/MAX value for ZERO/INF constants,
SELEZb selects the LOAD value ES,
SELEZa selects the product exponent EP, and
SELEZK1 and SELEZK0 select a five bit increment/decrement for the EZ value.

In another embodiment of the pipeline aspect of the present inventions, the architecture or configuration of the processing pipeline includes a coarse floating point accumulator circuit having three accumulation registers at the output of the pipeline to implement processing of data in a coarse floating point format. With reference to FIG. 15A, the input data values "D" are shifted into the processing circuitry using a loading register "D_SI", and they will be parallel-loaded into the data register "D" for the execution process. In this embodiment, the data value in the data register D_i[p] are rotated right to the adjacent processing element for the next accumulation operation (see, e.g., FIG. 24). After a predetermined cycle accumulation operations (e.g., 64-cycle accumulation operation for a pipeline, including 64 MAC processors, wherein each input data value rotates to each of the 64 MAC processors).

As before, in configuration B, the coarse floating point accumulator circuit performs accumulations of each FP24 product value in three accumulation registers (identified in FIGS. 15C and 15D as the ("Z/Y/X"—i.e., "Z", "Y", and "X" registers). In one embodiment, each set of three accumulation registers remains unchanged at MAC processor index (which correspond to the plurality of MAC processors) during the predetermined number of cycle accumulation operations (e.g., 64-cycle accumulation operation). (See FIG. 15E).

Typically, in one embodiment, the data value size will be 16 bits, while the size of the three accumulation registers is ~86 bits (5+3×27). As such, this embodiment requires less area for the shifting wires since it is only moving about 20% as much information between adjacent processor elements.

Briefly, in comparison to the embodiment illustrated in FIG. 15C, the data values (D) are shifted into the processing element using a loading register "D_SI", and they will be parallel-loaded into the data register "D" for the execution process. In this embodiment, the data value in the data register D_i[p] remains unchanged at processor element index [p] during the 64-cycle accumulation operation.

The "FC32 ADD" circuitry performs the accumulation of each FP24 product value in the modified processor element, utilizing three accumulation registers (identified as "Z", "Y", and "X" registers). As noted above, in this embodiment, each set of three accumulation registers is rotated right to the adjacent processing element for the next accumulation operation. After the predetermined number of cycle accumulation operations (e.g., 64-cycle accumulation operation), each set of accumulation registers Z/Y/X will have rotated past each of the MAC processors (in this embodiment, n=64).

After one or more (or all) of the "Z", "Y", and "X" registers have accumulated products in the execution pipeline, the accumulation totals for each of the MAC processors are parallel-loaded into the "MAC-SO" registers in the output data circuit/path of each MAC of the plurality of MAC of the processing pipeline. In one embodiment, processed data in the registers may then be serially shifted out during the next execution processing sequence.

A top level of logic block diagram of the embodiment illustrated in FIG. 15A is illustrated in FIGS. 16-18. Briefly, with reference to FIG. 16, steering paths employed for loading the registers of the coarse floating point accumulator circuit are highlighted via thick dotted lines. The load values have been previously shifted into the FS register shown at the bottom of the figure. In the next pipeline cycle, the LOAD command is asserted, and the 40 bits of the FS register are loaded into three registers:

[1] The FS[42:16] field is loaded into the FZ[42:16] register (via the "C" multiplexer input).
[2] The FS[15:08] field is loaded into the FY[15:08] register (via the "C" multiplexer input).
[3] The FY[34:16] register field is loaded with zeroes (via the "C" multiplexer input).
[4] The FX[26:00] register field is loaded with zeroes (via the "C" multiplexer input).
[5] The ES[07:03] field is loaded into the EZ[07:03] register (via the "C" multiplexer input).

In this exemplary embodiment, the low-order 8 bits of the FX[07:00] register are loaded with zero; however, in an alternate embodiment, a loading path is provided for this register, as well. This may improve the accuracy of the accumulator, at the cost of an additional 8 signal wires in the shift-in and shift-out path.

With reference to FIG. 17, steering paths employed for unloading the registers of the coarse floating point accumulator circuit are highlighted via thick dotted lines. The UNLOADa command is asserted, and the two 27 bit values in the FX and FY registers are added and written back to the FY register:

[1] The FY[34:08] register field is loaded to the FU[26:00] bus;
[2] The FX[26:00] register field is loaded to the FR[26:00] bus;
[3] The FR[26:00] bus is shifted right 8 bit positions, with a fill bit of FX[26], (discarding the shifted-out bits) to FT[26:00]; and
[4] The FU[26:00] and FR[26:00] buses are added to FV[26:00], and written to the FY[34:08] register.

In this exemplary embodiment, the low-order 8 bits of the FX[07:00] register are discarded—in an alternate embodiment, an unloading path could be provided for these 8 bits, as well. This may improve the accuracy of the coarse floating point accumulator circuit, at the cost of an additional 8 signal wires in the shift-in and shift-out path.

With reference to FIG. 18, a second set of steering paths employed for unloading the registers of the coarse floating point accumulator circuit are highlighted via thick dotted lines—having different lengths. Here, the UNLOADb command is asserted, and the two 27 bit values in the FY and FZ registers are added and written to the FS register:

[1] The FZ[42:16] register field is loaded to the FU[26:00] bus;
[2] The FY[34:08] register field is loaded to the FR[26:00] bus;
[3] The FR[26:00] bus is shifted right 8 bit positions, with a fill bit of FY[34], to FT[26:00];
[4] The FU[26:00] and FR[26:00] buses are added to FV[26:00], and written to the FS[42:16] register; and
[5] The RSOUT[7:0] bus from the shift operation is written to the FS[15:08] register (see the longer of the thick dotted lines).

An exemplary sequencing and timing of the embodiment of FIGS. 15A and 16-18 is illustrated in FIG. 19 wherein the sequencing employed for loading, for execution and for unloading of the pipeline are illustrated. Notably, it is assumed that there are 64 MAC processors in the pipeline (see FIG. 15E, where n=64). It is also assumed that the sequencing of the embodiment of FIG. 15A is employed (i.e. rotating input data "D", stationary accumulation values (i.e., accumulation values remain in the MAC processor for use in the accumulation operation for that MAC).

Briefly, the sequencing waveform consists of multiple sets of accumulations, labeled {R, S, T, U}. Each set has "k+1" accumulations (equal to 64 in this example). Each element is labeled with an index value—for example, the set "S" is labeled {S-k, S-k-1, . . . S-1, S}.

There are two non-accumulation cycles employed for loading and unloading. These are indicated in the lowest waveform, showing the operation command in the accumulation stage: "exec" is an accumulation cycle, "unldA" is the first unload command, and "swap" is a second unload command and a simultaneous load command for the next accumulation set.

The element "S" can be followed in the pipeline, as an example. The "S" data element is multiplied by the "S" weight element in the multiplier circuit pipeline stage:

(SA/EA/FA*SB/EB/FB).

The product stage (SP/EP/FP) is added to one of the three accumulation registers (EZ/FZ/FY/FX) in the add pipeline stage.

The addition of element "S" was the $64^{th}$ accumulation of data set "S", with the 64th assertion of the "exec" command.

On the 65th cycle (assuming a 64 cycle pipeline), the "unldA" command is asserted. This adds the FX register to the FY register and writes it back to the FY register.

On the 66th cycle, the "swap" command is asserted. This adds the FY register to the FZ register and writes it to the FS shifting register. The low order 8 bits of the FY register and the EZ exponent register are also written to the FS shifting register.

Simultaneously on the 66th cycle, the FS shifting register is written to the FZ register, to the low 8 bits of the FY register (the high 19 bits are cleared), and the EZ exponent register. The FX register is also cleared.

The value of the FS shifting register had been previously been rotated in (during the 64 accumulation cycles), and this will be the initial accumulation value for the next 64 accumulation cycles. The new value of the FS shifting register has the result of the 64 current accumulation cycles, and it will be shifted out to memory.

There are many inventions described and illustrated herein. While certain embodiments, features, attributes and advantages of the inventions have been described and illustrated, it should be understood that many others, as well as different and/or similar embodiments, features, attributes and advantages of the present inventions, are apparent from the description and illustrations. As such, the embodiments, features, attributes and advantages of the inventions described and illustrated herein are not exhaustive and it should be understood that such other, similar, as well as different, embodiments, features, attributes and advantages of the present inventions are within the scope of the present inventions.

Indeed, the present inventions are neither limited to any single aspect nor embodiment thereof, nor to any combinations and/or permutations of such aspects and/or embodiments. Moreover, each of the aspects of the present inventions, and/or embodiments thereof, may be employed alone or in combination with one or more of the other aspects of the present inventions and/or embodiments thereof.

As noted herein, although several of the exemplary embodiments and features of the inventions are described and/or illustrated in the context of a processing pipeline (including multiplier circuit) as well as coarse floating point addition (FC ADD) operation/module/circuit having 32 and 40 bit precision (i.e., FC ADD32 and FC ADD40), the embodiments and inventions are applicable in other contexts as well as other precisions (e.g., FPxx where: xx is an integer and is greater than or equal to 24 and less than or equal to 64). For the sake of brevity, those other contexts and precisions will not be illustrated separately but are quite clear to one skilled in the art based on, for example, this application. For example, such inventive circuitry/processes and data formats (e.g., FC32 and FC40) are often described herein in the context of the addition operation preceded by multiplication operation. The inventions, however, are not limited to such processing and/or formats (i) particular floating point format(s), coarse floating point format(s), operations (e.g., addition, subtraction, etc.), block/data width, data path width, bandwidths, values, processes and/or algorithms illustrated, nor (ii) the exemplary logical or physical overview configurations of the particular circuitry and/or overall pipeline, and/or exemplary module/circuitry configuration and/or overall pipeline.

Indeed, the present inventions may employ control circuitry to implement the programmability or selectability of the "coarseness" of the floating point data format and coarse floating point accumulator circuit (whether dynamic or otherwise). Such control circuitry may be partially or entirely resident on the integrated circuit of the processing circuitry or external thereto (e.g., in a host computer or on a different integrated circuit from the MAC circuitry and execution pipelines). With reference to FIGS. 20A and 20B, control circuitry may control, change or select the configuration of the coarse floating point data format and accumulator circuit. The control signals output by the configuration select circuitry may be applied to the coarse floating point accumulator circuit to control the format configuration of the "coarseness" of the floating point data format. In one embodiment, the control circuitry of FIGS. 20A and 20B are the same circuitry.

The amount of "coarseness" employed may be user or system defined and/or may be one-time programmable (e.g., at manufacture) or more than one-time programmable (e.g., (i) at or via power-up, start-up or performance/completion of the initialization sequence/process sequence, and/or (ii) in situ (i.e., during operation of the integrated circuit), at manufacture, and/or at or during power-up, start-up, initialization, re-initialization, configuration, re-configuration or the like. In one embodiment, control circuitry may evaluate the input data and, based thereon, implement or select a configuration of the coarse floating point accumulator circuit, and the coarse floating point data format, to employ, for example, in the processing pipeline. In response, the circuitry of the pipeline (e.g., coarse floating point accumulator circuit) may receive configuration instruction signals from internal or external circuitry (i.e., external to the one or more integrated circuits—for example, a host computer/processor) including one or more data storage elements (e.g., one or more memory cells, register, flip-flop, latch, block/array of memory), one or more input pins/conductors, a look-up table LUT (of any kind), a processor or controller and/or discrete control logic. That circuitry, in response thereto, may employ such signal(s) to implement the selected/defined configuration (e.g., in situ and/or at or during power-up, start-up, initialization, re-initialization, configuration, re-configuration or the like) of the data format of the coarse floating point accumulator circuit.

In addition, the multiplier-accumulator circuits and circuitry of the present inventions may be interconnected or implemented in one or more multiplier-accumulator execution or processing pipelines. (See, e.g., FIGS. 21-24). For example, in one embodiment, the size (i.e., the number of multiplier-accumulator circuits or rows/banks of multiplier-accumulator circuits) of the execution or progressing pipelines may be programmable or configurable. Here, a plurality of the multiplier-accumulator circuit (each having a multiplier-accumulator circuits employing coarse floating point accumulator circuit—for example, as illustrated in FIGS. 2A, 2B, 15A, 15D and 15E) may be interconnected, in series, to form an execution or processing pipeline to process data, for example, in parallel or concurrently. As intimated above, in one embodiment, the data rotated during processing (e.g., "Rotate Y" in FIG. 21 and "Rotate Current Z/Y/X" in FIG. 23 and FIG. 25) may include a coarse floating point data format in lieu of a floating point data format. That is, in FIGS. 21, 22A, 22B, 23, 25 and 26, for example, the accumulation data output from the coarse floating point accumulator circuit, which is rotated between the MAC processors during processing (during the execution cycles of the sequence), may be a coarse floating point data format or a floating point data format.

For example, the multiplier-accumulator circuits (having the coarse floating point accumulator circuit described above) may be interconnected into execution or processing pipelines as described and/or illustrated in U.S. Provisional Application No. 63/012,111 and/or U.S. Non-Provisional application Ser. No. 17/212,411; as noted above, these application are incorporated by reference herein in their entirety. In one embodiment, the circuitry configures and controls a plurality of separate MACs or rows/banks of interconnected (in series) multiplier-accumulator circuits (referred to, at times, as clusters) to pipeline multiply and accumulate operations. In one embodiment, the plurality of multiplier-accumulator circuits (having the coarse floating point accumulator circuit described above) may include a plurality of registers (including a plurality of shadow registers) wherein the circuitry also controls such registers to implement or facilitate the pipelining of the multiply and accumulate operations performed by the multiplier-accumulator circuits to increase throughput of the multiplier-accumulator execution or processing pipelines in connection with processing the related data (e.g., image data). (See, e.g., '345 and '306 applications).

In another embodiment, the interconnection of the pipeline or pipelines are configurable or programmable to provide different forms of pipelining. (See, e.g., U.S. Provisional Application No. 63/012,111 and/or U.S. Non-Provisional application Ser. No. 17/212,411). Here, the pipelining architecture provided by the interconnection of the plurality of multiplier-accumulator circuits (having the coarse floating point accumulator circuit described above) may be controllable or programmable. In this way, a plurality of multiplier-accumulator circuits may be configured and/or re-configured to form or provide the desired processing pipeline(s) to process data (e.g., image data).

For example, with reference to U.S. Provisional Application No. 63/012,111 and/or U.S. Non-Provisional application Ser. No. 17/212,411, in one embodiment, control/configure circuitry may configure or determine the multiplier-accumulator circuits having coarse floating point accumulator circuit described above, or rows/banks of interconnected multiplier-accumulator circuits having coarse floating point accumulator circuit described above are interconnected (in series) to perform the multiply and accumulate operations and/or the pipelining architecture or configuration implemented via connection of multiplier-accumulator circuits (or rows/banks of interconnected multiplier-accumulator circuits). Thus, in one embodiment, the control/configure circuitry configures or implements an architecture of the execution or processing pipeline by controlling or providing connection(s) between multiplier-accumulator circuits and/or rows of interconnected multiplier-accumulator circuits—each of which include one or more coarse floating point accumulator circuit embodiments described herein.

Further, as discussed above and in '164 and '413 applications, a plurality of execution or processing pipelines of one or more clusters of one or more the X1 components may be interconnected to process data (e.g., image data). In one embodiment, such execution or processing pipelines (including the multiplier-accumulator circuits having coarse floating point accumulator circuit) may be interconnected in a ring configuration or architecture to concurrently or in parallel process data. Here, a plurality of MAC execution pipelines of one or more (or all) of the clusters of one or more X1 components (which may be integrated/manufactured on a single die or multiple dice) may be interconnected in a ring configuration or architecture (wherein a bus interconnects the components) to concurrently process related data.

With reference to FIG. 25, in another embodiment, the embodiments of the present inventions may be employed in conjunction with the activation circuitry described and/or illustrated in U.S. Patent Application No. 63/144,553, entitled "MAC Processing Pipeline having Activation Circuitry, and Methods of Operating Same", filed Feb. 2, 2021). Here, the activation circuitry described and/or illustrated in the '553 application may be employed in the same manner (e.g., disposed on the output of a MAC processing pipeline, to further process the data initially processed by the MAC processing pipeline) in connection with linear pipelines described and/or illustrated herein—for example, FIGS. 2E, 15E, 21-24. Indeed, the activation circuitry may be implemented in any of the embodiments described and/or illustrated herein as well as include one or more circuits to process data output by such linear pipelines via one or more operations, including, for example, linear and/or non-linear activation operations and/or threshold functions. The one or more circuits of the activation circuitry, alone or in combination, may perform a particular operation, including, for example, a particular linear or non-linear activation operation or threshold function. The '553 application is hereby incorporated by reference herein in its entirety.

For example, a plurality of MAC execution pipelines (including the multiplier-accumulator circuits having coarse floating point accumulator circuit) of one or more (or all) of the clusters of each X1 component are configured to process one or more stages of an image frame such that circuitry of one or more X1 components processes one or more stages of each image frame of a plurality of image frames. (See, e.g., the '164 application). In another embodiment, a plurality of MAC execution pipelines of one or more (or all) of the clusters of each X1 component are configured to process one or more portions of each stage of each image frame such that circuitry of each X1 component is configured to process a portion of each stage of each image frame of a plurality of image frames. In yet another embodiment, a plurality of MAC execution pipelines of one or more (or all) of the clusters of each X1 component are configured to process all of the stages of at least one entire image frame such that circuitry of each X1 component is configured to process all of the stage of at least one image frame. Here, each X1 component is configured to process all of the stages of one or more image frames such that the circuitry of each X1 component processes different image frames (e.g., an entire image frame) of a plurality of image frames. (See, e.g., the '164 application). Notably, in each of the aforementioned embodiments, the plurality of MAC execution pipelines each include a plurality of multiplier-accumulator circuits having coarse floating point accumulator circuit as described herein.

Notably, various circuits, circuitry and techniques disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit, circuitry, layout and routing expressions may be implemented include, but are not limited to, formats supporting behavioral languages such as C, Verilog, and HLDL, formats supporting register level description languages like RTL, and formats supporting geometry description languages such as GDSII, GDSIII, GDSIV, CIF, MEBES and any other formats and/or languages now known or later developed. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.).

Indeed, when received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

Moreover, the various circuits, circuitry and techniques disclosed herein may be represented via simulations using computer aided design and/or testing tools. The simulation of the circuits, circuitry, layout and routing, and/or techniques implemented thereby, may be implemented by a computer system wherein characteristics and operations of such circuits, circuitry, layout and techniques implemented thereby, are imitated, replicated and/or predicted via a computer system. The present inventions are also directed to such simulations of the inventive circuits, circuitry and/or techniques implemented thereby, and, as such, are intended to fall within the scope of the present inventions. The computer-readable media corresponding to such simulations and/or testing tools are also intended to fall within the scope of the present inventions.

Notably, reference herein to "one embodiment" or "an embodiment" (or the like) means that a particular feature, structure, or characteristic described in connection with the embodiment may be included, employed and/or incorporated in one, some or all of the embodiments of the present inventions. The usages or appearances of the phrase "in one embodiment" or "in another embodiment" (or the like) in the specification are not referring to the same embodiment, nor are separate or alternative embodiments necessarily mutually exclusive of one or more other embodiments, nor limited to a single exclusive embodiment. The same applies to the term "implementation." The present inventions are neither limited to any single aspect nor embodiment thereof, nor to any combinations and/or permutations of such aspects and/or embodiments. Moreover, each of the aspects of the present inventions, and/or embodiments thereof, may be employed alone or in combination with one or more of the other aspects of the present inventions and/or embodiments thereof. For the sake of brevity, certain permutations and combinations are not discussed and/or illustrated separately herein.

Further, an embodiment or implementation described herein as "exemplary" is not to be construed as ideal, preferred or advantageous, for example, over other embodiments or implementations; rather, it is intended convey or indicate the embodiment or embodiments are example embodiment(s).

Although the present inventions have been described in certain specific aspects, many additional modifications and variations would be apparent to those skilled in the art. It is therefore to be understood that the present inventions may be practiced otherwise than specifically described without departing from the scope and spirit of the present inventions. Thus, embodiments of the present inventions should be considered in all respects as illustrative/exemplary and not restrictive.

The terms "comprises," "comprising," "includes," "including," "have," and "having" or any other variation thereof, are intended to cover a non-exclusive inclusion, such that a process, method, circuit, article, or apparatus that comprises a list of parts or elements does not include only those parts or elements but may include other parts or elements not expressly listed or inherent to such process, method, article, or apparatus. Further, use of the terms "connect", "connected", "connecting" or "connection" herein should be broadly interpreted to include direct or indirect (e.g., via one or more conductors and/or intermediate devices/elements (active or passive) and/or via inductive or capacitive coupling)) unless intended otherwise (e.g., use of the terms "directly connect" or "directly connected").

The terms "a" and "an" herein do not denote a limitation of quantity, but rather denote the presence of at least one of the referenced item. Further, the terms "first," "second," and the like, herein do not denote any order, quantity, or importance, but rather are used to distinguish one element/circuit/feature from another.

In addition, the term "integrated circuit" means, among other things, any integrated circuit including, for example, a generic or non-specific integrated circuit, processor, controller, state machine, gate array, SoC, PGA and/or FPGA. The term "integrated circuit" also means, for example, a processor, controller, state machine and SoC—including an embedded FPGA.

Further, the term "circuitry", means, among other things, a circuit (whether integrated or otherwise), a group of such circuits, one or more processors, one or more state machines, one or more processors implementing software, one or more gate arrays, programmable gate arrays and/or field programmable gate arrays, or a combination of one or more circuits (whether integrated or otherwise), one or more state machines, one or more processors, one or more processors implementing software, one or more gate arrays, programmable gate arrays and/or field programmable gate arrays. The term "data" means, among other things, a current or voltage signal(s) (plural or singular) whether in an analog or a digital form, which may be a single bit (or the like) or multiple bits (or the like).

Notably, the term "MAC circuit" means a multiplier-accumulator circuit of the multiplier-accumulator circuitry of the multiplier-accumulator pipeline. For example, a multiplier-accumulator circuit is described and illustrated in the exemplary embodiment of FIGS. 1A-1C of U.S. patent application Ser. No. 16/545,345, and the text associated therewith. In the claims, the term "MAC circuit" means a multiply-accumulator circuit, for example, like that described and illustrated in the exemplary embodiment of FIGS. 1A-1C, and the text associated therewith, of U.S. patent application Ser. No. 16/545,345. Notably, however, the term "MAC circuit" is not limited to the particular circuit, logical, block, functional and/or physical diagrams, block/data width, data path width, bandwidths, and processes illustrated and/or described in accordance with, for example, the exemplary embodiment of FIGS. 1A-1C of U.S. patent application Ser. No. 16/545,345.

Notably, the limitations of the claims are not written in means-plus-function format or step-plus-function format. It is applicant's intention that none of the limitations be interpreted pursuant to 35 USC § 112, ¶6 or § 112(f), unless such claim limitations expressly use the phrase "means for" or "step for" followed by a statement of function and is void of any specific structure.

What is claimed is:

1. An integrated circuit comprising:
   a multiplier-accumulator circuit execution pipeline including a plurality of multiply-accumulate (MAC) circuits to perform multiply and accumulate operations, wherein each MAC circuit includes:
      a multiplier circuit, coupled to a first memory, to multiply first input data, having a first data format, and filter weight data to generate first product data in a floating point data format, the floating point data format including an explicit sign-bit field, an exponent field, and a fractional field in which each constituent bit has a respective significance less than one, and
      an accumulator circuit coupled receive the first product data from to the multiplier circuit, the accumulator circuit including:
         format conversion circuitry to generate format-converted product data by converting the first product data from the floating point data format to a second data format having (i) an exponent field with fewer constituent bits than the exponent field of the floating point data format, (ii) a two's-complement numeric field having one or more bits with respective significances greater than one, and (iii) a smaller numeric range than the floating point data format, and
         addition circuitry to generate an accumulated sum by adding second input data to the format-converted product data;
   wherein, the plurality of MAC circuits of the multiplier-accumulator circuit execution pipeline each perform a plurality of multiply operations and accumulate operations to process the first input data and generate processed data therefrom.

2. The integrated circuit of claim 1 wherein:
   the second input data has the second data format.

3. The integrated circuit of claim 1 wherein:
   the multiplier-accumulator circuit execution pipeline includes the plurality of MAC circuits serially interconnected in a linear pipeline architecture wherein an output of the accumulator circuit of each MAC circuit of the multiplier-accumulator circuit execution pipeline is coupled to an input of the accumulator circuit of the immediately following MAC circuit of the multiplier-accumulator circuit execution pipeline to receive the second input data.

4. The integrated circuit of claim 3 wherein:
   the second input data has the second data format.

5. The integrated circuit of claim 1 wherein:
   the accumulator circuit of each MAC circuit includes a plurality of inputs and at least one output;
   the multiplier-accumulator circuit execution pipeline includes the plurality of MAC circuits serially interconnected in a linear pipeline architecture wherein the at least one output of the accumulator circuit of each MAC circuit of the multiplier-accumulator circuit execution pipeline is coupled to an input of the accumulator circuit of the immediately following MAC circuit of the multiplier-accumulator circuit execution pipeline to receive the second input data; and
   the accumulator circuit of each MAC circuit includes a plurality of accumulation registers.

6. The integrated circuit of claim 1 wherein:
   the accumulator circuit of each MAC circuit includes a plurality of inputs and at least one output;
   the multiplier-accumulator circuit execution pipeline includes the plurality of MAC circuits serially interconnected in a linear pipeline architecture wherein the at least one output of the accumulator circuit of each MAC circuit of the multiplier-accumulator circuit execution pipeline is coupled to a first input of the accumulator circuit thereof to receive the second input data; and
   the second input data rotates from each MAC circuit to the immediately following MAC circuit during operation of the multiplier-accumulator circuit execution pipeline.

7. The integrated circuit of claim 1 wherein:
   the accumulator circuit of each MAC circuit includes a plurality of inputs and at least one output;
   the multiplier-accumulator circuit execution pipeline includes the plurality of MAC circuits serially interconnected in a linear pipeline architecture wherein the at least one output of the accumulator circuit of each MAC circuit of the multiplier-accumulator circuit execution pipeline is coupled to a first input of the accumulator circuit thereof to receive the second input data; and
   the second input data has the second data format.

8. The integrated circuit of claim 1 wherein the two's complement numeric field within the second data format comprises more constituent bits than the fractional field within the floating point data format.

9. The integrated circuit of claim 8 wherein the format conversion circuitry populates the two's complement numeric field within the format-converted product data by left-shifting constituent bits of the fractional field of the first product data in accordance with states of one or more least significant bits of the exponent field of the first product data.

10. An integrated circuit comprising:
   a multiplier-accumulator circuit execution pipeline including a plurality of multiply-accumulate (MAC) circuits to perform multiply and accumulate operations, wherein each MAC circuit includes:
      a multiplier circuit, coupled to a first memory, to multiply first input data, having a first data format, and filter weight data to generate first product data in a floating point data format, the floating point data format including an explicit sign bit, an exponent field, and a fractional field in which each constituent bit has a respective significance less than one, and an accumulator circuit coupled to receive the first product data from the multiplier circuit and having:

format conversion circuitry to generates format-converted product data by converting the first product data from the floating point data format to a second data format having (i) an exponent field with fewer constituent bits than the exponent field of the floating point data format, (ii) a two's-complement numeric field having one or more bits with respective significances greater than one, and (iii) a smaller numeric range than the floating point data format, and addition circuitry to generate an accumulated sum by adding second input data to the format-converted product data;

control circuitry, coupled to the accumulator circuit of each MAC circuit of the multiplier-accumulator circuit execution pipeline, to program a numeric precision of the accumulator circuit;

wherein, the plurality of MAC circuits of the multiplier-accumulator circuit execution pipeline each perform a plurality of multiply operations and accumulate operations to process the first input data and generate processed data therefrom.

11. The integrated circuit of claim 10 wherein:
the accumulator circuit of each MAC circuit of the multiplier-accumulator circuit execution pipeline is more than one-time programmable to responsively define the numeric precision of the accumulator circuit.

12. The integrated circuit of claim 11 wherein:
the accumulator circuit of each MAC circuit of the multiplier-accumulator circuit execution pipeline is more than one-time programmable in situ or during initialization to responsively define the numeric precision of the accumulator circuit.

13. The integrated circuit of claim 10 wherein the two's complement numeric field within the second data format comprises more constituent bits than the fractional field within the floating point data format.

14. The integrated circuit of claim 13 wherein the format conversion circuitry populates the two's complement numeric field within the format-converted product data by left-shifting constituent bits of the fractional field of the first product data in accordance with states of one or more least significant bits of the exponent field of the first product data.

15. The integrated circuit of claim 10 wherein:
the accumulator circuit of each MAC circuit includes a plurality of accumulation registers.

16. The integrated circuit of claim 10 wherein:
the accumulator circuit of each MAC circuit includes three accumulation registers.

17. An integrated circuit comprising:
a multiplier-accumulator circuit execution pipeline including a plurality of multiply-accumulate (MAC) circuits to perform multiply and accumulate operations, wherein each MAC circuit includes:

a multiplier circuit, coupled to a first memory, to multiply first input data, having a first data format, and filter weight data to generate and output first product data in a floating point data format, the floating point data format having three constituent bit fields, including a sign bit, an exponent field, and a fractional field in which each constituent bit has a respective significance less than one, and an accumulator circuit coupled to receive the first product data from the multiplier circuit and having:

format conversion circuitry to generate format-converted product data by converting the first product data from the floating point data format to a second data format having two constituent bit fields, including (i) an exponent field with fewer constituent bits than the exponent field of the floating point data format, (ii) a two's-complement numeric field having one or more bits with respective significances greater than one, and (iii) a smaller numeric range than the floating point data format, and adder circuitry to generate an accumulated sum by adding second input data to the format-converted product data.

18. The integrated circuit of claim 17 wherein the two's complement numeric field within the second data format comprises more constituent bits than the fractional field within the floating point data format.

19. The integrated circuit of claim 17 wherein the format conversion circuitry populates the two's complement numeric field within the format-converted product data by left-shifting constituent bits of the fractional field of the first product data in accordance with states of one or more least significant bits of the exponent field of the first product data.

20. The integrated circuit of claim 19 wherein the format conversion circuitry complements content within the two's complement numeric field if the sign bit of the first product data indicates a negative value.

* * * * *